US007427996B2

(12) United States Patent
Yonezawa et al.

(10) Patent No.: US 7,427,996 B2
(45) Date of Patent: Sep. 23, 2008

(54) IMAGE PROCESSING APPARATUS AND IMAGE PROCESSING METHOD

(75) Inventors: Hiroki Yonezawa, Kanagawa (JP);
Toshikazu Ohshima, Kanagawa (JP);
Kenji Morita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1035 days.

(21) Appl. No.: 10/684,401

(22) Filed: Oct. 15, 2003

(65) Prior Publication Data

US 2004/0109009 A1 Jun. 10, 2004

(30) Foreign Application Priority Data

Oct. 16, 2002 (JP) .............................. 2002-301651
Sep. 25, 2003 (JP) .............................. 2003-333628

(51) Int. Cl.
*G09G 5/00* (2006.01)

(52) U.S. Cl. ........................ 345/629; 345/632; 345/633

(58) Field of Classification Search .......... 345/629–633
See application file for complete search history.

(56) References Cited

U.S. PATENT DOCUMENTS

| 6,045,229 | A * | 4/2000 | Tachi et al. ................... 353/28 |
| 6,215,498 | B1 * | 4/2001 | Filo et al. .................... 345/419 |
| 6,633,304 | B2 * | 10/2003 | Anabuki et al. ............. 345/633 |
| 6,803,928 | B2 * | 10/2004 | Bimber et al. .............. 715/757 |
| 6,853,935 | B2 * | 2/2005 | Satoh et al. .................. 702/94 |

(Continued)

FOREIGN PATENT DOCUMENTS

JP 2000-334168 12/2000

(Continued)

OTHER PUBLICATIONS

Steven Feiner, Blair MacIntre, Tobias Hollerer, and Anthony Webster, "Prototyping 3D Mobile Augmented Reality Systems for Exploring the Urban Environment", Personal Technologies, vol. 1, No. 4, pp. 208-217, 1997.*

(Continued)

*Primary Examiner*—Jin-Cheng Wang
(74) *Attorney, Agent, or Firm*—Fitzpatrick, Cella, Harper & Scinto

(57) ABSTRACT

An image processing apparatus is connected to a print unit adapted to print an image, and can output an image to be printed to the print unit. The apparatus includes an image sensing unit adapted to capture a real space image, a generation unit adapted to generate a virtual space image according to a viewpoint position and orientation of the image sensing unit, and a composition unit adapted to obtain a mixed reality space image by combining the real space image captured by the image sensing unit and the virtual space image generated by the generation unit. In addition, a display unit is adapted to display a mixed reality space image obtained by the composition unit, and an output unit is adapted to output a mixed reality space image, which is obtained by the composition unit, to the print unit in response to an input of a print instruction. The generation unit generates a virtual space image to be displayed by the display unit according to a first procedure, and generates a virtual space image to be outputted by the output unit according to a second procedure which is different from the first procedure.

17 Claims, 55 Drawing Sheets

U.S. PATENT DOCUMENTS

| | | | |
|---|---|---|---|
| 7,038,699 B2 * | 5/2006 | Sato et al. | 345/633 |
| 2002/0057280 A1 * | 5/2002 | Anabuki et al. | 345/633 |
| 2002/0154070 A1 | 10/2002 | Sato et al. | 345/8 |
| 2003/0062675 A1 * | 4/2003 | Noro et al. | 273/237 |
| 2003/0156144 A1 | 8/2003 | Morita | 345/848 |

FOREIGN PATENT DOCUMENTS

| | | |
|---|---|---|
| JP | 2001-096063 | 4/2001 |
| JP | 2001-101252 | 4/2001 |
| JP | 2001-195601 | 7/2001 |
| JP | 2002-157607 | 5/2002 |
| JP | 2003-141569 | 5/2003 |

OTHER PUBLICATIONS

K. Hiroki, Nintendo 64 Pocket Monsters Snap Strategy Guide Book, T2 Publishing Co. Ltd., pp. 7, 18 and 87 (May 14, 1999), with English translation.

I. Inoue, PilotWings64 Proven Winning Strategies, Futabashi Publishers Ltd., p. 5 (Sep. 20, 1996), with English translation.

* cited by examiner

F I G. 35
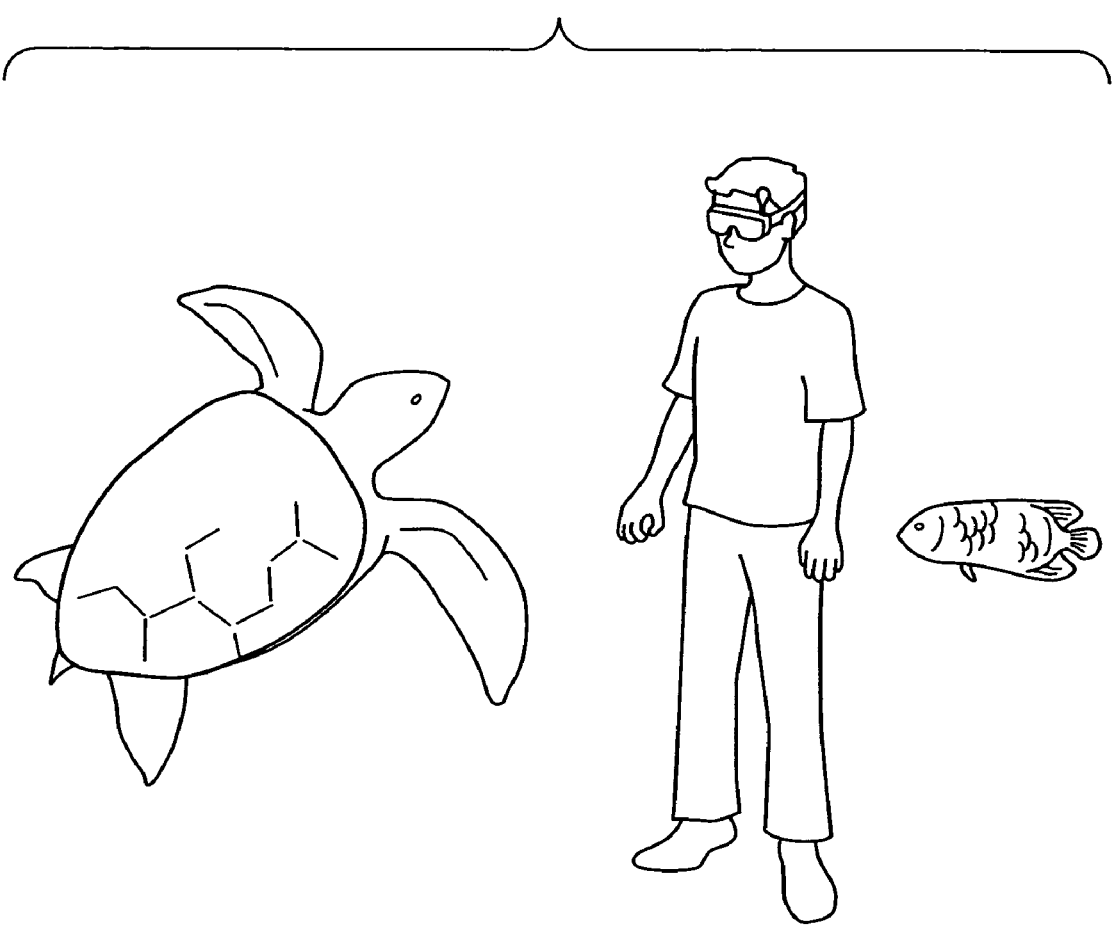

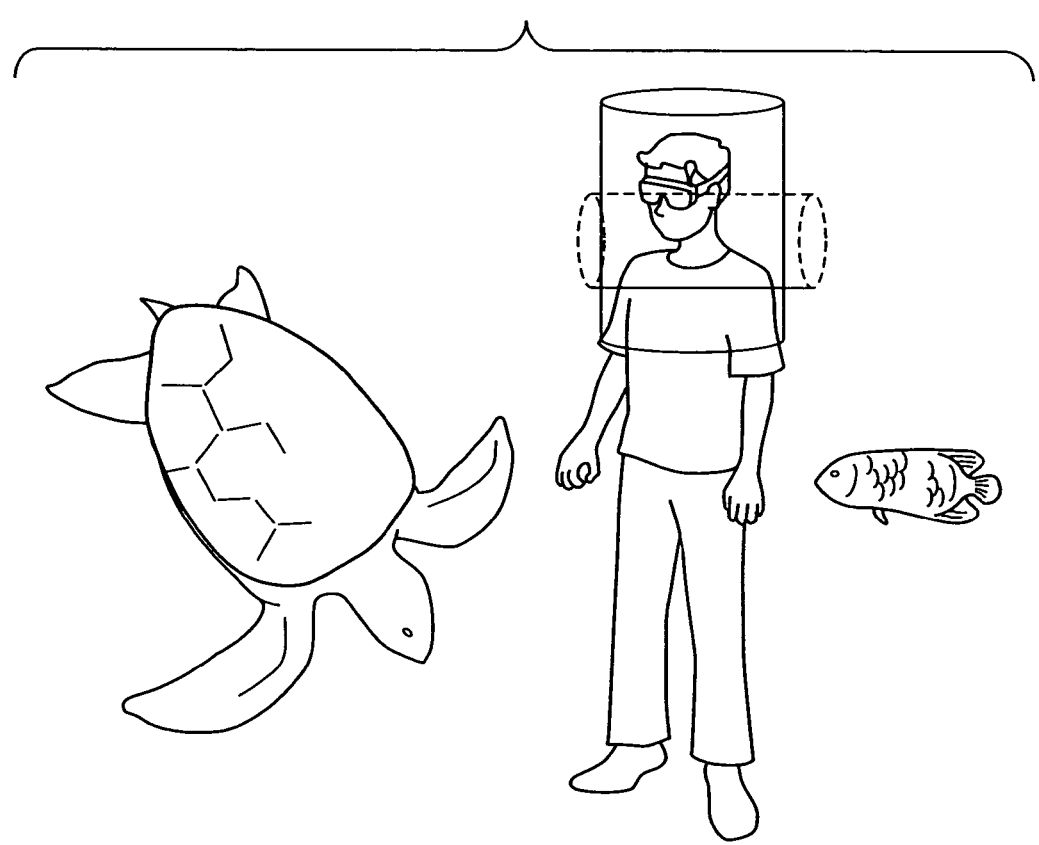
F I G. 40

FIG. 44

| | OBJECT TYPE NUMBER | APPARATUS NUMBER | ID NUMBER | TYPE NUMBER | VIEWPOINT POSITION AND ORIENTATION (X, Y, Z, Yaw, Pitch, Roll) | ADDITIONAL INFORMATION |
|---|---|---|---|---|---|---|
| ENTRY 1 | | | | | | |
| ENTRY 2 | | | | | | |
| ENTRY 3 | | | | | | |
| ..... | | | | | | |

FIG. 45

| OBJECT TYPE NUMBER: 0 (0: REAL OBJECT, 1: VIRTUAL OBJECT) | TYPE NUMBER: 0 (WHEN OBJECT TYPE NUMBER=0 → 0: OBSERVER CAMERA, 1: OBJECTIVE CAMERA, 2: OBSERVER) | VIEWPOINT POSITION AND ORIENTATION (X, Y, Z, Yaw, Pitch, Roll) | ADDITIONAL INFORMATION: CAMERA PARAMETER |
|---|---|---|---|

APPARATUS NUMBER ⎫ ID NUMBER

FIG. 46

| OBJECT TYPE NUMBER: 0 (0: REAL OBJECT, 1: VIRTUAL OBJECT) | | TYPE NUMBER: 2 (WHEN OBJECT TYPE NUMBER=0 → 0: OBSERVER CAMERA, 1: OBJECTIVE CAMERA, 2: OBSERVER) | VIEWPOINT POSITION AND ORIENTATION (X, Y, Z, Yaw, Pitch, Roll) | ADDITIONAL INFORMATION: OBSERVER SHAPE INFORMATION |
|---|---|---|---|---|

APPARATUS NUMBER — ID NUMBER

FIG. 47

| OBJECT TYPE NUMBER: 0 (0: REAL OBJECT, 1: VIRTUAL OBJECT) | APPARATUS NUMBER | TYPE NUMBER: 1 (WHEN OBJECT TYPE NUMBER=0 → 0: OBSERVER CAMERA, 1: OBJECTIVE CAMERA, 2: OBSERVER) | VIEWPOINT POSITION AND ORIENTATION (X, Y, Z, Yaw, Pitch, Roll) | ADDITIONAL INFORMATION: CAMERA PARAMETER |
|---|---|---|---|---|

ID NUMBER

FIG. 49

| APPARATUS NUMBER OF APPARATUS TO WHICH CAMERA IS CONNECTED | ID NUMBER OF CAMERA | ID NUMBER OF OBSERVER | ID NUMBER OF VIRTUAL OBJECT |
|---|---|---|---|
| ENTRY 1 | | | |
| ENTRY 2 | | | |
| ENTRY 3 | | | |
| ..... | | | |

FIG. 50

| APPARATUS NUMBER OF APPARATUS TO WHICH CAMERA IS CONNECTED: 1 | ID NUMBER OF CAMERA: 1 | ID NUMBER OF OBSERVER: 2 | ID NUMBER OF VIRTUAL OBJECT: 6 |
| --- | --- | --- | --- |

FIG. 53

| ENTRY | APPARATUS NUMBER OF APPARATUS TO WHICH CAMERA IS CONNECTED | ID NUMBER OF CAMERA | ID NUMBER OF OBSERVER | ID NUMBER OF VIRTUAL OBJECT | POSITION OF VIRTUAL OBJECT |
|---|---|---|---|---|---|
| ENTRY 1 | | | | | |
| ENTRY 2 | | | | | |
| ENTRY 3 | | | | | |
| ..... | | | | | |

IMAGE PROCESSING APPARATUS AND IMAGE PROCESSING METHOD

FIELD OF THE INVENTION

The present invention relates to an image processing apparatus and image processing method, which generates a mixed reality space image formed by superimposing an image on a real space and that on a virtual space.

BACKGROUND OF THE INVENTION

By superimposing an image of a virtual object generated in a computer onto an image on a real space, which is sensed using an image sensing device such as a camera or the like that can sense a still image or moving image, an image on a mixed reality space can be generated. This image can be presented to the user by displaying it on a display screen of a display device.

When the user wants to acquire the image on the mixed reality space in some form, in a conventional method, a screen shot of that display screen is further taken using an image sensing device such as a camera or the like, and is stored as digital data or is printed on a film, thus acquiring the image displayed on the screen.

However, with this method, since the image displayed on the display device is sensed, the obtained image has poor image quality, and undesirably includes the display device itself.

Furthermore, it is nearly impossible to sense the image on the mixed reality space, which has a viewpoint position and visual axis direction that the photographer wants. Moreover, it is very difficult to acquire an interesting image that allows to understand interactions between the observer and virtual objects.

SUMMARY OF THE INVENTION

In order to achieve the above object, for example, an image processing apparatus of the present invention comprises the following arrangement.

That is, an image processing apparatus which is connected to a print unit adapted to print an image, and can output an image to be printed to the print unit, is comprising:

image sensing unit adapted to capture an image of a real space;
 generation unit adapted to generate an image of a virtual space in accordance with a position and orientation of the image sensing unit, which serves as a viewpoint of the virtual space, on a coordinate system shared by the real space and the virtual space;
 storage unit adapted to superpose and storing the image of the real space captured by the image sensing unit and the image of the virtual space generated by the generation unit to store a mixed reality space image formed by superposing the two images;
 instruction unit adapted to instruct whether or not the mixed reality space image stored in the storage unit is to be printed; and
 output unit adapted to output the mixed reality space image stored in the storage unit to the print unit upon reception of a print instruction of the mixed reality image from the instruction unit.

In order to achieve the above object, for example, an image processing apparatus of the present invention comprises the following arrangement.

That is, an image processing apparatus, which is connected to a plurality of apparatuses each of which generates a mixed reality space image formed by superimposing images of a virtual space and real space, is connected to a print unit adapted to print an image, and can output an image to be printed to the print unit, is comprising:

selection unit adapted to select a desired one of the plurality of apparatuses;
 instruction unit adapted to instruct whether or not the mixed reality space image obtained from the apparatus selected by the selection unit is to be printed; and
 output unit adapted to output the mixed reality space image to the print unit upon reception of a print instruction of the mixed reality image from the instruction unit.

In order to achieve the above object, for example, an image processing method of the present invention comprises the following arrangement.

That is, an image processing method to be executed by an image processing apparatus which is connected to a print unit adapted to print an image, and can output an image to be printed to the print unit, is comprising:

an image sensing step of capturing an image of a real space using image sensing unit;
 a generation step of generating an image of a virtual space in accordance with a position and orientation of the image sensing unit, which serves as a viewpoint of the virtual space, on a coordinate system shared by the real space and the virtual space;
 a storage step of superposing and storing the image of the real space captured in the image sensing step and the image of the virtual space generated in the generation step to store a mixed reality space image formed by superposing the two images in a memory;
 an instruction step of instructing whether or not the mixed reality space image stored in the memory is to be printed; and
 an output step of outputting the mixed reality space image stored in the memory to the print unit upon reception of a print instruction of the mixed reality image from the instruction step.

In order to achieve the above object, for example, an image processing method of the present invention comprises the following arrangement.

That is, an image processing method to be executed by an image processing apparatus, which is connected to a plurality of apparatuses each of which generates a mixed reality space image formed by superimposing images of a virtual space and real space, is connected to a print unit for printing an image, and can output an image to be printed to the print unit, is comprising:

a selection step of selecting a desired one of the plurality of apparatuses;
 an instruction step of instructing whether or not the mixed reality space image obtained from the apparatus selected in the selection step is to be printed; and
 an output step of outputting the mixed reality space image to the print unit upon reception of a print instruction of the mixed reality image from the instruction step.

In order to achieve the above object, for example, an image processing apparatus of the present invention comprises the following arrangement.

That is, an image processing apparatus which is connected to a print unit adapted to print an image, and can output an image to be printed to the print unit, is comprising:

image sensing unit adapted to capture a real space image;
 generation unit adapted to generate a virtual space image according to a viewpoint position and orientation on a coordinate system shared by real and virtual spaces to have the image sensing unit as a viewpoint on the virtual space;

composition unit adapted to superimpose the real space image captured by the image sensing unit and the virtual space image generated by the generation unit;

display unit adapted to display a mixed reality space image obtained by the composition unit; and instruction unit adapted to give, to the print unit, an output instruction of the mixed reality space image composited by the composition unit, and in that the generation unit has a plurality of calculation methods and sequences for generating the virtual space image, and when the instruction is received from the instruction unit, the generation unit re-generates a virtual space image using a second calculation method and sequence, which are different from a first calculation method and sequence used to generate the virtual space image, the composition unit re-composites a mixed reality space image from the re-generated virtual space image and the real space image, and the print unit prints the re-composited mixed reality space image on a medium.

In order to achieve the above object, for example, an image processing apparatus of the present invention comprises the following arrangement.

That is, an image processing apparatus which is connected to a print unit adapted to print an image, and can output an image to be printed to the print unit, is comprising:

image sensing unit adapted to capture a real space image;

generation unit adapted to generate a virtual space image according to a viewpoint position and orientation on a coordinate system shared by real and virtual spaces to have the image sensing unit as a viewpoint on the virtual space;

composition unit adapted to superimpose the real space image captured by the image sensing unit and the virtual space image generated by the generation unit;

display unit adapted to display a mixed reality space image obtained by the composition unit; and instruction unit adapted to give, to the print unit, an output instruction of the mixed reality space image composited by the composition unit, and in that the generation unit has a plurality of data sets for generating the virtual space image, and when the instruction is received from the instruction unit, the generation unit re-generates a virtual space image using a second data set, which is different from a first data set used to generate the virtual space image, the composition unit re-composites a mixed reality space image from the re-generated virtual space image and the real space image, and the print unit prints the re-composited mixed reality space image on a medium.

In order to achieve the above object, for example, an image processing apparatus of the present invention comprises the following arrangement.

That is, an image processing apparatus which is connected to a print unit adapted to print an image, and can output an image to be printed to the print unit, is comprising:

image sensing unit adapted to capture a real space image;

generation unit adapted to generate a virtual space image according to a viewpoint position and orientation on a coordinate system shared by real and virtual spaces to have the image sensing unit as a viewpoint on the virtual space;

composition unit adapted to superimpose the real space image captured by the image sensing unit and the virtual space image generated by the generation unit;

display unit adapted to display a mixed reality space image obtained by the composition unit;

instruction unit adapted to give, to the print unit, an output instruction of the mixed reality space image composited by the composition unit; and determination unit adapted to check a positional relationship among the image sensing unit, a real space object, and a virtual space object on the coordinate system, and determining whether or not the real space object is occluded by the virtual space object in the mixed reality space image, and in that the generation unit re-generates a virtual space image using a second calculation method and sequence, which are different from a first calculation method and sequence used to generate the virtual space image, in accordance with a result of the determination unit, the composition unit re-composites a mixed reality space image from the re-generated virtual space image and the real space image, and the print unit prints the re-composited mixed reality space image on a medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 35 shows an example of a mixed reality image on a paper medium output;

FIG. 40 shows an example of a mixed reality image on a paper medium output in the ninth embodiment;

FIG. 44 shows a format example of a mixed reality object table;

FIG. 45 shows entry example 1 of the mixed reality object table;

FIG. 46 shows entry example 2 of the mixed reality object table;

FIG. 47 shows entry example 3 of the mixed reality object table;

FIG. 49 shows the format of an object relationship table in the ninth embodiment;

FIG. 50 shows an entry example of the object relationship table in the ninth embodiment;

FIG. 53 shows a format of an object relationship table in the 10th embodiment;

DETAILED DESCRIPTION OF THE PREFERRED EMBODIMENTS

Preferred embodiments of the present invention will now be described in detail in accordance with the accompanying drawings.

First Embodiment

Figure 1:
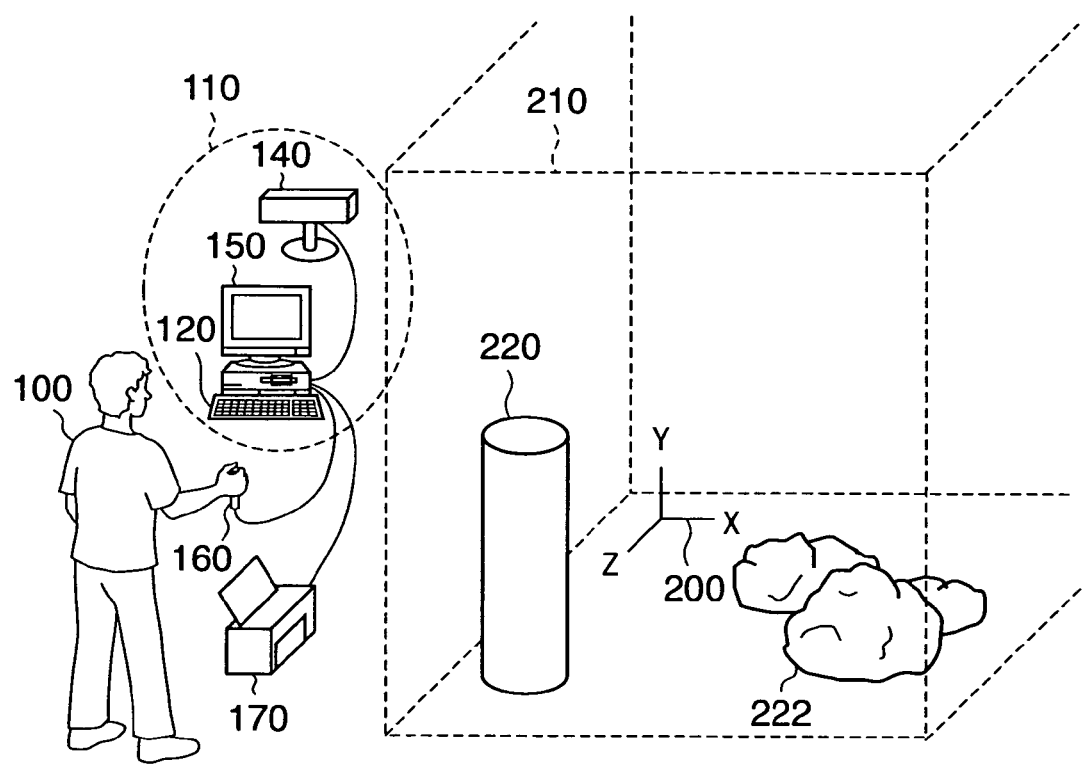
FIG. 1 shows an observer, and the arrangement of a system according to the first embodiment of the present invention, which allows the observer to acquire an image of a mixed reality space.

FIG. 1 shows an observer, and the arrangement of a system according to this embodiment, which allows this observer to acquire an image of a mixed reality space. Reference numeral 100 denotes an observer who observes a mixed reality space image. Reference numeral 110 denotes an image processing apparatus, which generates a mixed reality space image for one observer. The image processing apparatus 110 comprises a personal computer (PC) 120, a video camera 140 used to capture a moving image of a real space, and a monitor 150. On the PC 120, a virtual space management program and mixed reality space image generation program are running.

The virtual space management program has a function of updating the state of a virtual space, and notifying the mixed reality space image generation program of the update result when it is executed by the PC 120. Upon being executed by the PC 120, the mixed reality space image generation program renders a virtual space image on a memory on the basis of the state of the virtual space notified by the virtual space management program, and composites a real space image captured by the video camera 140 on the virtual space image rendered on the memory. That is, a mixed reality space image is rendered on the memory. The mixed reality space image rendered on the memory is displayed on the monitor 150.

The observer 100 can observe the mixed reality space image by viewing that displayed on the monitor 150. Note that the monitor 150 displays not only the mixed reality space image, but also information required upon operating the PC 120 (system messages, a system setup window, and the like).

The observer 100 holds a shutter 160. The shutter 160 comprises a push-button switch. When the observer 100 has pressed the switch, the shutter 160 outputs a signal indicating depression to the PC 120. Upon detection of this signal, the PC 120 outputs a mixed reality space image stored in its memory at the time of detection to a printer 170.

The printing system of the printer 170 is not particularly limited, as long as it can print a mixed reality space image sent from the PC 120 on a print medium such as a paper sheet, OHP film, or the like.

Reference numeral 200 denotes a coordinate system, which is defined in advance, and is used to determine the position of a real space where a virtual object is to be set. The coordinate system 200 is shared by the real space and virtual space. Since the coordinate system setting method is known to those who are skilled in the art as a technique for generating a mixed reality space, a detailed description thereof will be omitted.

Reference numeral 210 denotes a mixed reality space image generation region. That is, the positions and shapes of real objects which are present within this region are managed by the PC 120, and whether or not a real object and virtual object overlap each other can be detected within this region. Data indicating the position and size of this region is recorded on a memory of the PC 120. Reference numerals 220 and 222 denote real objects, which are exemplified as a stone pillar and rocks. However, the present invention is not limited to such specific real objects. An image of a virtual object is included in a virtual space image, and is an image of the shape of the virtual object, which is seen in accordance with the position/orientation of a viewpoint on the virtual space, which corresponds to the video camera 140. When the image of the virtual space is a moving image, the latest image (latest frame image) is always rendered on the memory of the PC 120. Data indicating the position/orientation of the video camera 140 is stored in a memory 122.

Figure 2:
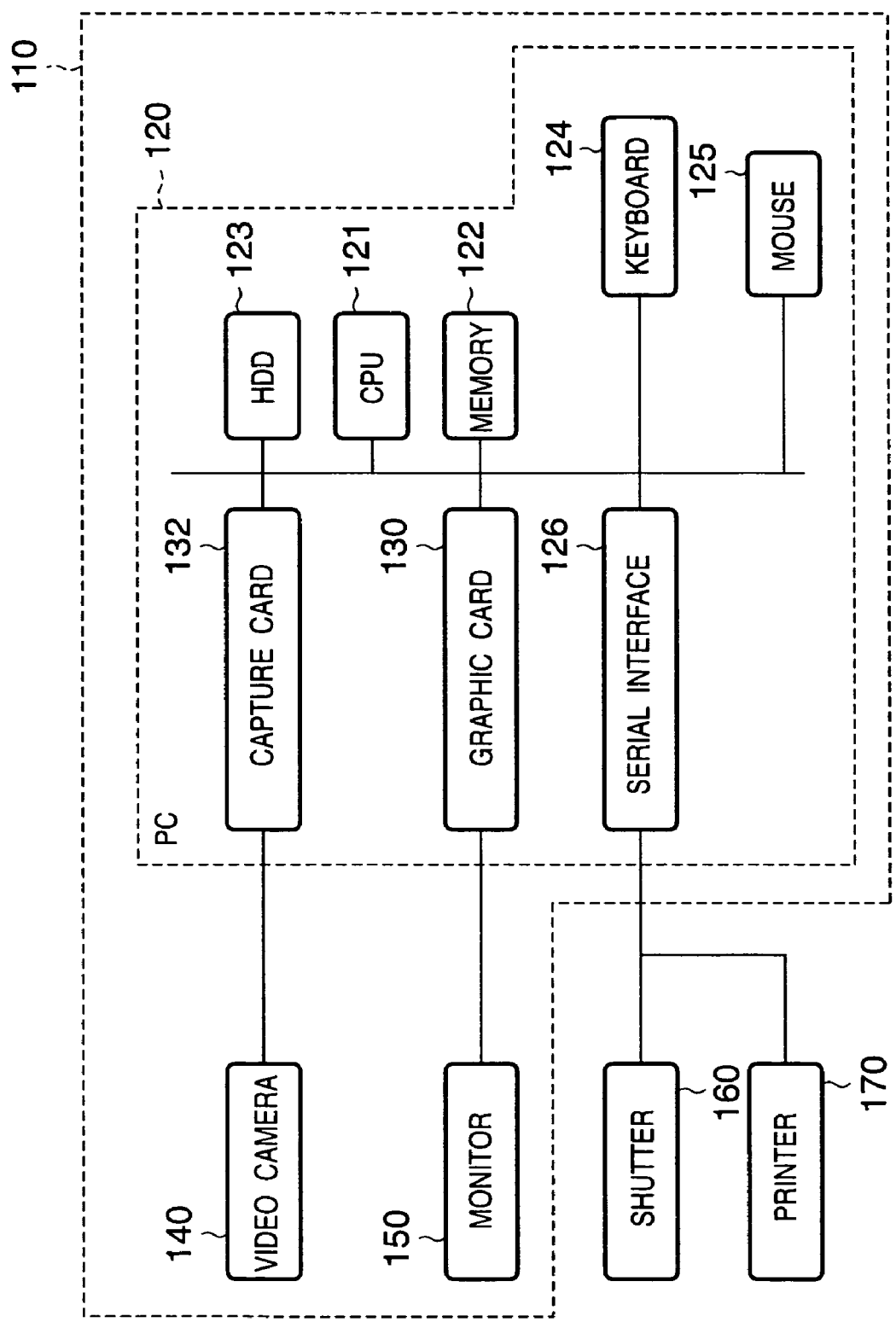
FIG. 2 is a block diagram showing the basic arrangement of an image processing apparatus 110, and the relationship with a shutter 160 and printer 170.

FIG. 2 is a block diagram showing the basic arrangement of the image processing apparatus 110, and the relationship with the shutter 160 and printer 170. The image processing apparatus 110 is roughly divided into the PC 120, video camera 140, and monitor 150, as described above.

The PC 120 comprises a capture card 132, graphic card 130, serial I/F 126, HDD 123, CPU 121, memory 122, keyboard 124, and mouse 125.

The capture card 132 serves as an interface used to connect the PC 120 and video camera 140, and each frame image of the real space captured by the video camera 130 is transferred to the memory 122 via the capture card 132.

The graphic card 130 has a function of generating three-dimensional computer graphics (3DCG) data as an image of the virtual object.

The serial I/F 126 serves as an interface used to connect the PC 120, and the shutter 160 and printer 170 (to be described later). The PC 120 can receive a signal indicating depression of the button from the shutter 160 via the serial I/F 126, and can send a mixed reality space image to be printed to the printer 170 via the serial I/F 126.

The HDD 123 saves programs and data required to control the overall PC 120, a printer driver required to control the printer 170, the virtual space management program and mixed reality space image generation program, a data group such as position data, shape data, and the like of virtual objects, which are required to generate images of the virtual objects, data indicating the state of the virtual space, and the like. These programs and data are loaded onto the memory 122 by the CPU 121.

The CPU 121 controls respective units of the PC 120 by executing the programs loaded on the memory 122 and by referring to the data loaded on the memory 122, thus generating a mixed reality space image and controlling the overall PC 120. The memory 122 allows read/write access. The memory 122 has an area for temporarily storing a program to be executed by the CPU 121, which is loaded from the HDD 123, and data used upon executing the program, and also a work area which is used by the CPU 121 upon executing respective processes. Of course, the memory 122 has an area on which a mixed reality space image as an image formed by superimposing the virtual and real space images is to be rendered, as described above.

The keyboard 124 and mouse 125 are used as pointing devices for inputting various instructions to the CPU 121, and are used to input, e.g., the layout position of each virtual object, state setups of the virtual space, and the like.

As described above, the video camera 140 is connected to the capture card 132. The video camera 140 captures a moving image of the real space, and outputs each captured frame image to the memory 122 via the capture card 132.

The monitor 150 is connected to the graphic card 130, as described above. The monitor 150 comprises a CRT, liquid crystal display, or the like. The monitor 150 displays 3DCG images generated by the graphic card 130, and also the moving image of the real space which is captured by the video camera 140 and is superimposed on the 3DCG images. That is, the monitor 150 displays a mixed reality space image. As described above, the monitor 150 displays not only the mixed reality space image but also information required upon operating the PC 120 (system messages, a system setup window, and the like).

The process implemented when the PC 120 with the above arrangement executes the virtual space management program will be explained below using FIG. 3 which is a flow chart of that process.

The CPU 121 updates data indicating the state of the virtual space stored in the memory 122 in accordance with state information (e.g., the number and types of virtual objects, the intensity and color of light in the virtual space, weather, and the like) of the virtual space, which is input using the keyboard 124, mouse 125, and the like (step S302). Note that the virtual space management program may update data indicating the state of the virtual space sequentially or at given time intervals in accordance with an elapsed time in this step.

The CPU 121 notifies the mixed reality space image generation program of the data indicating the updated state of the virtual space (step S304). More specifically, the CPU 121 stores that data in the memory 122, and launches the mixed reality space image generation program. Upon completion of the update process, this process ends.

Figure 4:
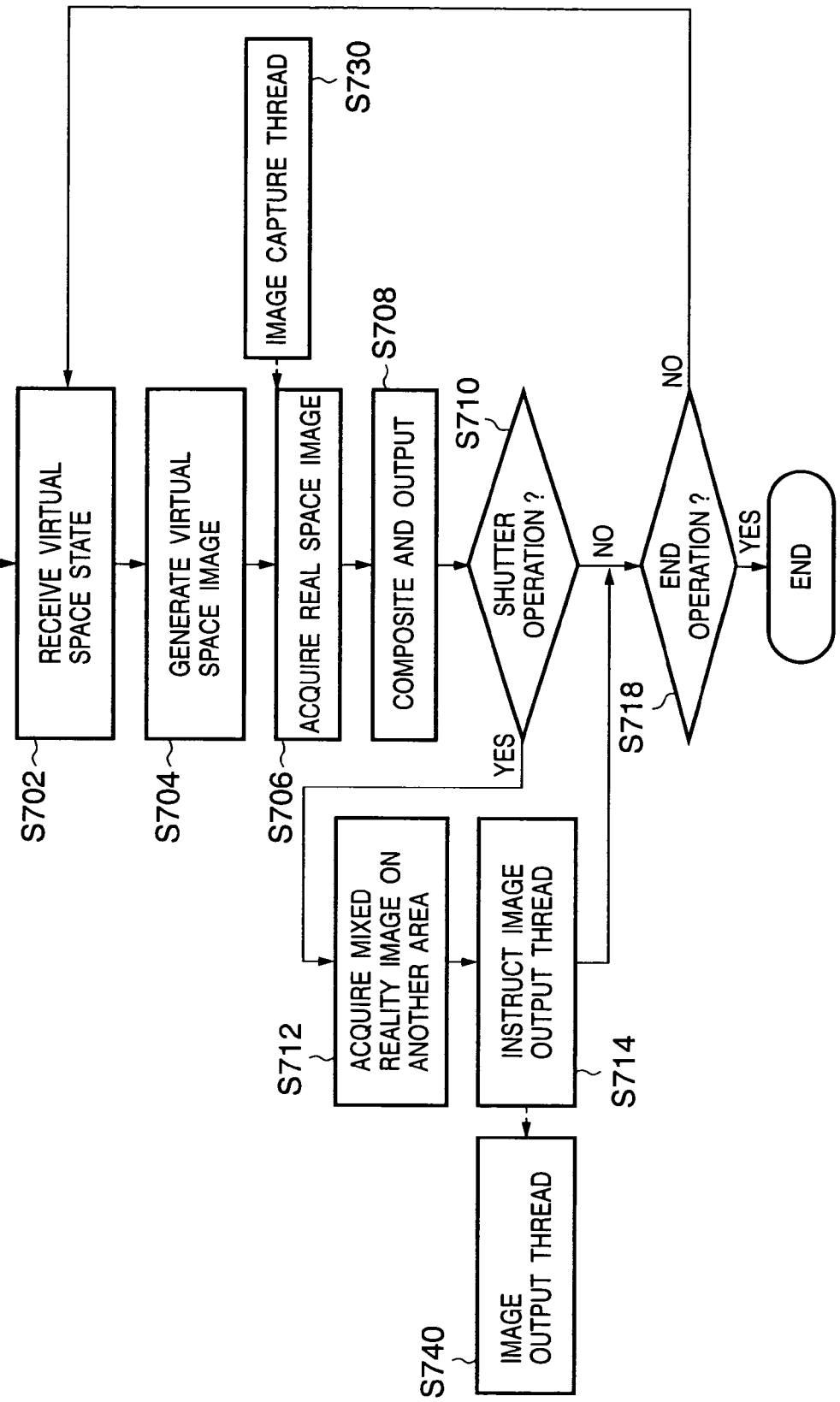
FIG. 4 is a flow chart of a process implemented when the PC 120 executes a mixed reality space image generation program.

The process implemented when the PC 120 with the above arrangement executes the mixed reality space image generation program will be explained below using FIG. 4 which is a flow chart of that process.

The CPU 121 reads the data which is stored in the memory 122 and indicates the state of the virtual space (step S702), and sends a virtual space image rendering instruction to the graphic card 130. The graphic card 130 generates a virtual space image in accordance with the position/orientation of the video camera 140 using the data indicating the state of the virtual space, 3DCG data loaded from the HDD 123 onto the memory 122, and data indicating the position/orientation of the video camera 140 (step S704). That is, the graphic card 130 renders a virtual space image on the memory 122.

Next, the CPU 121 acquires a real space image which is intermittently sent from an image capture thread (step S730) and is captured by the video camera 140 (step S706). Note that this program is implemented by applying threads as one of parallel programming techniques, and always acquires the latest real space image. The graphic card 130 superimposes the acquired real space image on the virtual space image rendered on the memory 122 to generate a mixed reality space image on the memory 122, and then outputs that image to the monitor 150 (step S708).

If the CPU 121 detects a signal indicating that the button has been pressed from the shutter 160, the flow advances to step S712, and the CPU 121 copies a mixed reality space image rendered on the memory 122 at that time to an area of the memory 122, which is different from the area on which the mixed reality space image is rendered (step S712). The CPU 121 then notifies an image output thread of the location (address) on the memory 122 where the copied mixed reality space image data is stored (step S714).

The image output thread acquires the mixed reality space image data stored at that address, and outputs the acquired data to the printer 170 (step S740). As a result, the printer 170 prints the mixed reality space image on a print medium such as a paper sheet, OHP film, or the like.

Note that the setting position and direction of the video camera 140 are expressed by a coordinate value and orientation value determined by the coordinate system 220, are measured in advance, and are set as initial values of the mixed reality space image generation program (they are stored as data on the memory 122, as described above). When the viewpoint position and orientation of a mixed reality space image to be acquired (the setting position and orientation of the video camera 140) are to be changed, the position and direction of the video camera 140 on the coordinate system 220 may be measured to change initial setups.

As described above, the system of this embodiment can acquire a mixed reality space image at an arbitrary viewpoint using a print medium such as a paper sheet, OHP film, or the like.

Second Embodiment

The system according to the first embodiment allows only one observer to acquire a mixed reality space image. A system according to this embodiment allows a plurality of observers to acquire mixed reality space images based on different viewpoints for respective observers. The system according to this embodiment will be described below.

Figure 5:
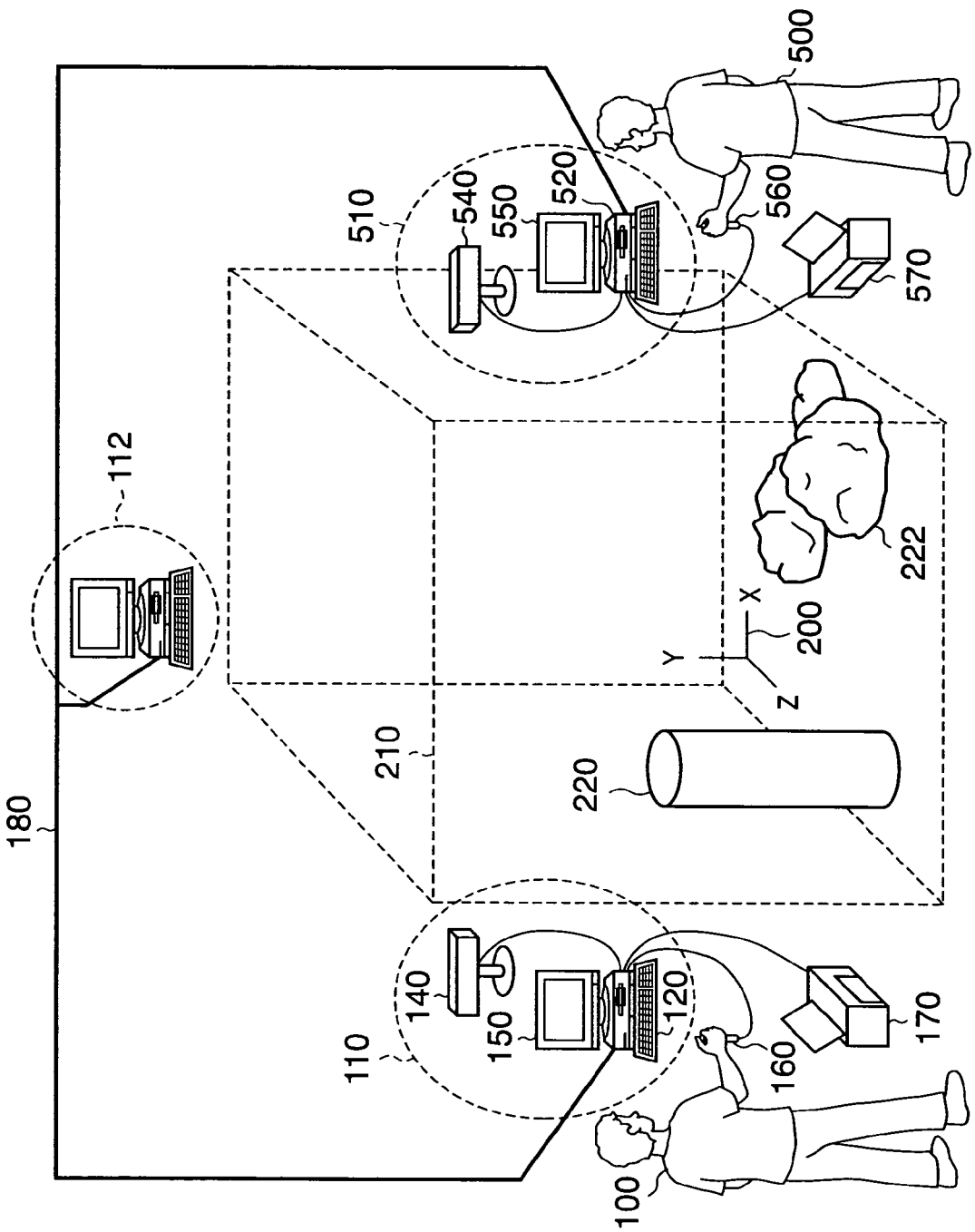
FIG. 5 shows the arrangement of a system according to the second embodiment of the present invention.

FIG. 5 shows the arrangement of the system according to this embodiment. The same reference numerals in FIG. 5 denote the same parts as in FIG. 1, and a description thereof will be omitted. Systems that respectively allow the observer 100 and an observer 500 to acquire mixed reality space images have the same arrangement as that of the first embodiment. That is, the same system (a system comprising an image processing apparatus 510 including a video camera 540, monitor 550, and PC 520, printer 570, and shutter 560) as that (the system comprising the image processing apparatus 110 including the video camera 140, monitor 150, and PC 120, printer 170, and shutter 160) equipped for the observer 100 is equipped for the observer 500. The PCs equipped for the respective observers are connected via a network 180 such as a LAN, Internet, or the like.

In the system according to this embodiment, the virtual space management program runs not on the PCs equipped for the respective observers but on an image processing apparatus 112 connected to the network 180. Hence, the image processing apparatus 112 updates the state of the virtual space, as described in the first embodiment, and the respective PCs 120 and 520 acquire the update result of the virtual space management program which runs on the image processing apparatus 112 via the network 180, and generate virtual space images corresponding to the positions/orientations of the video cameras 140 and 540 connected to them using the acquired update result.

In this way, mixed reality space images generated by respective PCs are generated based on different viewpoint positions and orientations while sharing an identical mixed reality space.

Figure 6:
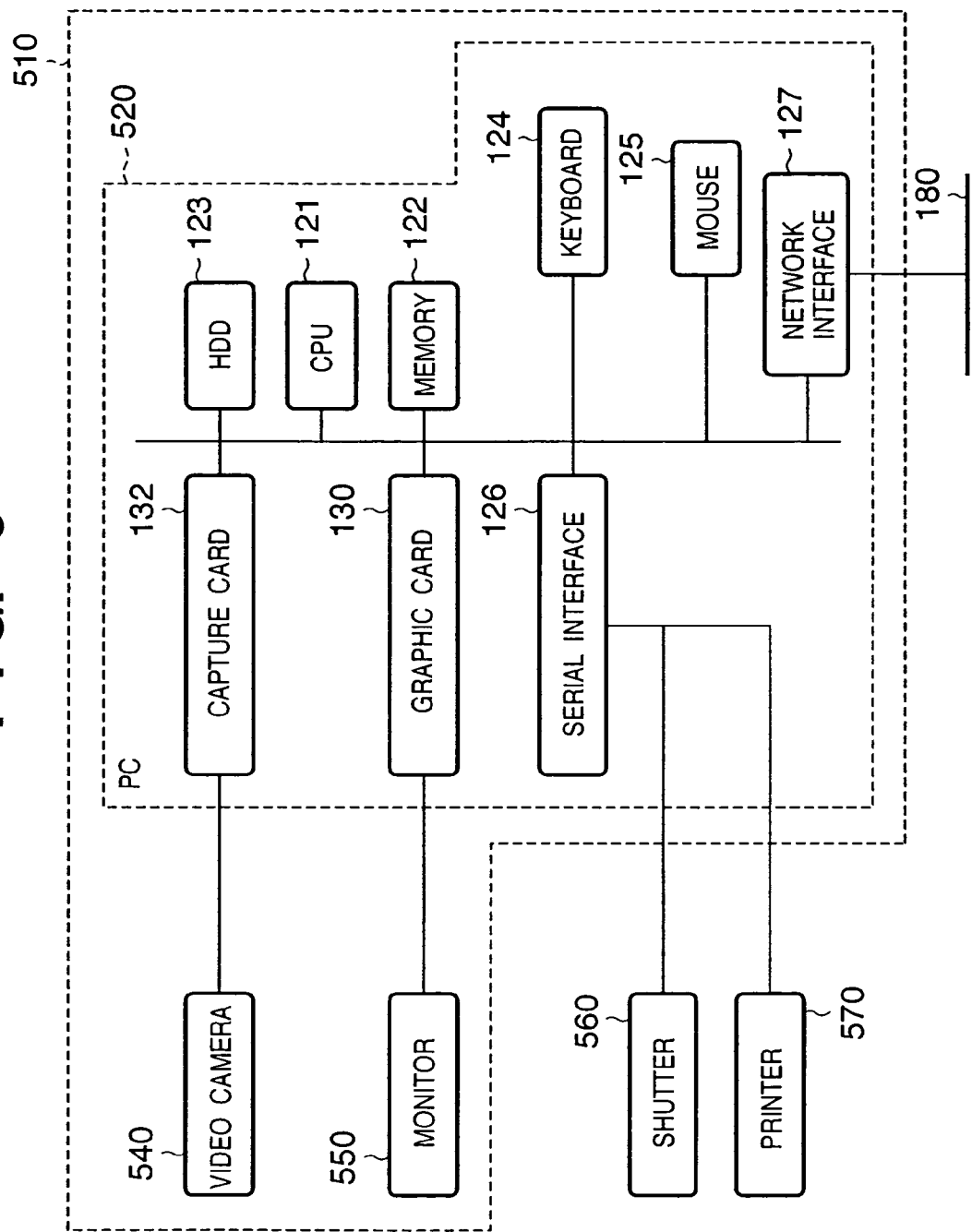
FIG. 6 is a block diagram showing the basic arrangement of an image processing apparatus 510, and the relationship with a shutter 560 and printer 570.

FIG. 6 is a block diagram showing the basic arrangement of the image processing apparatus 510, and the relationship with the shutter 560 and printer 570. The arrangement shown in FIG. 6 is basically the same as that shown in FIG. 2, except that a network I/F 127 required to connect the PC 520 to the network 180 is added. Data indicating the update result of the virtual space management program, which runs on the image processing apparatus 112, can be received via this network I/F 127.

Note that FIG. 6 shows the arrangement of the system equipped for the observer 100, but the system equipped for the observer 500 has the same arrangement, as described above.

Figure 7:
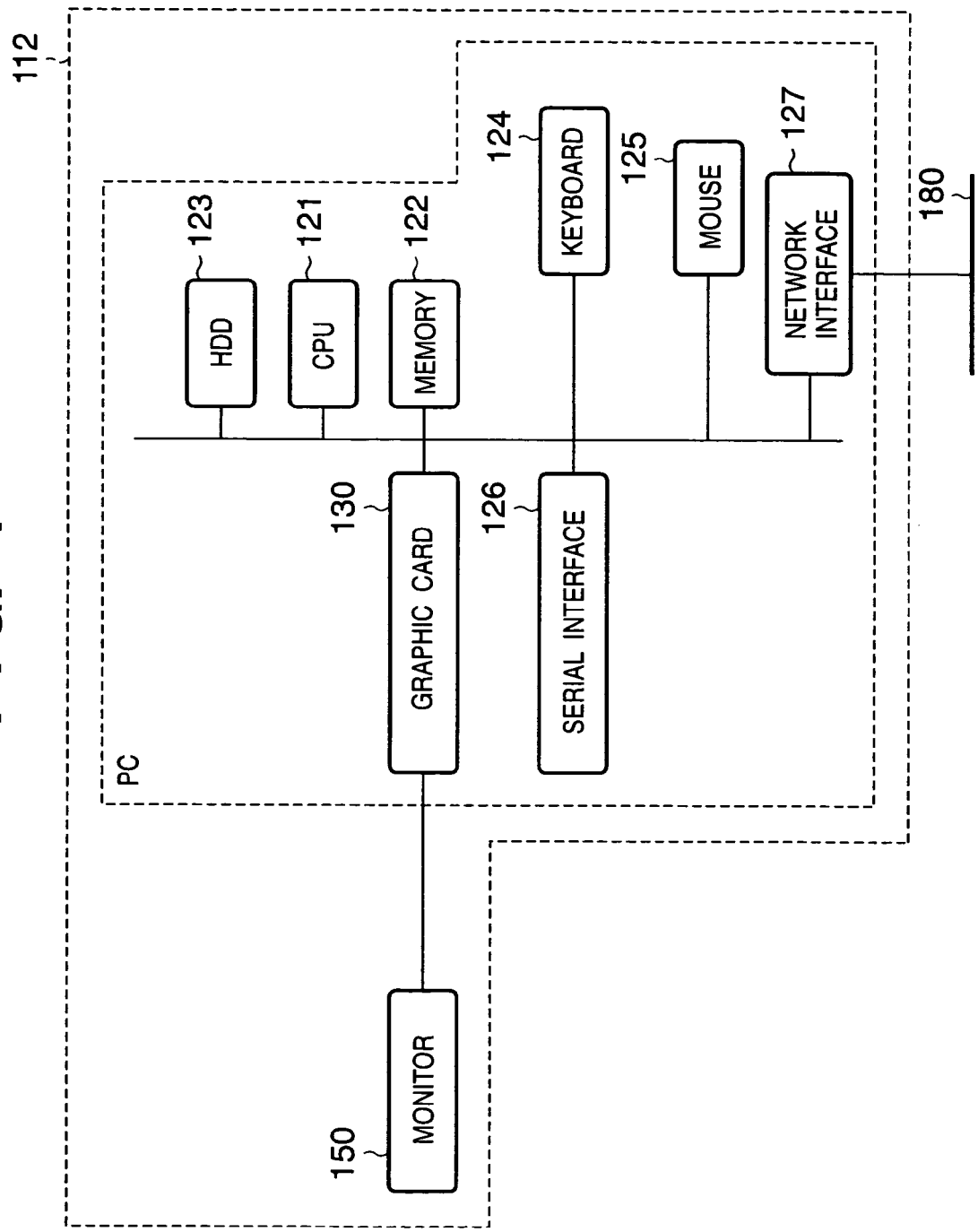
FIG. 7 is a block diagram showing the arrangement of an image processing apparatus 112.

FIG. 7 shows the arrangement of the image processing apparatus 112. The image processing apparatus 112 has an arrangement obtained by removing the video camera, shutter, and printer from that of the image processing apparatus 510. The same reference numerals in FIG. 7 denote the same parts as in FIG. 1, and a description thereof will be omitted.

Figure 3:
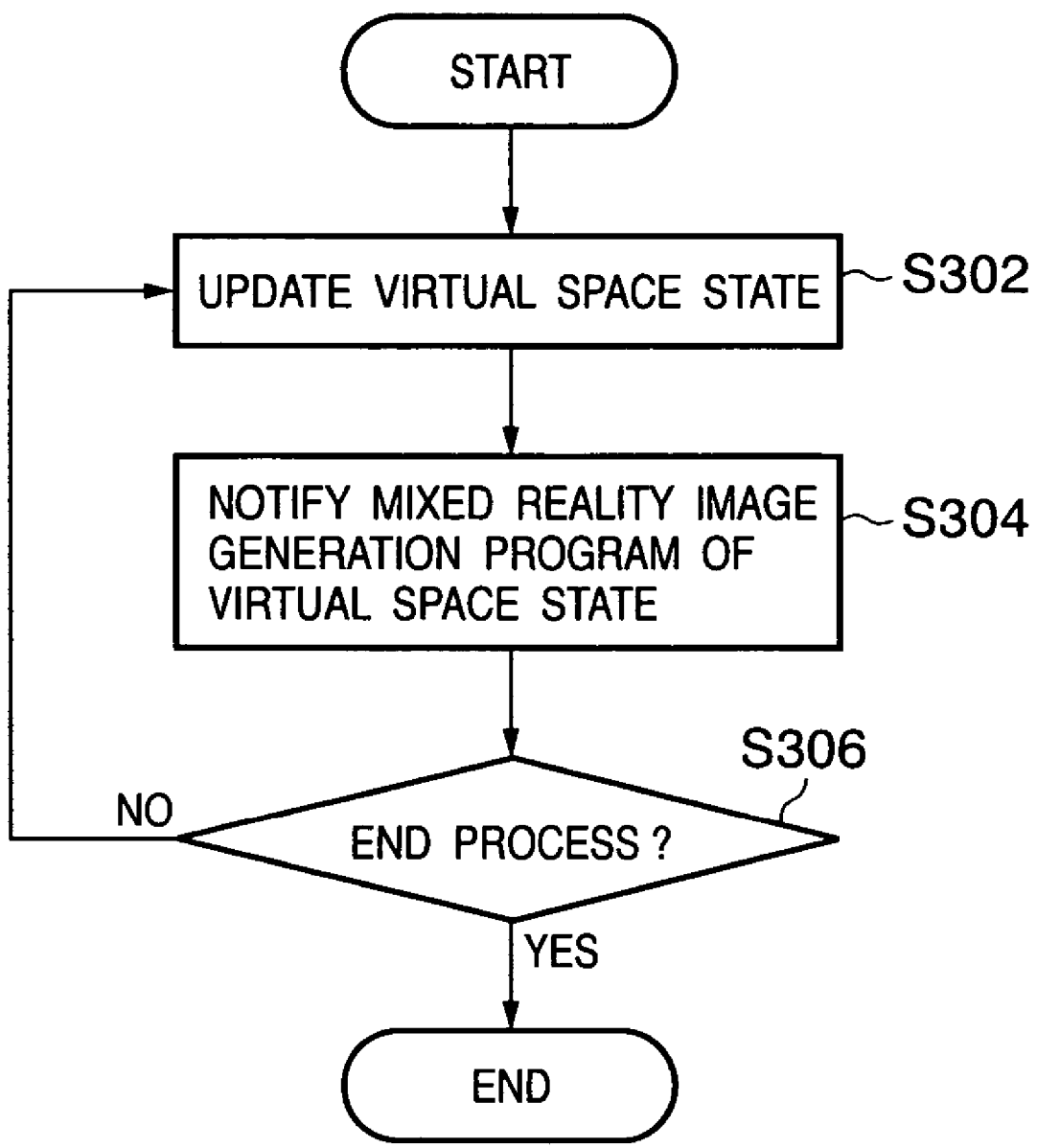
FIG. 3 is a flow chart of a process implemented when a PC 120 executes a virtual space management program.

The image processing apparatus 112 executes a process according to the flow chart shown in FIG. 3. Also, the PCs 120 and 520 execute processes according to the flow chart shown in FIG. 4.

The number of systems equipped for respective observers is not limited to two. When three or more systems are equipped, a larger number of observers can acquire mixed reality space images.

As described above, the system of this embodiment allows a plurality of observers to acquire mixed reality space images at different viewpoints and orientations using print media such as paper sheets, OHP films, or the like.

Since not only a plurality of observers can observe an identical mixed reality space at the same time, and each of the systems equipped for the respective observers has a shutter and printer, these observers can simultaneously acquire mixed reality space images using print media such as paper sheets, OHP films, or the like.

Third Embodiment

A system according to this embodiment comprises an arrangement for presenting a mixed reality space image to an arbitrary observer not via the monitor 160 but via a head-mounted display (HMD) 400 with an image sensing device in the system explained in the second embodiment.

Figure 8:
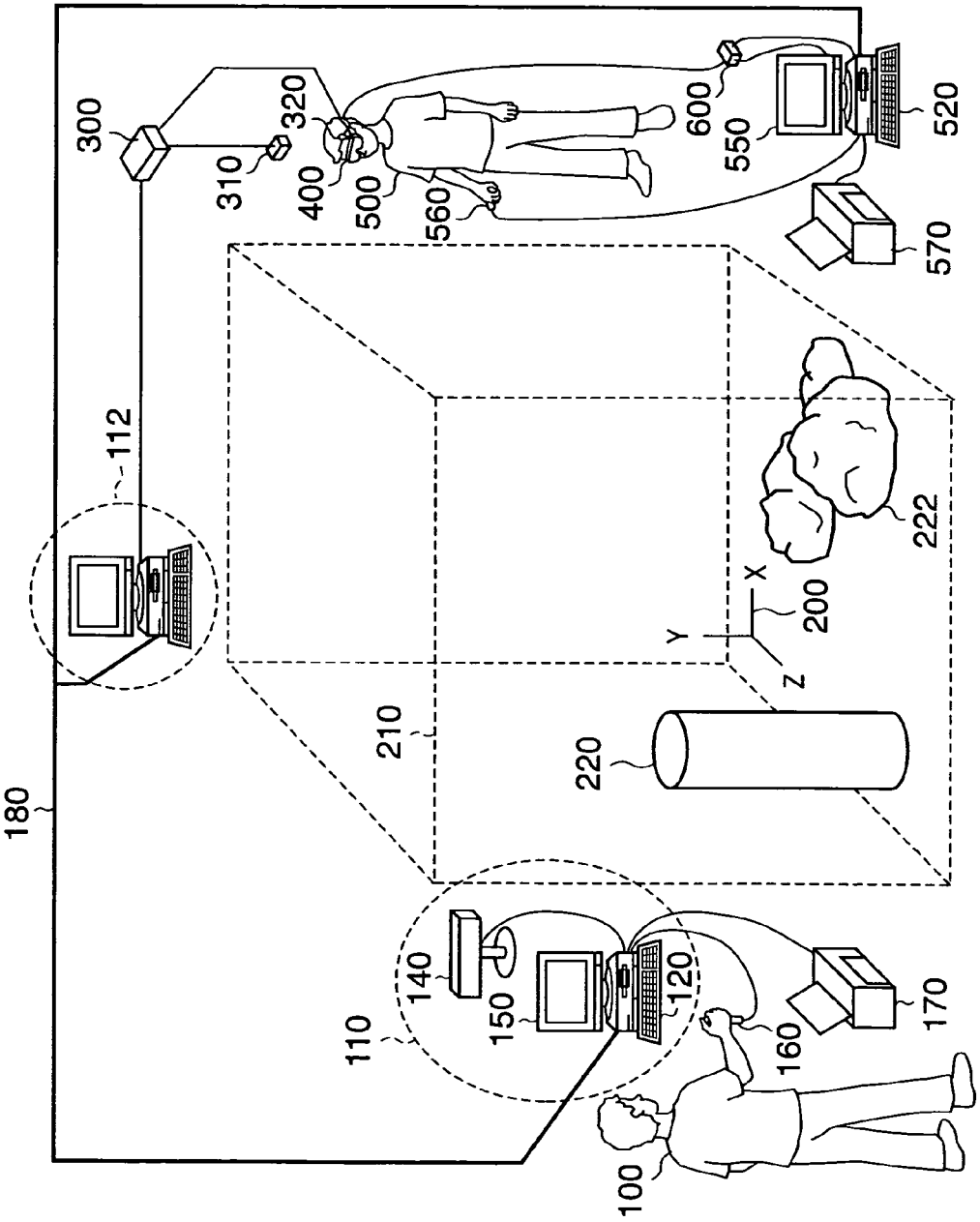
FIG. 8 shows the arrangement of a system according to the third embodiment of the present invention.

FIG. 8 shows the arrangement of the system according to this embodiment. The same reference numerals in FIG. 8 denote the same parts as those in FIG. 5 which shows the arrangement of the system according to the second embodiment, and a description thereof will be omitted. This embodiment exemplifies a case wherein a mixed reality space image is presented to the observer 100 using the same arrangement and method as those in the second embodiment, and a mixed reality space image is presented to the observer 500 using the HMD 400. A system (which comprises an image processing device including the PC 520, monitor 550, a distributor 600, and the HMD 400, the shutter 560, the printer 570, and a sensor system (300 to 320)) used to present a mixed reality space image to the observer 500 will be explained below.

The observer 500 wears the HMD 400 on his or her head. The HMD 400 captures a real space image according to the position and orientation on the coordinate system near the viewpoint position of the observer 500 using the image sensing device, and sends the captured real space image to the PC 520. The position and orientation of the viewpoint of the observer 500 are always measured by components 300 to 320 which forms the position/orientation sensor system, and the measurement results are sent to and managed by the image processing apparatus 112.

The PC 520 acquires the position and orientation of the viewpoint of the observer 500, which are managed by the image processing apparatus 112, and generates a virtual space image according to state information of the virtual space, which is acquired at the same time, and the position and orientation of the viewpoint of the observer 500. Also, the PC 520 generates a mixed reality space image by superposing the generated virtual space image on the real space image sent from the HMD 400.

The generated mixed reality space image is output to the monitor 550 via the distributor 600, and also to a display unit (to be described later) provided to the HMD 400, and is displayed on the monitor 550 and display unit. This is because the HMD 400 is not suited to a display device used to operate the PC 520, and a person other than the observer recognizes an image observed by the observer who wears the HMD 400.

In this way, the observer 500 can observe a mixed reality space image according to the viewpoint position and orientation at any given timing while freely changing the viewpoint position and orientation, i.e., freely walking through the mixed reality space.

The arrangement of the HMD 400 will be described below using FIGS. 9 to 11. Note that each reference numeral with "R" denotes a component for the right eye, and that with "L" denotes a component for the left eye. In the following description, "R" and "L" may be omitted if the right and left eyes need not be specified.

Figure 9:
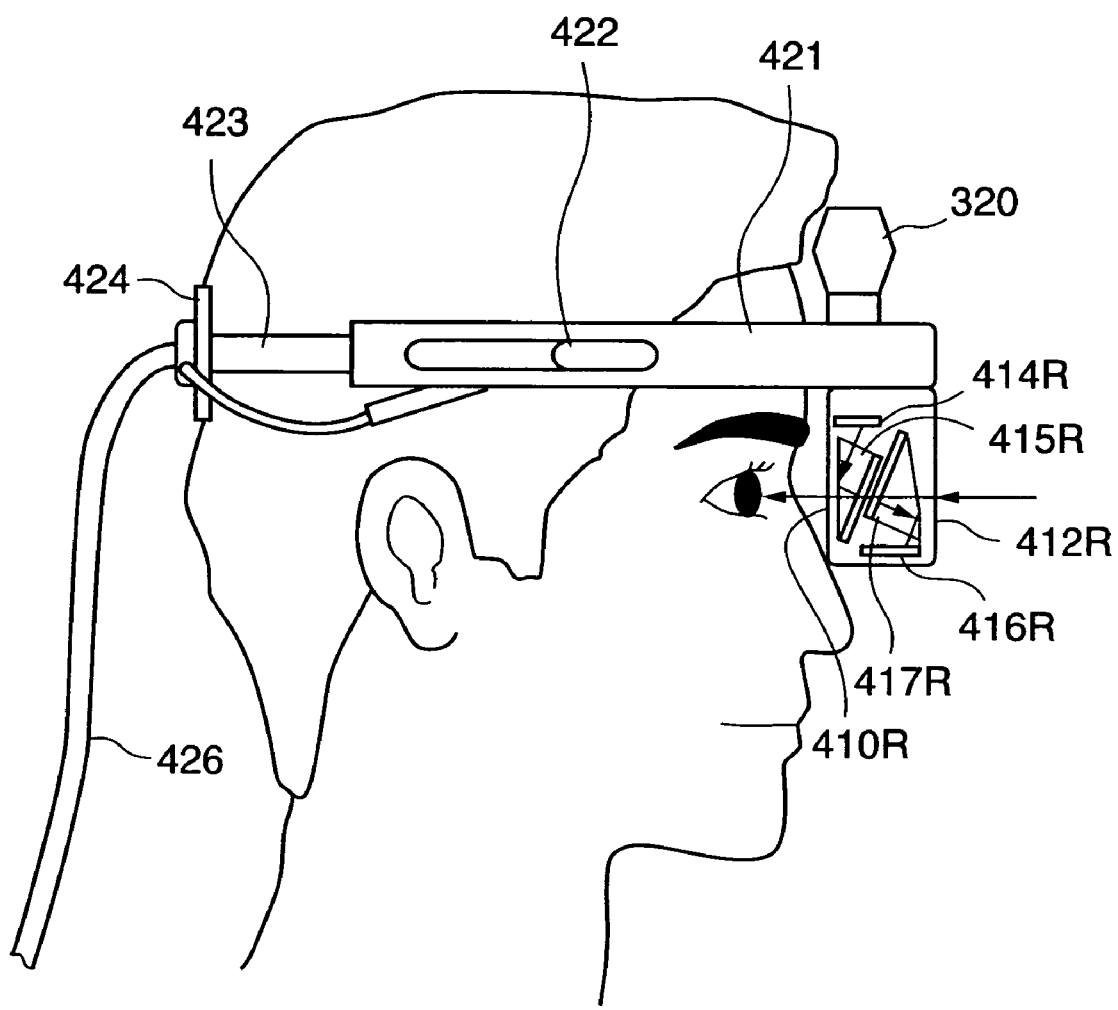
FIG. 9 shows the basic arrangement of an HMD.
Figure 10:
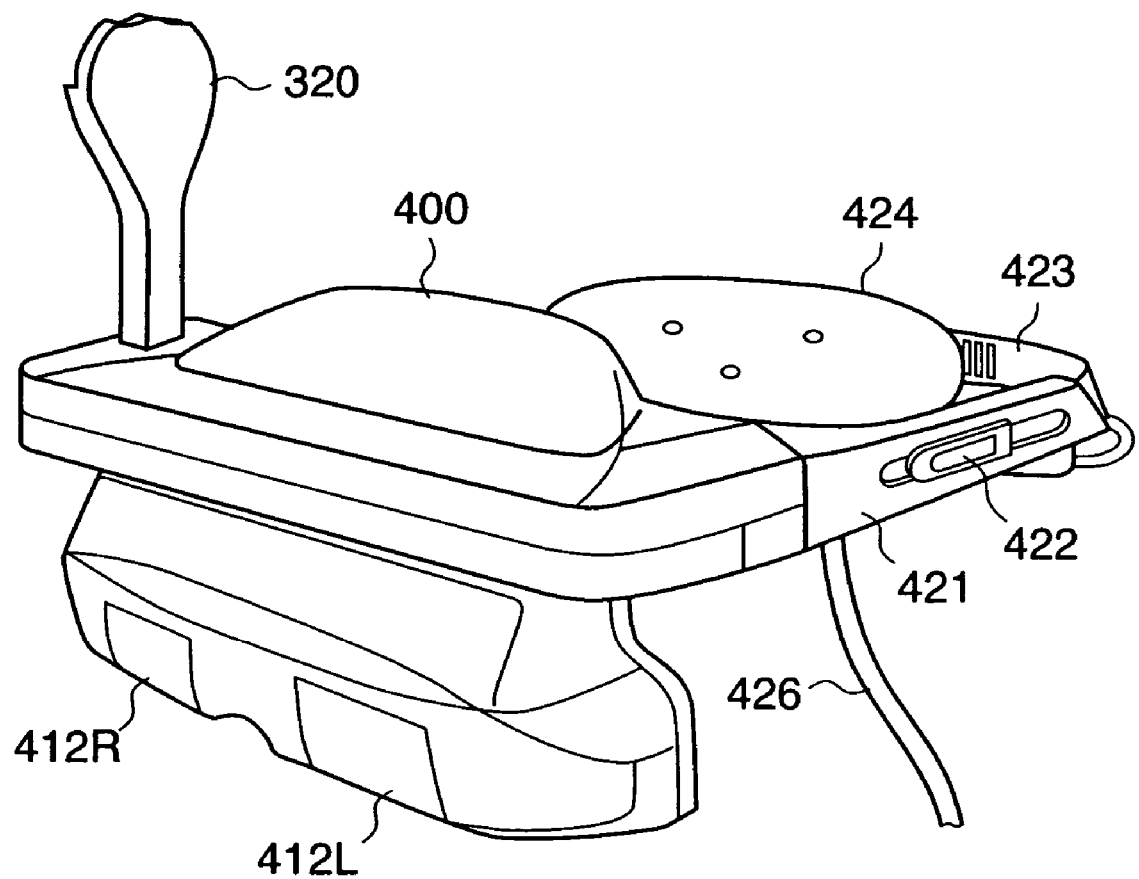
FIG. 10 is a perspective view showing the outer appearance of an HMD 400.
Figure 11:
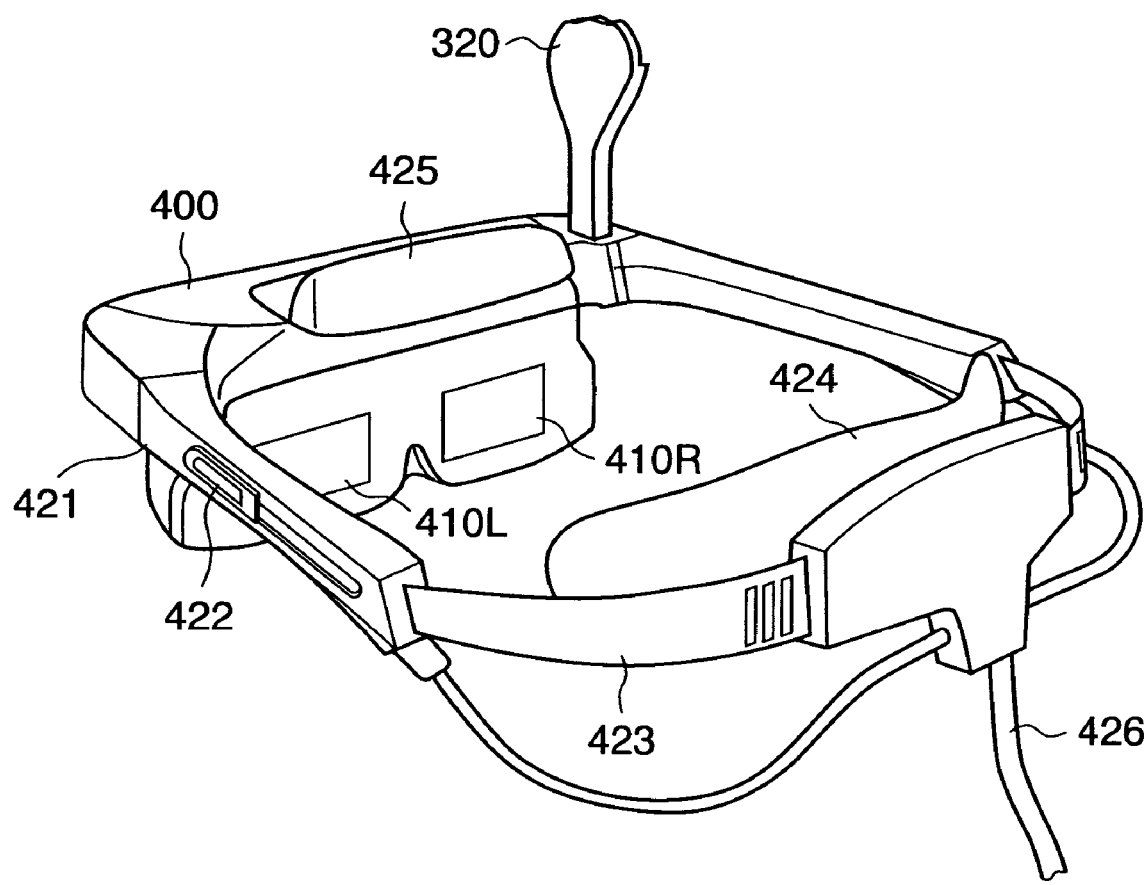
FIG. 11 is a perspective view showing the outer appearance of the HMD 400.

FIG. 9 shows the basic arrangement of the HMD, and FIGS. 10 and 11 are perspective views showing the outer appearance of the HMD 400. Reference numeral 320 denotes a position direction sensor receiver, which is provided near the viewpoint position of the observer, and operates together with a position/orientation sensor transmitter 310 and main body 300 (to be described later) to always measure the viewpoint position and orientation of the observer.

Reference numerals 410, 414, and 415 denote components which form a display system. An image displayed by each color liquid crystal display 414 is guided by each optical prism 415, and is displayed on each display unit 410. Reference numerals 412, 416, and 417 denote components which form an image sensing system. Light input from outside the HMD via each input unit 412 is guided into the HMD by each optical prism 417, and is received by each CCD 416. Output light of the optical prism 415 and input light of the optical prism 417 agree with the optical axis of the pupil of the observer. Each CCD 416 captures a real space image at the viewpoint position and orientation of the observer. Each color liquid crystal display 414 displays a mixed reality space image which is obtained by compositing, by the PC 520, a real space image acquired by the corresponding CCD 416 and a virtual space image which is generated by the PC 520 according to the viewpoint position and orientation of the observer calculated by the position/orientation sensor main body 300.

Reference numerals 421 to 425 denote building components required for the observer to wear the HMD on his or her head. In order to wear the HMD 400 on the head, the observer wears it on the head while slackening a length adjustment portion 423 by an adjuster 422. Then, he or she brings a forehead mount portion 425 into contact with the forehead, and fastens the length adjustment portion 423 by the adjuster 422 so that temporal and occipital mount portions 421 and 424 contact the temporal and occipital regions of the head. Reference numeral 426 denotes a cable that combines power supply and signal lines for the color liquid crystal displays 414, CCDs 416, and position/orientation sensor receiver 320.

The method of measuring the viewpoint position and orientation of the observer will be described below. As shown in FIG. 8, the sensor system (position/orientation acquisition device) comprises the position/orientation sensor main body 300, position/orientation sensor transmitter 310, and position/orientation sensor receiver 320. The position/orientation sensor receiver 320 and position/orientation sensor transmitter 310 are connected to the position/orientation sensor main body 300. The position/orientation sensor transmitter 310 transmits a magnetic signal, which is received by the position/orientation sensor receiver 320. The position/orientation sensor main body 300 calculates the position and orientation of the position/orientation sensor receiver 320 on the coordinate system 200 using a known technique on the basis of the strength of the magnetic signal received by the position/orientation sensor receiver 320. The calculation results are sent to the image processing apparatus 112.

Since the position/orientation sensor receiver 320 is fixed to the HMD 400, the relative position between the position/orientation sensor receiver 320 and the entrance pupil of the observer 500 who wears the HMD 400 becomes a constant. The position of the entrance pupil of the observer 500 can be calculated from this constant, and the position and orientation of the position/orientation sensor receiver 320. In this embodiment, the entrance pupil position of the observer 500 is used as his or her viewpoint position.

The HMD 400 is mounted on the observer 500, so that an image can be normally observed when the observer 500 naturally looks at a scene in front of him or her. Hence, when the observer observes an image displayed on the HMD 400, the direction of the position/orientation sensor receiver 320 and the visual axis direction of the observer 500 become constants. The visual axis direction of the observer 500 who observes the image of the HMD 400 can be calculated from the constants, and the position and orientation of the position/orientation sensor receiver 320.

These constants are measured in advance and are stored in the system.

This embodiment is achieved on the assumption that FASTRAK available from Polhemus Inc. (USA), Flock of Birds available from Ascension Technology Corporation (USA), or the like is used as the position/orientation acquisition device. However, the present invention is not limited to such specific devices, and other commercially available ultrasonic or optical position/orientation sensors may be used.

Using the HMD 400 and position/orientation measurement device described above, the observer 500 can freely and arbitrarily change his or her viewpoint position and orientation, and can observe a mixed reality space image according to the changed viewpoint position and orientation via the HMD 400.

Figure 12:
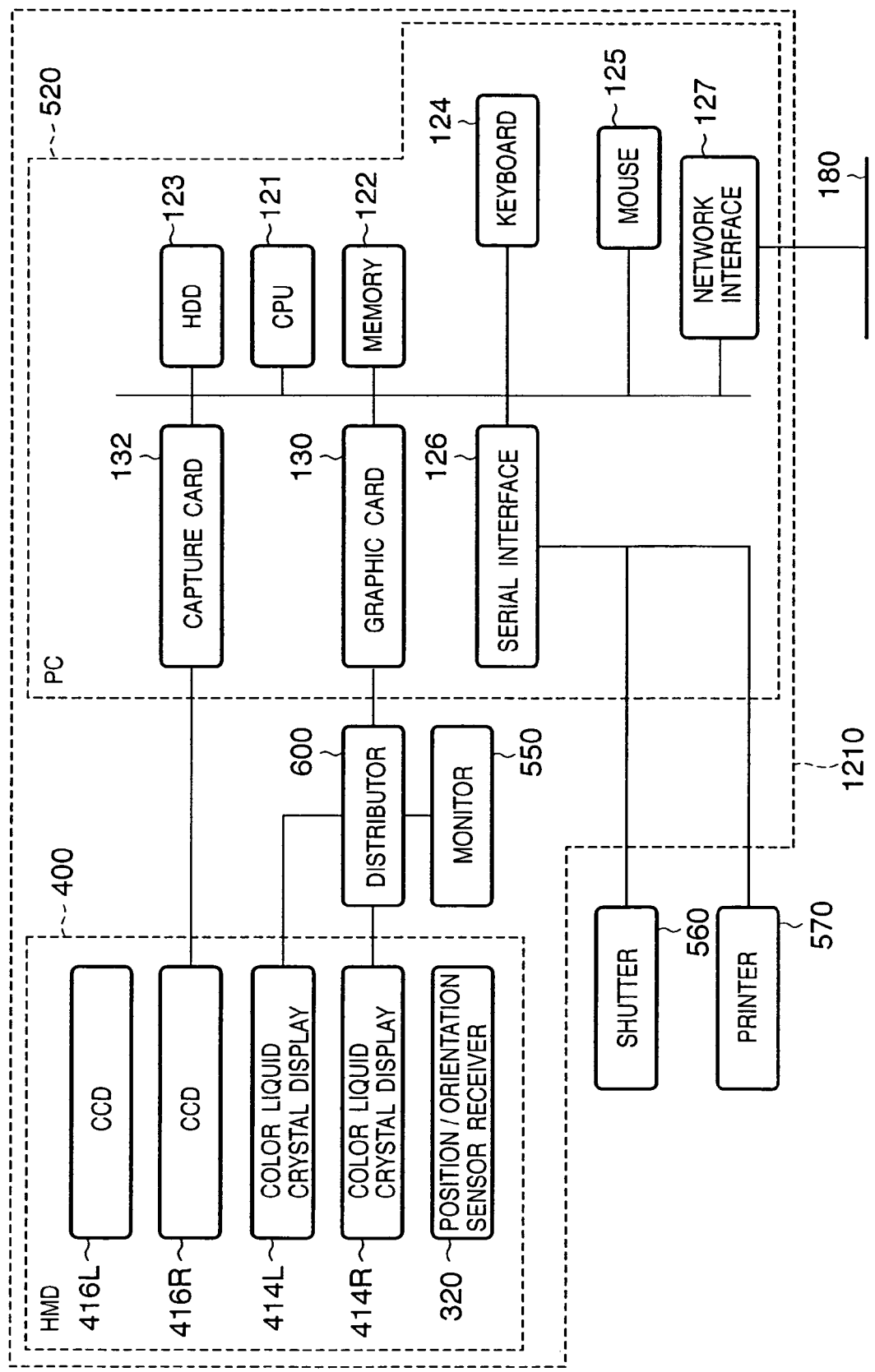
FIG. 12 is a block diagram showing the basic arrangements of an image processing apparatus 1210 and the HMD 400, and the relationship with a shutter 560 and printer 570.

FIG. 12 is a block diagram showing the basic arrangements of an image processing apparatus 1210 and the HMD 400, and the relationship with the shutter 560 and printer 570. The same reference numerals in FIG. 12 denote the same parts as those in FIGS. 6 and 9, and a description thereof will be omitted. Note that a CCD 416R which forms the HMD 400 is connected to the capture card 132, and the distributor 600 is connected to the graphic card 130. The distributor 600 is connected to color liquid crystal displays 414L and 414R. The distributor 600 executes a process for distributing a mixed reality space image generated by the PC 520 to the HMD 400 and monitor 550.

Figure 13:
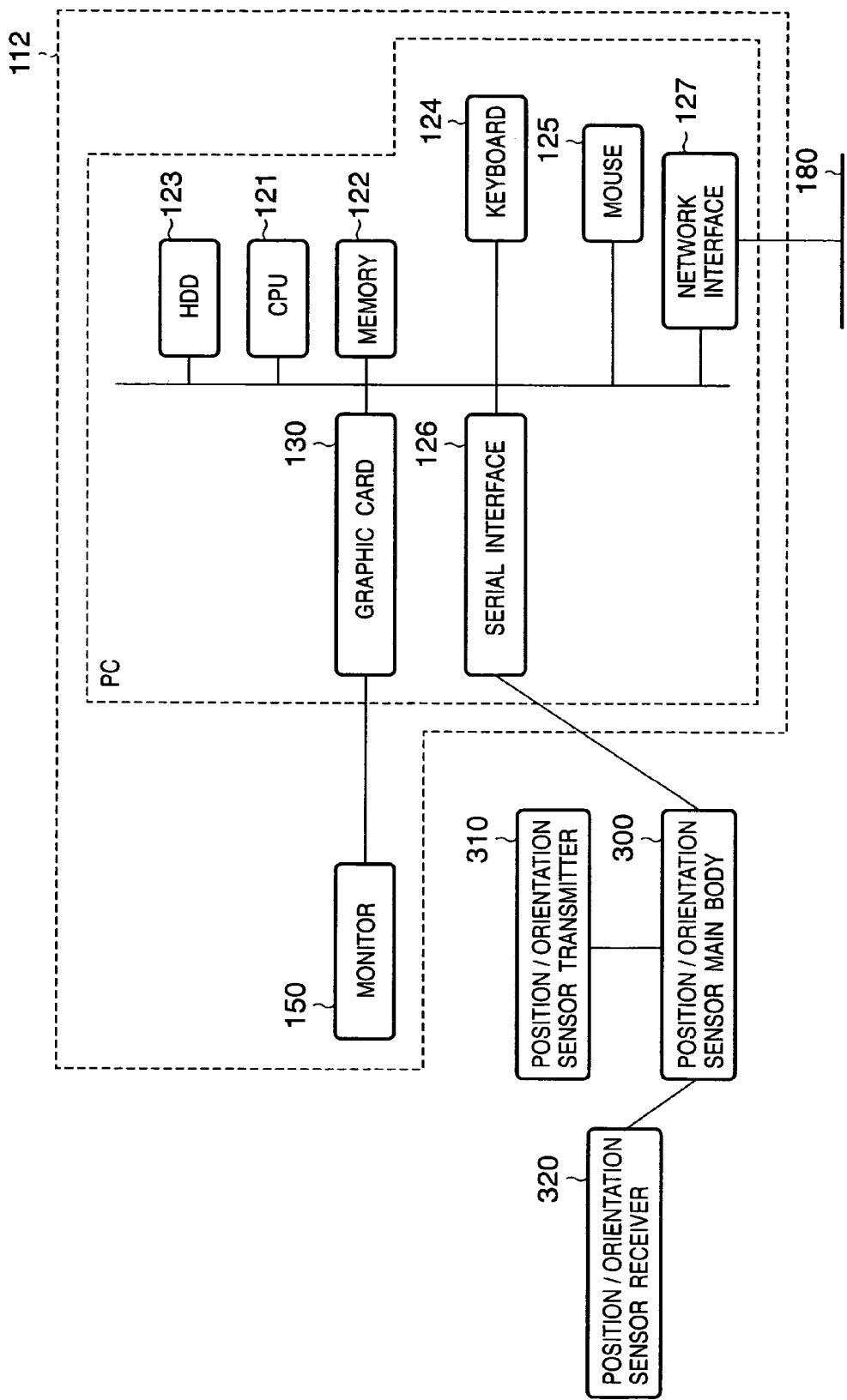
FIG. 13 is a block diagram showing the basic arrangement of the image processing apparatus 112, and the relationship between the image processing apparatus 112 and peripheral devices.

FIG. 13 is a block diagram showing the basic arrangement of the image processing apparatus 112, and the relationship between the image processing apparatus 112 and peripheral devices. The same reference numerals in FIG. 13 denote the same parts as those in FIGS. 7 and 8, and a description thereof will be omitted. The basic arrangement of the image processing apparatus 112 is the same as that of the image processing apparatus shown in FIG. 7. However, the aforementioned position/orientation sensor main body 300 is connected to the serial interface 126 of the image processing apparatus 112 of this embodiment The position/orientation sensor main body 300 sends the position and orientation of the position/orientation sensor receiver 320 on the coordinate system 200, which is calculated based on the strength of magnetism obtained by the position/orientation sensor transmitter 310 and position/orientation sensor receiver 320, to the image processing apparatus 112 via the serial interface 126.

The image processing apparatus 112 stores and manages the received position and orientation data of the position/orientation sensor receiver 320 on the coordinate system 200 in the memory 122 or HDD 123.

On the image processing apparatus 112, the virtual space management program and a position/orientation acquisition program run. The image processing apparatus 112 launches the position/orientation acquisition program to execute a process for controlling the position/orientation sensor main body 300 to measure the viewpoint position and visual axis direction of the observer who wears the HMD 400 with the connected position/orientation sensor receiver 320, and sending the measurement results to the virtual space management program.

Figure 14:
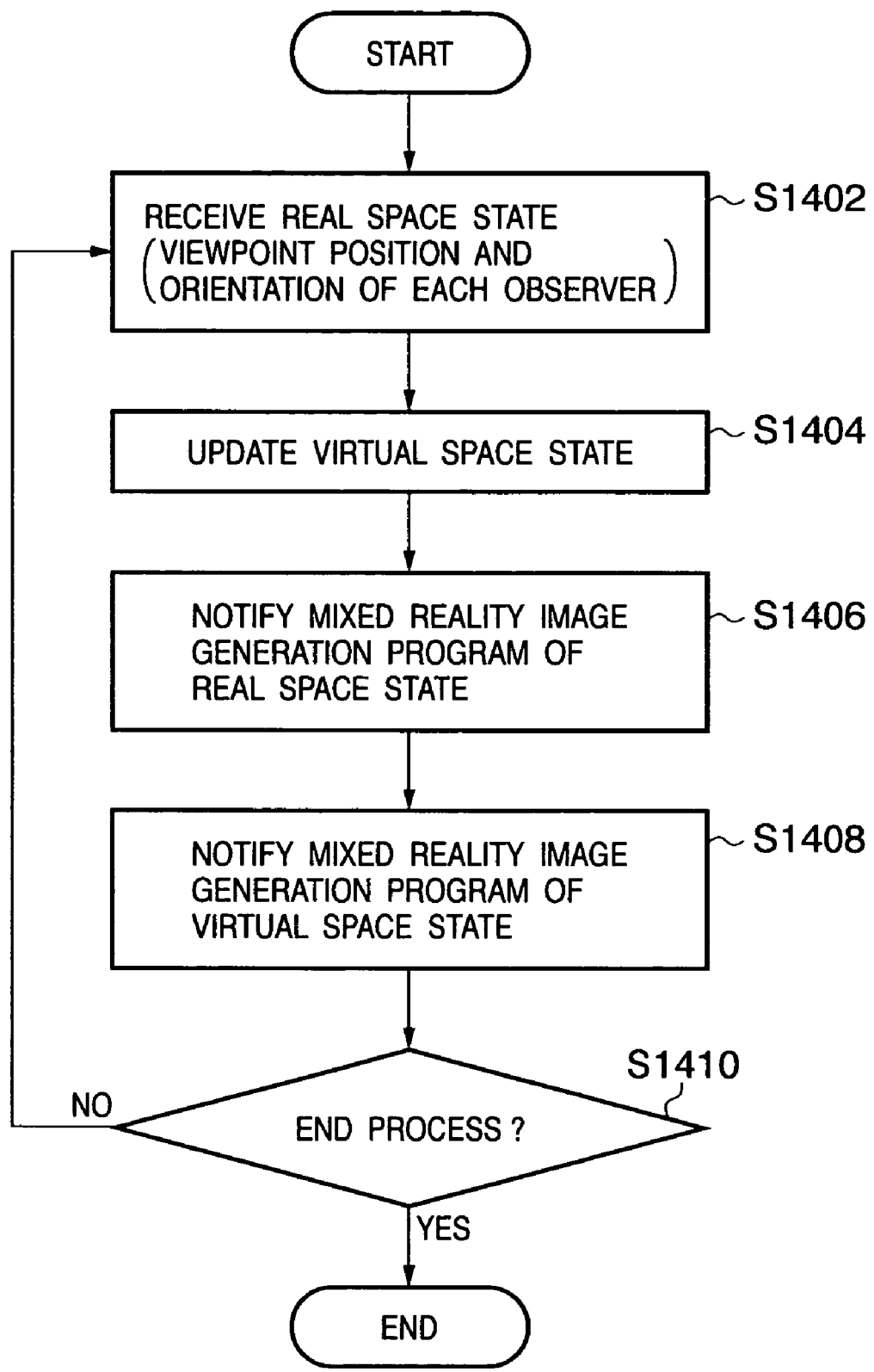
FIG. 14 is a flow chart of a process implemented when a PC 520 executes a virtual space management program.

The process implemented when the image processing apparatus 112 executes the virtual space management program will be explained below using FIG. 14 which is a flow chart of that process.

The image processing apparatus 112 receives real space state information (data indicating the viewpoint position and orientation of the observer) from the position/orientation acquisition program (step S1402). Then, the image processing apparatus 112 executes a process for updating state information of the virtual space (step S1404). Since this process is the same as that in step S302 in the first embodiment, a description thereof will be omitted. The image processing apparatus 112 notifies the mixed reality space image generation program, which runs on the PC 520, of the real space state information and virtual space state information (steps S1406 and S1408). More specifically, the image processing apparatus 112 notifies the mixed reality space image generation program, which runs on the PC 520, of the real space state information and virtual space state information via the network 180.

The process implemented when the PC 520 executes the mixed reality space image generation program will be explained below using FIG. 15 which is a flow chart of that process. The PC 520 receives the virtual space state information and real space state information sent from the virtual space management program (steps S1502 and S1503). The PC 520 generates a virtual space image using the virtual space state information as in step S704 (step S1504). The PC 520 acquires a real space image which is intermittently sent from an image capture thread (step S1530) as in step S730, and is captured by the HMD 400 (step S1506). The graphic card 130 generates a mixed reality space image on the memory 122 by superimposing the acquired real space image on the virtual space image rendered on the memory 122, and outputs the generated image to the HMD 400 (step S1508). Since the subsequent processes are the same as those in steps after step S710 in FIG. 7, a description thereof will be omitted.

As described above, the system of this embodiment can acquire a mixed reality space image at an arbitrary viewpoint using a print medium such as a paper sheet, OHP film, or the like.

Note that this embodiment provides the system using the HMD to only one observer, but such system may be provided to a plurality of observers. In this case, a PC, monitor, printer, distributor, HMD, and sensor system are provided to each observer, and the position/orientation acquisition program which runs on the image processing apparatus 112 acquires and manages the viewpoint positions and orientations of respective observers from the respective sensor systems, and transmits the position and orientation data of the observers to the corresponding PCs-as needed.

Fourth Embodiment

Figure 16:
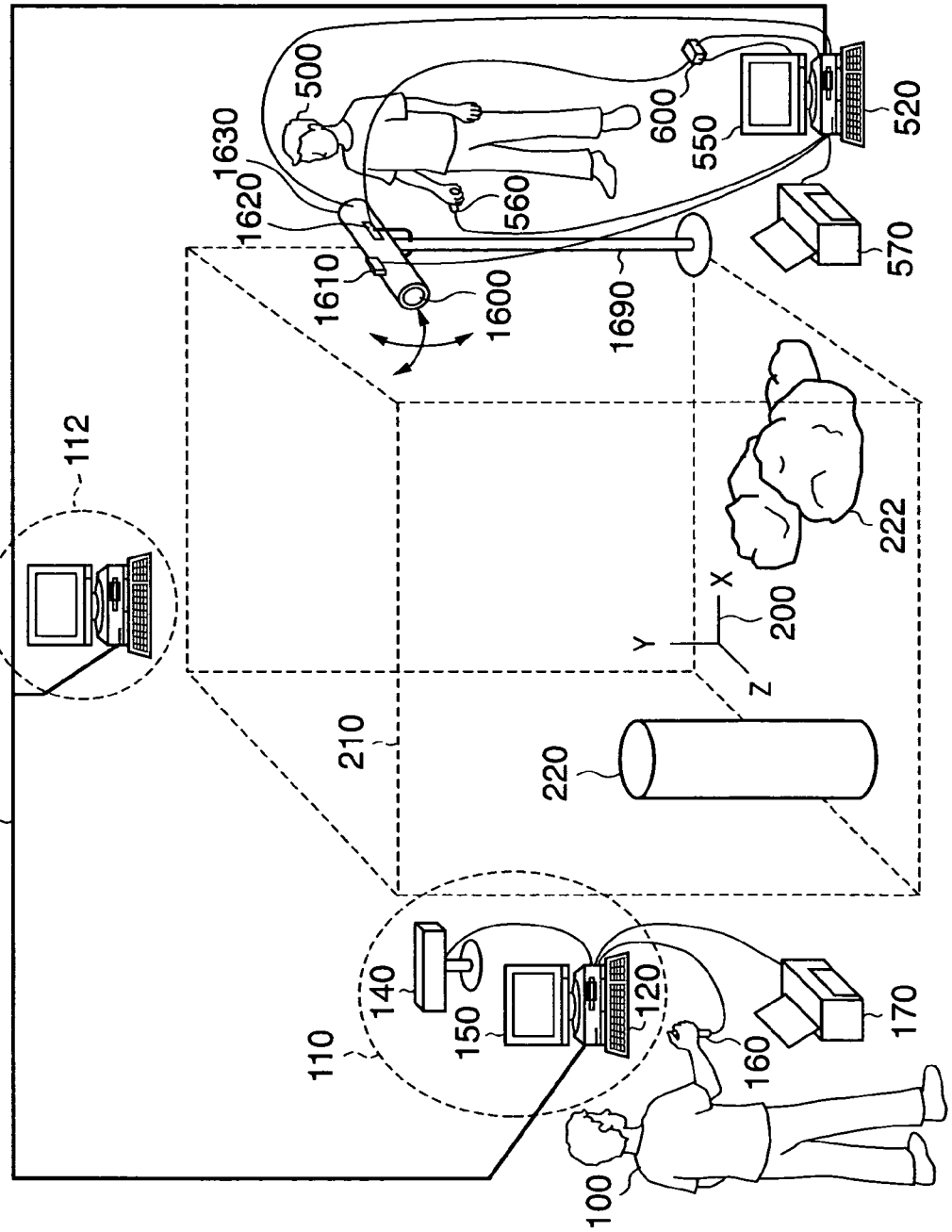
FIG. 16 shows the arrangement of a system according to the fourth embodiment of the present invention.

A system according to this embodiment uses a telescope type image sensing device as a device for capturing a real space image. FIG. 16 shows the arrangement of the system according to this embodiment. The same reference numerals in FIG. 16 denote the same parts as those in FIG. 5, which shows the arrangement of the system according to the second embodiment, and a description thereof will be omitted. This embodiment exemplifies a case wherein a mixed reality space image is presented to the observer 100 using the same arrangement and method as in the second embodiment, and a mixed reality space image is presented to the observer 500 using a telescope type image sensing device 1600. A system (which comprises an image processing apparatus including the PC 520, monitor 550, distributor 600, and telescope type image sensing device 1600, shutter 560, and printer 570) used to present a mixed reality space image to the observer 500 will be described below.

The telescope type image sensing device 1600 is attached to a post 1690 fixed to the ground to be rotatable in the directions of arrows in FIG. 16. An attachment portion of the telescope type image sensing device 1600 comprises a orientation measurement device (gyro) 1620 used to measure the direction (orientation) of the telescope type image sensing device 1600. The reason why the gyro 1620 is attached to this portion is to set this portion as the viewpoint position of the observer. If another portion is set as the viewpoint position of the observer, the viewpoint position changes as the telescope type image sensing device 1600 rotates. Since the gyro 1620 is used to measure the orientation of the viewpoint, it must be attached at the aforementioned position. Data indicating the orientation of the viewpoint measured by the gyro 1620 is sent to the PC 520.

A compact image sensing device (compact video camera) 1610 is attached to the viewpoint position (a position near the attached position of the gyro 1620) to capture a moving image of the real space. The captured real space image is sent to the PC 520.

A compact display device 1630 is attached to the telescope type image sensing device 1600. The compact display device 1630 displays a mixed reality space image which is generated by the PC 520 by sending the real space image captured by the compact image sensing device 1610 and the orientation data of the viewpoint measured by the gyro 1620 to the PC 520, and is sent via the distributor 600.

Figure 17:
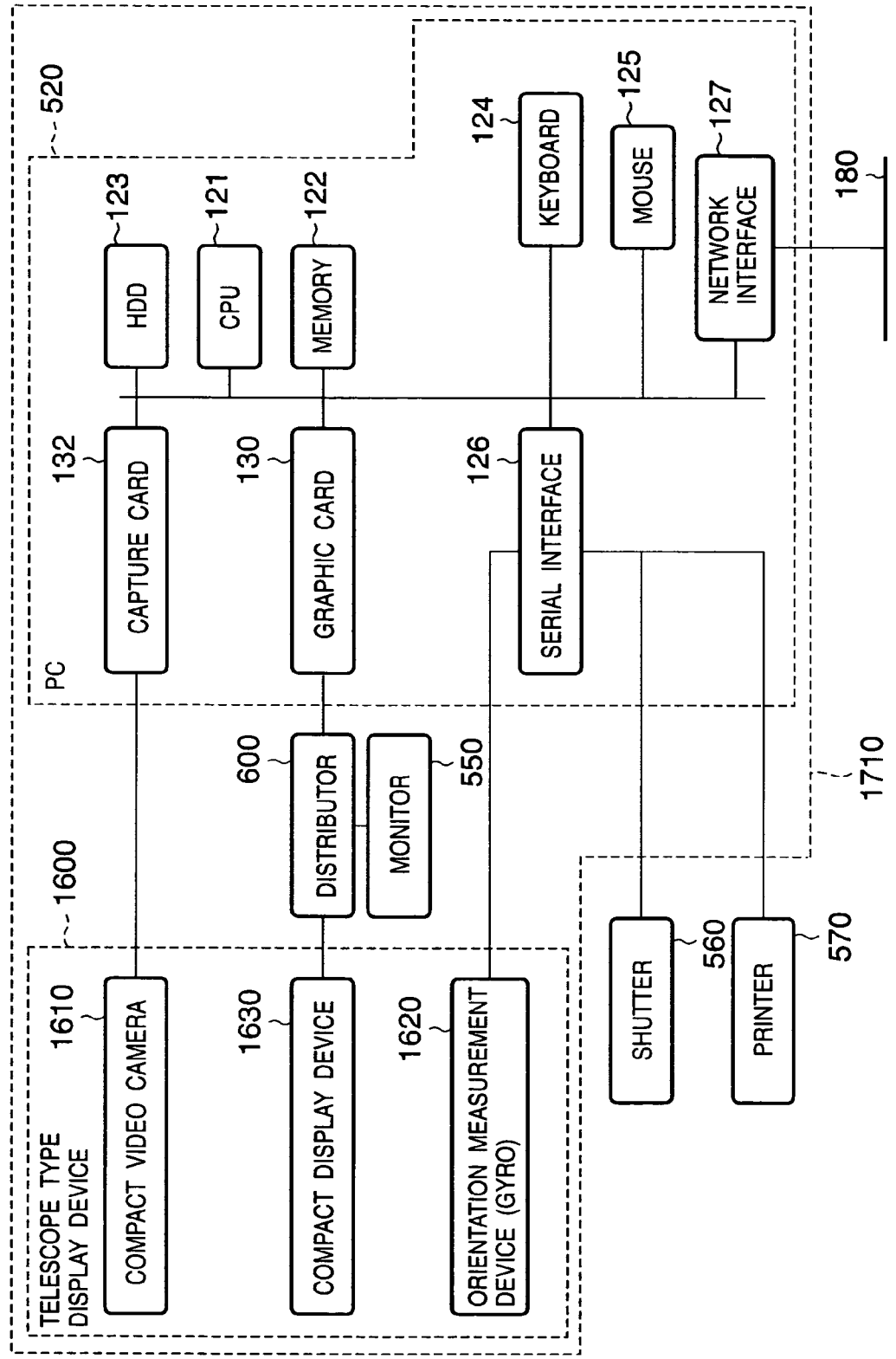
FIG. 17 is a block diagram showing the basic arrangements of a PC 520 and telescope type image sensing device 1600, and the relationship with a shutter 560 and printer 570.

FIG. 17 is a block diagram showing the basic arrangements of the PC 520 and telescope type image sensing device 1600, and the relationship with the shutter 560 and printer 570. The same reference numerals in FIG. 17 denote the same parts as those in FIGS. 6 and 12, and a description thereof will be omitted. Note that the compact image sensing device 1610 which forms the telescope type image sensing device 1600 is connected to the capture card 132, and the distributor 600 is connected to the graphic card 130. The distributor 600 is connected to the compact display device 1630. The distributor 600 executes a process for distributing a mixed reality space image generated by the PC 520 to the compact display device 1630 and monitor 550.

On the other hand, the arrangement of the image processing apparatus 112, and the process to be executed by the image processing apparatus 112 are the same as those in the second embodiment, and a description thereof will be omitted.

The virtual space management program runs on the image processing apparatus 112 in this embodiment, and the position/orientation acquisition program and mixed reality space image generation program run on the PC 520.

The flow chart of the process implemented when the image processing apparatus 112 executes the virtual space management program is substantially the same as that in FIG. 14, except that the orientation of the viewpoint, which is sent from the position/orientation acquisition program (to be described later), is received in step S1402.

The PC 520 launches the position/orientation acquisition program to measure the position of the viewpoint by controlling the gyro 1620, and sends the measurement result to the virtual space management program. Note that the viewpoint position can be calculated from the position of the rotation axis of the telescope type image sensing device 1600, the entrance pupil position of the compact display device, and the orientation of the telescope type image sensing device 1600 on the coordinate system 200. Assume that the position of the rotation axis of the telescope type image sensing device 1600 and the entrance pupil position of the compact display device on the coordinate system 200 are stored in advance in the system (memory 122, HDD 123, or the like).

Figure 15:
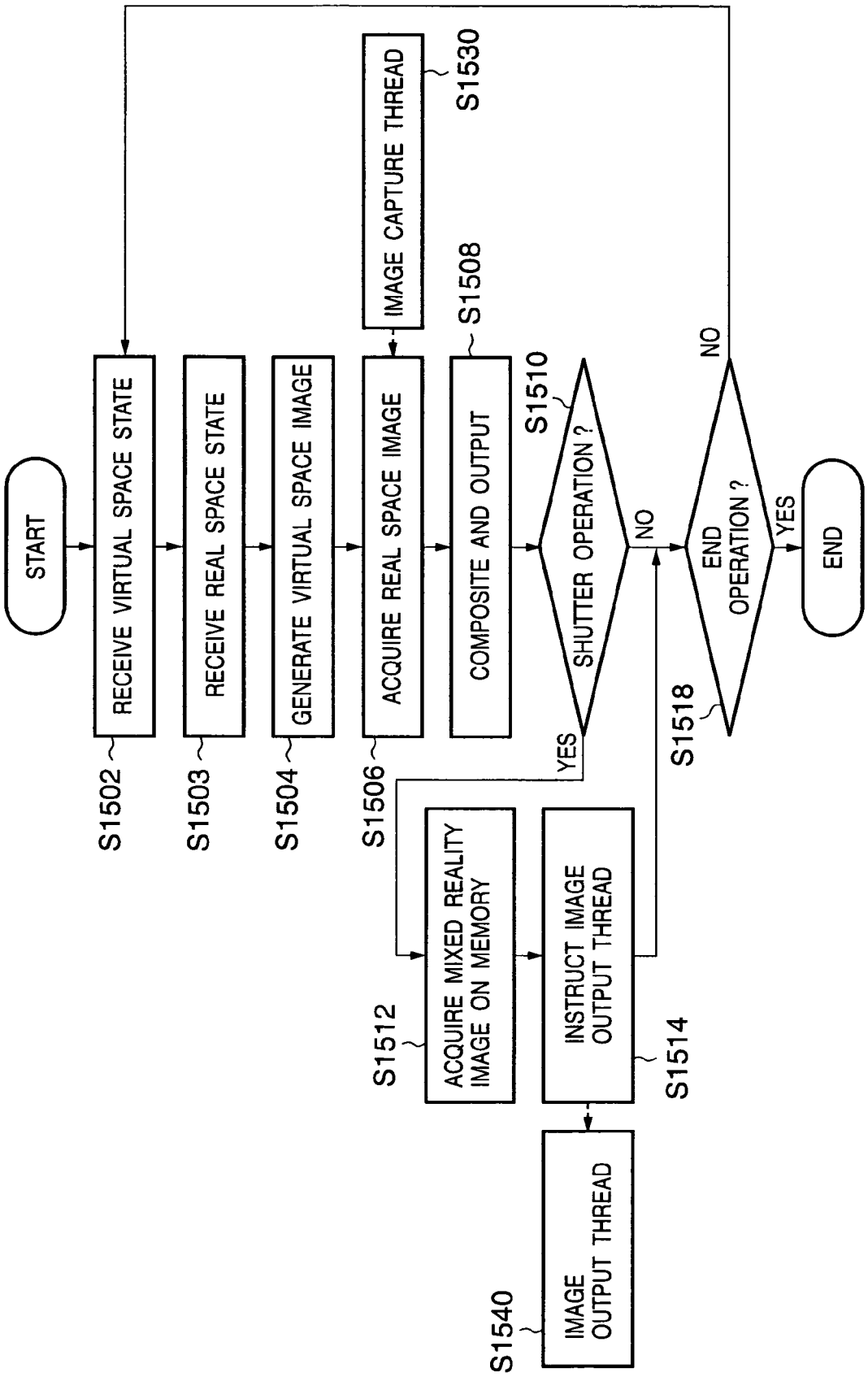
FIG. 15 is a flow chart of a process implemented when the PC 520 executes a mixed reality space image generation program.

The flow chart of the process implemented when the PC 520 executes the mixed reality space image generation program is substantially the same as that in FIG. 15, except that a process for receiving the data indicating the orientation of the viewpoint sent from the virtual space management program as real space state information is executed in step S1503.

As described above, the system according to this embodiment allows the user to acquire a mixed reality space image according to an arbitrary orientation of the viewpoint using a print medium such as a paper sheet, OHP film, or the like without wearing a device used to capture a real space image and a device used to display the mixed reality space image.

Note that this embodiment provides the system using the HMD to only one observer, but such system may be provided to a plurality of observers. In this case, a PC, monitor, printer, distributor, telescope type image sensing device, and gyro are provided to each observer, and the virtual space management program which runs on the image processing apparatus 112 acquires and manages the orientations of the viewpoints of respective observers from the respective gyros, and transmits the orientation data of the viewpoints of the observers to the corresponding PCs as needed.

Fifth Embodiment

A system according to this embodiment has basically the same arrangement as that of the system according to the third embodiment, except that a mixed reality image, which is displayed on the display unit of the HMD to be presented to the observer 500 is presented to the observer 500 as a stereoscopic image. The system according to this embodiment will be described below. Note that an HMD which is the same as that shown in FIGS. 9 to 11 is used.

By independently generating mixed reality space images to be displayed on right- and left-eye display units 410R and 410L, the observer who wears the HMD 400 can observe these mixed reality space images as a stereoscopic image.

Figure 18:
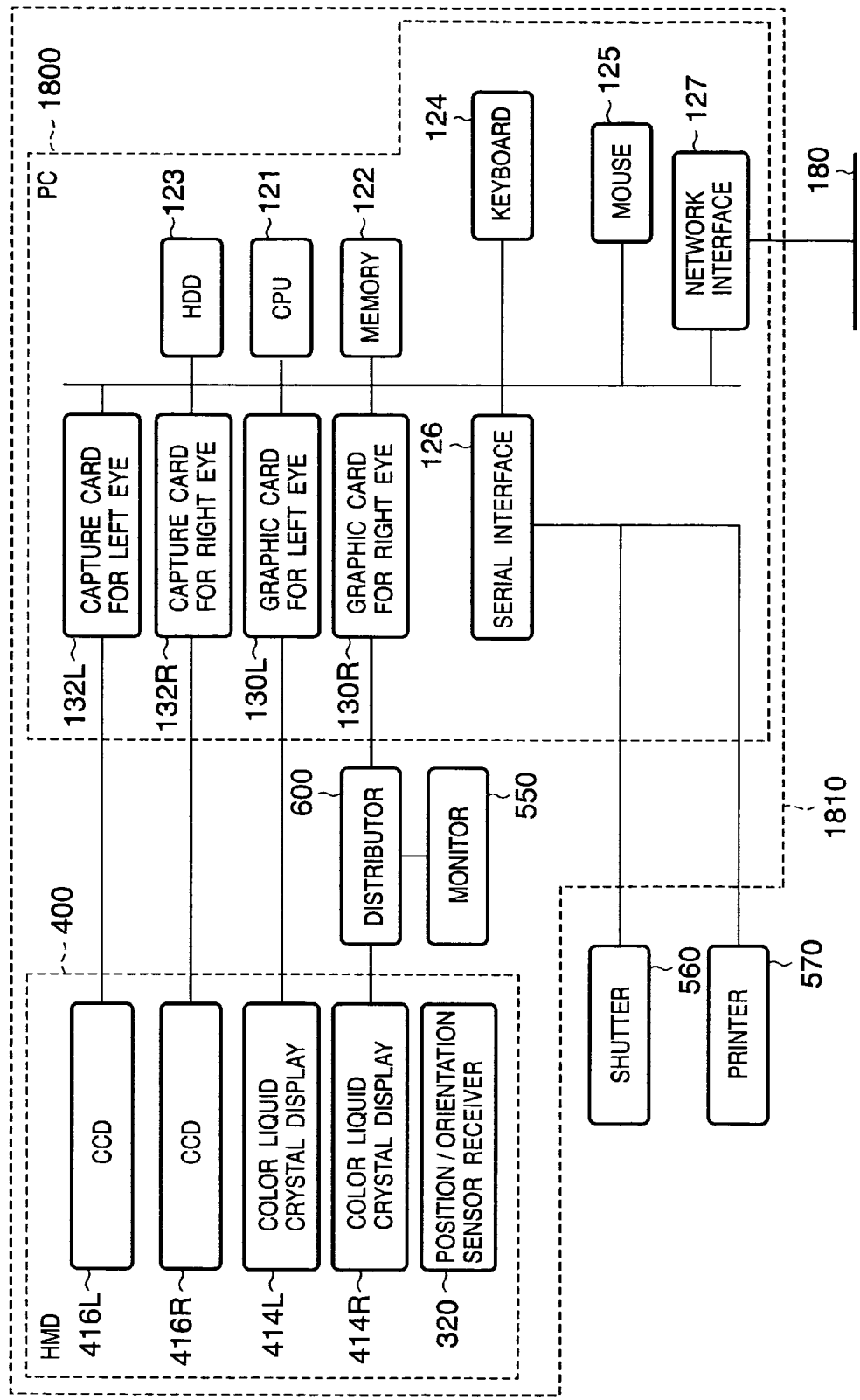
FIG. 18 is a block diagram showing the basic arrangement of an image processing apparatus 1810 which provides mixed reality space images as a stereoscopic image to the observer, and the relationship with a shutter 560 and printer 570.

FIG. 18 is a block diagram showing the basic arrangement of an image processing apparatus 1810 which is used to provide mixed reality space images as a stereoscopic image to the observer, and the relationship with the shutter 560 and printer 570. The same reference numerals in FIG. 18 denote the same parts as those in FIG. 12, and a description thereof will be omitted. A PC 1800 which forms the image processing apparatus 1810 according to this embodiment comprises capture cards and graphic cards in correspondence with the right and left eyes. That is, the right- and left-eye capture cards 132R and 132L are respectively connected to right- and left-eye CCDs 416R and 416L of the HMD 400. Real space images captured by the right- and left-eye CCDs 416R and 416L are respectively sent to the memory 122 via the right- and left-eye capture cards 132R and 132L.

The PC 1800 executes the mixed reality space image generation process explained in the third embodiment for the right and left eyes to generate right- and left-eye mixed reality space images. The generated right-eye mixed reality space image is output to a right-eye color liquid crystal display 414R and the monitor 550 via the right-eye graphic card 130R and distributor 600, and the generated left-eye mixed reality space image is output to a left-eye color liquid crystal display 414L via the left-eye graphic card 130L. In this way, independent mixed reality space images can be presented to the right and left eyes of the observer who wears the HMD 400.

Note that a mixed reality space image to be displayed on the monitor 550 is not limited to that for the right eye, but a mixed reality space image for the left eye may be displayed. In this case, the distributor 600 may be inserted between the left-eye graphic card 130L and color liquid crystal display 414L.

The process for generating mixed reality space images for the right and left eyes will be described below. This process is implemented by executing the mixed reality space image generation program. In this case, two mixed reality space image generation programs for the right and left eyes are stored in the memory 122, and the PC 1800 independently and parallelly executes these programs. Also, since the position and orientation of the viewpoint obtained by the sensor system in this embodiment are used as the position and visual axis direction of the right eye on the same coordinate system, a process for calculating the position and visual axis direction of the left eye on that coordinate system is required.

Figure 19:
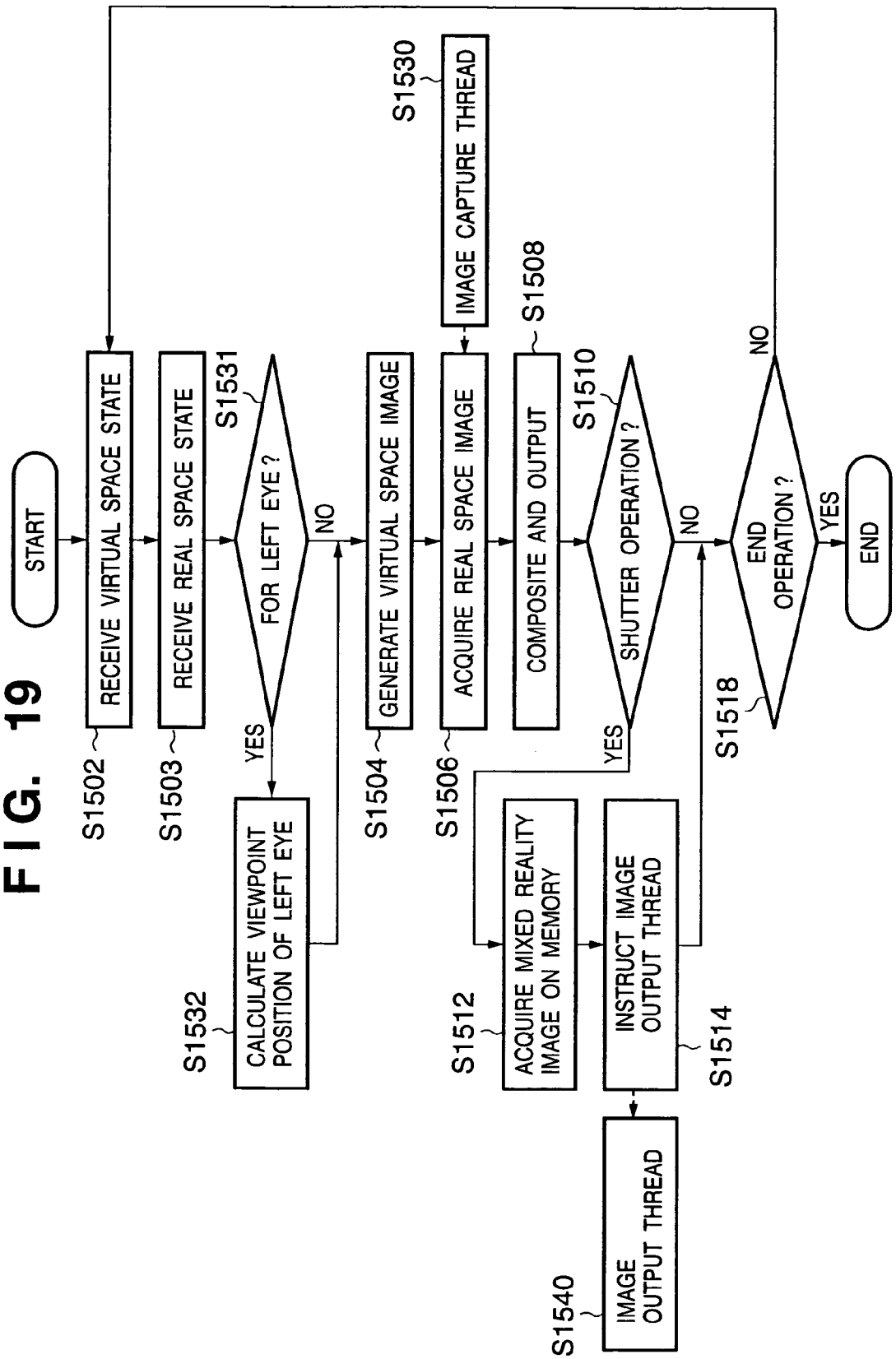
FIG. 19 is a flow chart of a process implemented when a PC 1800 executes a mixed reality space image generation program.

FIG. 19 is a flow chart showing the process implemented when the PC 1800 executes the mixed reality space image generation program. The flow chart in FIG. 19 is substantially the same as that in FIG. 15, except that steps S1531 and S1532 are added. The process in these steps is the process for calculating the position of the left eye. Assume that the visual axis direction of the left eye agrees with that of the right eye, which is obtained by measurement.

If it is determined in step S1531 that a process for the left eye is to be executed, the flow advances to step S1532 to calculate a position obtained by shifting the right eye position by the spacing of the two eyes of the observer as a left eye position. Note that the spacing between the two eyes of the observer is measured in advance and is stored in the memory 122 or HDD 123.

For processes in step S1510 and subsequent steps, either one of the two mixed reality space image generation programs may be executed.

As described above, the system according to this embodiment can present mixed reality space images as a stereoscopic image to the observer. In this way, since the observer can observe the mixed reality space more adequately, he or she can more adequately determine a region to be acquired of the mixed reality space, and can acquire a mixed reality space image of the determined region using a print medium such as a paper sheet, OHP film, or the like.

Note that this embodiment provides the system using the HMD to only one observer, but such system may be provided to a plurality of observers. In this case, a PC, monitor, printer, distributor, HMD, and sensor system are provided to each observer, and the position/orientation acquisition program which runs on the image processing apparatus 112 acquires and manages the viewpoint positions and orientations of respective observers from the respective sensor systems, and transmits the position and orientation data of the observers to the corresponding PCs as needed.

Sixth Embodiment

A system according to this embodiment presents mixed reality space images to a plurality of observers as in the above embodiments, but only a specific observer can select a specific one of mixed reality space images observed by other observers and can instruct the printer to output the selected image. The system according to this embodiment will be described below.

Figure 20:
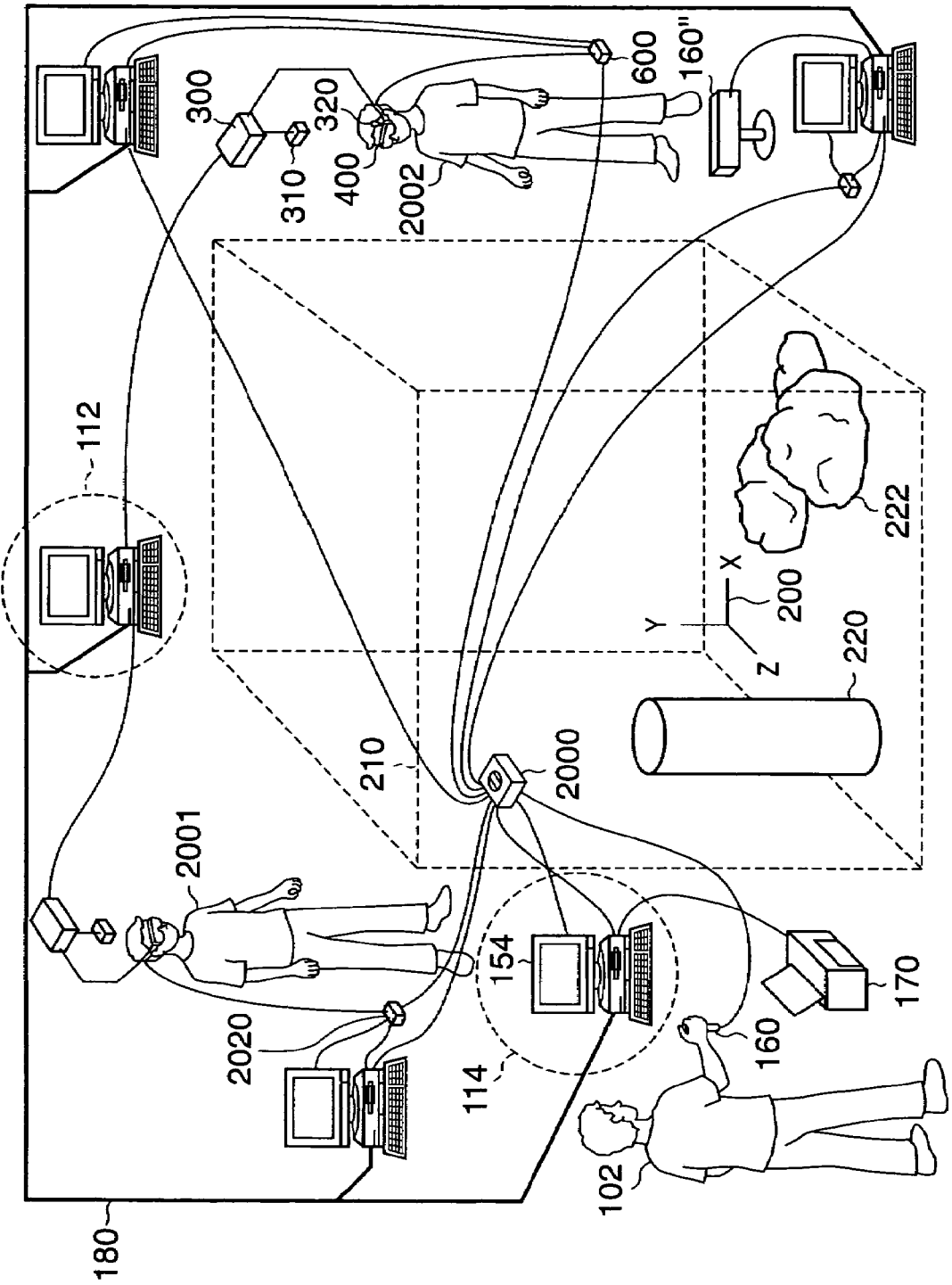
FIG. 20 shows the arrangement of a system according to the sixth embodiment of the present invention.

FIG. 20 shows the arrangement of the system according to this embodiment. The same reference numerals in FIG. 20 denote the same parts as those in FIG. 8 used in the third embodiment, and a description thereof will be omitted. In FIG. 20, reference numeral 102 denotes the specific observer, i.e., an observer who acquires a mixed reality space image (mixed reality space image acquisition user). Other observers 2001 and 2002 merely observe mixed reality images without acquisition operations of mixed reality space images, i.e., without pressing shutters.

The system used to present mixed reality space images to the observers 2001 and 2002 has the same arrangement as that explained in the third embodiment. A system which allows the observer 102 to print a mixed reality space image observed by other observers (the observers 2001 and 2002 in FIG. 20) using the printer 170 will be explained below.

The observer 102 holds the shutter 160 in his or her hand as in the first embodiment, and outputs mixed reality space image data stored in a memory of an image processing apparatus 114 to the printer 170 by pressing this shutter 160. The mixed reality space image data to be stored in the memory of the image processing apparatus 114 is that generated by an image processing apparatus which is selected by a switch 2000 from those used to present mixed reality space images to observers other than the observer 102.

Figure 21:
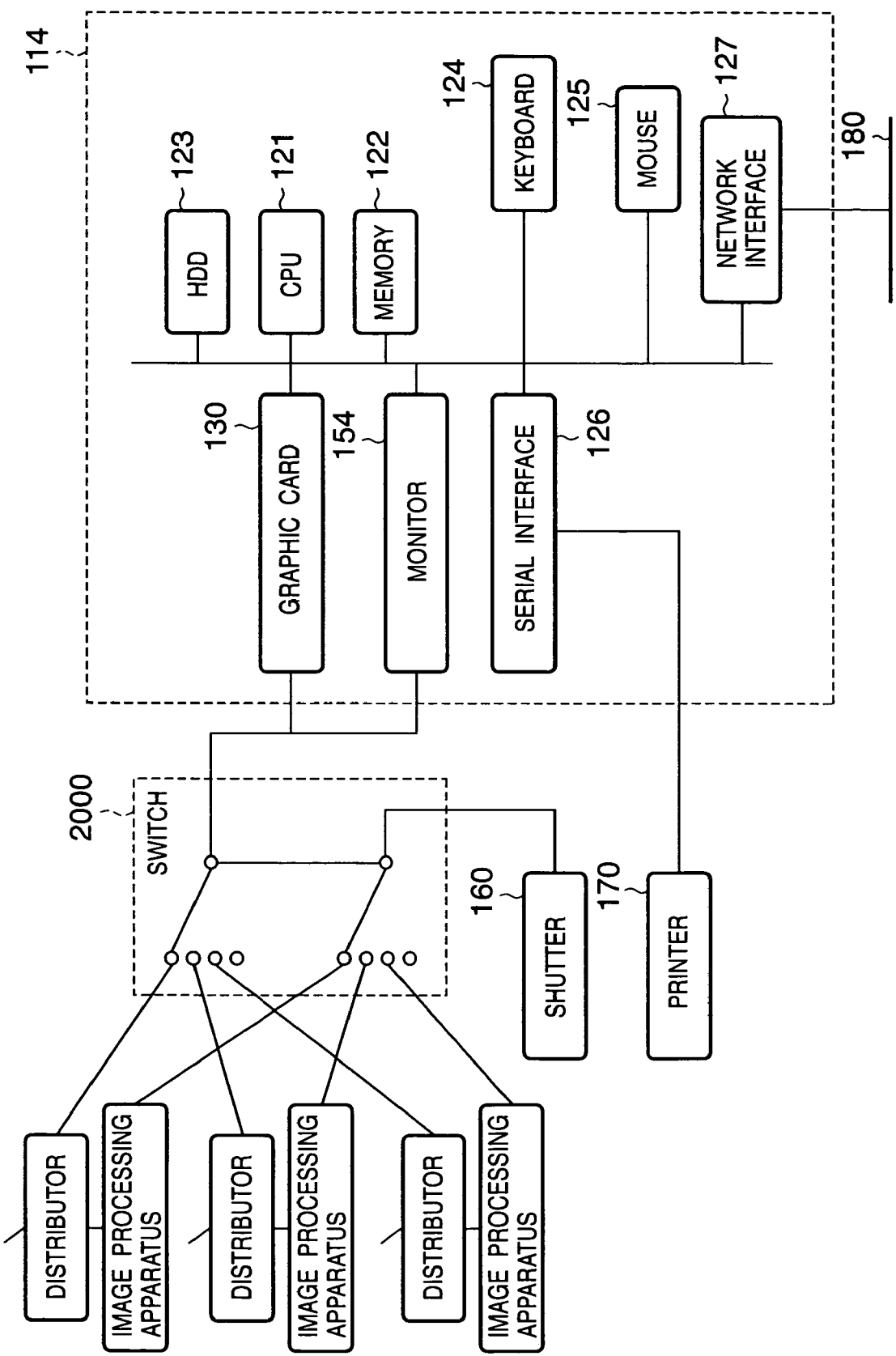
FIG. 21 is a block diagram showing the basic arrangement of an image processing apparatus 114, and the relationship with a switch 2000, shutter 160, and printer 170.

FIG. 21 is a block diagram showing the basic arrangement of the image processing apparatus 114, and the relationship with the switch 2000, shutter 160, and printer 170. Note that the same reference numerals in FIG. 21 denote the same parts as those in FIGS. 2 and 6, and a description thereof will be omitted.

When the mixed reality space image acquisition user 102 has pressed the button of the shutter 160, the CPU 121 instructs the image processing apparatus which is selected by the switch 2000 to transmit mixed reality space image data stored in the memory of that image processing apparatus upon depression of the shutter (although some delay time is produced in practice) to the image processing apparatus 114. The designated image processing apparatus transmits the generated mixed reality space image data to the image processing apparatus 114 via the switch 2000, and the transmitted mixed reality space image is stored in the memory 122 via the graphic card 130. In this way, since the image processing apparatus 114 can obtain mixed reality space image data generated by the image processing apparatus selected by the switch 2000 (in other words, data of a selected one of mixed reality space images presented to observers other than the mixed reality space image acquisition user), it can output data of this image stored in the memory 122 to the printer 170 as in the aforementioned embodiments.

Note that control of the switch 2000, i.e., control that selects an image processing apparatus which is to send a mixed reality space image is set on a GUI or the like, which is displayed on the display screen of a monitor 154, using the keyboard 124 and mouse 125.

The monitor 154 is connected to the switch 2000. Since a mixed reality space image generated by the image processing apparatus, which is selected by the switch 2000, is output to the monitor 154 via the switch, the monitor 154 can display this mixed reality space image. By displaying the mixed reality space image on the monitor 154, the mixed reality space image acquisition user 102 can select an image processing apparatus which generates a mixed reality space image to be output to the printer 170 (control the switch 2000).

On each of the image processing apparatuses that present mixed reality space images to observers other than the mixed reality space image acquisition user 102, the mixed reality space image generation program runs, as in the third embodiment. On the image processing apparatus 112, the position/orientation acquisition program and virtual space management program run, as in the third embodiment. The operations of these programs are the same as those described in the third embodiment.

As described above, the system according to this embodiment can select one of mixed reality space images at arbitrary viewpoints of a plurality of observers, and can acquire the selected image using a print medium such as a paper sheet, OHP sheet, or the like.

In the system of this embodiment, one each image processing apparatus and printer are provided to the mixed reality space image acquisition user. However, a plurality of image processing apparatuses and printers may be provided. Also, the printer may be connected to any of the image processing apparatuses connected to the network 180.

Seventh Embodiment

The system according to the sixth embodiment selects one of mixed reality space images presented to observers other than the mixed reality space image acquisition user, and prints only the selected image. A system according to this embodiment can select one or more images, i.e., a plurality of mixed reality space images, reduces the selected mixed reality space images, generates an image which includes the reduced mixed reality space images, and prints this image. The system according to this embodiment will be described below.

Figure 22:
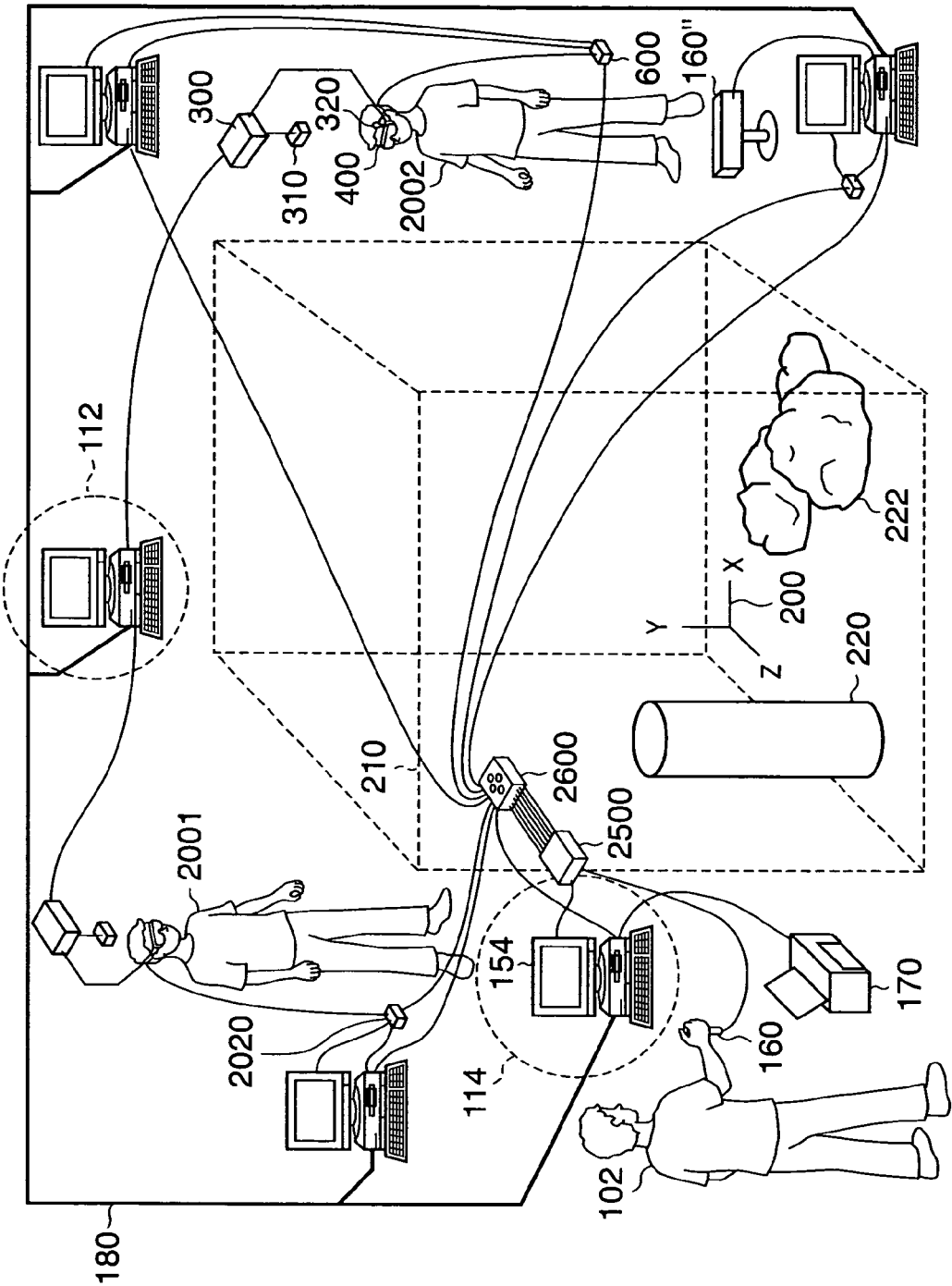
FIG. 22 shows the arrangement of a system according to the seventh embodiment of the present invention.

FIG. 22 shows the arrangement of the system according to this embodiment. The arrangement shown in FIG. 22 is basically the same as that (shown in FIG. 20) of the system according to the sixth embodiment, except that a selector 2600 and composition device 2500 are used in place of the switch 2000. Hence, the selector 2600 and composition device 2500 will be described below.

The selector 2600 can acquire mixed reality space images from arbitrary ones (one or more) of image processing apparatuses which present mixed reality space images to observers other than the mixed reality space image acquisition user 102. The acquired mixed reality space images are sent to the composition device 2500.

Figure 23:
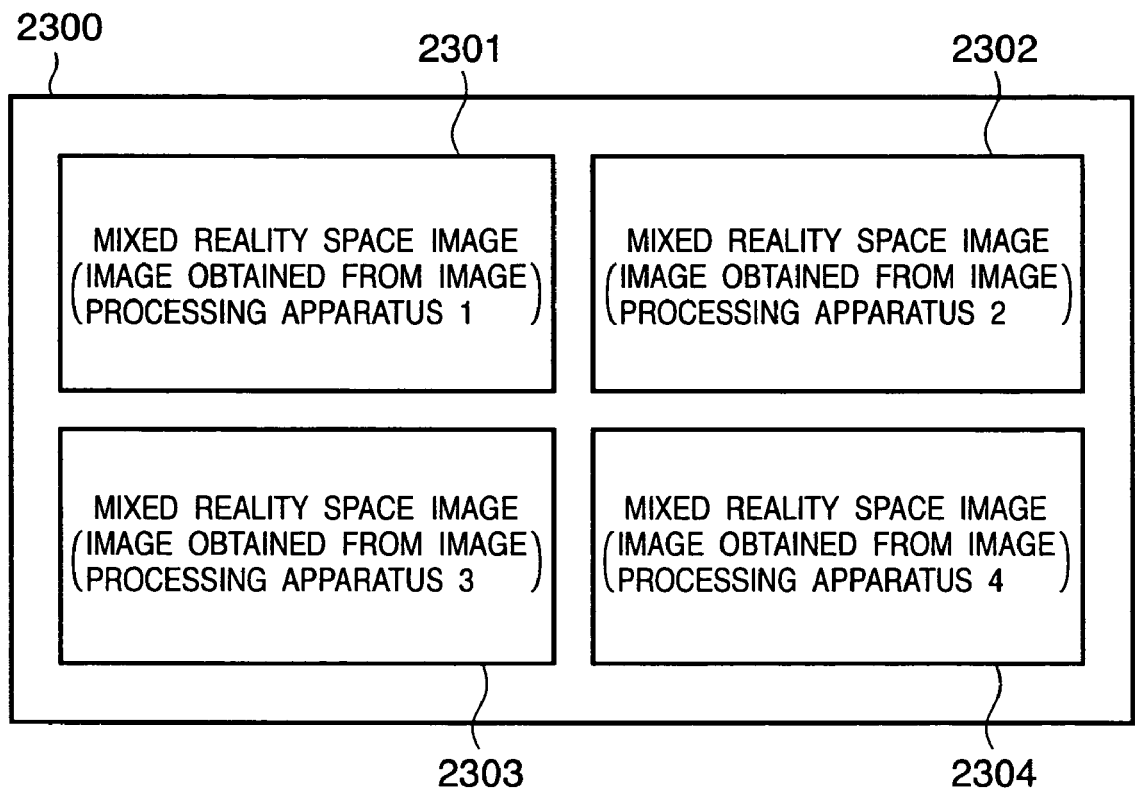
FIG. 23 shows an example of a composite image including four reduced mixed reality space images.

Upon receiving a plurality of mixed reality space images, the composition device 2500 reduces these images, and generates one image (composite image) which includes the reduced images. For example, when the composition device 2500 obtains four mixed reality space images, a composite image to be generated is as shown in, e.g., FIG. 23. FIG. 23 shows an example of a composite image including four reduced mixed reality space images. In FIG. 23, mixed reality space images obtained from image processing apparatuses 1, 2, 3, and 4 are reduced. Note that the layout order and layout itself of images are not limited to such specific ones. When only one mixed reality space image is received, this process is skipped, and the received image is handled as a composite image. The composite image generated by the composition device 2500 is displayed on the monitor 154, and is to be printed.

Figure 24:
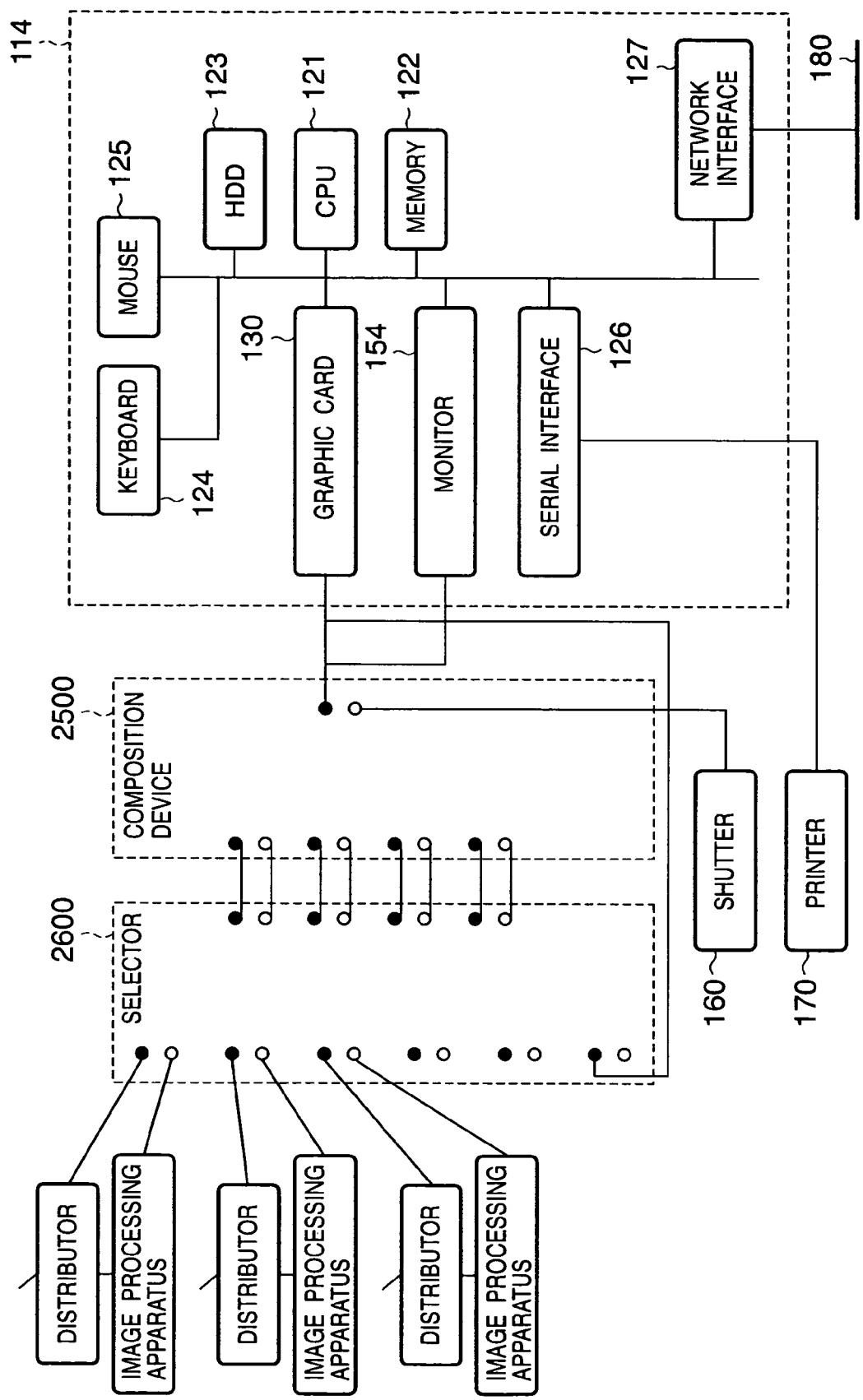
FIG. 24 is a block diagram showing the basic arrangement of an image processing apparatus 114, and the relationship with a selector 2600, composition device 2500, shutter 160, and printer 170.

FIG. 24 is a block diagram showing the basic arrangement of the image processing apparatus 114 and the relationship with the selector 2600, composition device 2500, shutter 160, and printer 170. Note that the same reference numerals in FIG. 24 denote the same parts as those in FIG. 21, and a description thereof will be omitted.

When the mixed reality space image acquisition user 102 has pressed the button of the shutter 160, the CPU 121 instructs an image processing apparatus or apparatuses which is or are selected by the selector 2600 to transmit mixed reality space image data stored in the memory or memories of the image processing apparatus or apparatuses upon depression of the shutter (although some delay time is produced in practice) to the image processing apparatus 114. The designated image processing apparatus or apparatuses sends or send generated mixed reality space image data to the composition device 2500 via the selector 2600. The composition device 2500 generates one composite image using the received mixed reality space image data, and sends the generated composite image to the memory 122, which stores this composite image. In this way, since the image processing apparatus 114 can obtain mixed reality space image data generated by an image processing apparatus or apparatuses selected by the selector 2600 (in other words, data of a selected one or ones of mixed reality space images presented to observers other than the mixed reality space image acquisition user), it can output data of the image stored in the memory 122 to the printer 170 as in the aforementioned embodiments.

Note that control of the selector 2600, i.e., control that selects an image processing apparatus or apparatuses which is or are to send mixed reality space image data is set on a GUI or the like, which is displayed on the display screen of the monitor 154, using the keyboard 124 and mouse 125.

The monitor 154 is connected to the composition device 2500. Since a composite image which includes a mixed reality space image or images generated by the image processing apparatus or apparatuses selected by the selector 2600 is output to the monitor 154, the monitor 154 can display this composite image. By displaying the composite image on the monitor 154, the mixed reality space image acquisition user 102 can select an image processing apparatus or apparatuses which generates or generate mixed reality space image data to be included in the composite image (control the selector 2600).

On each of the image processing apparatuses that present mixed reality space images to observers other than the mixed reality space image acquisition user 102, the mixed reality space image generation program runs, as in the third embodiment. On the image processing apparatus 112, the position/orientation acquisition program and virtual space management program run, as in the third embodiment. The operations of these programs are the same as those described in the third embodiment.

As described above, the system according to the present invention can select a plurality of ones of mixed reality space images at arbitrary viewpoints of a plurality of observers, and can acquire the plurality of selected mixed reality space images using a print medium such as a paper sheet, OHP film, or the like.

In the system of this embodiment, one each image processing apparatus and printer are provided to the mixed reality space image acquisition user. However, a plurality of image processing apparatuses and printers may be provided. Also, the printer may be connected to any of the image processing apparatuses connected to the network 180.

As described above, according to the present invention, a mixed reality space image can be acquired.

Eighth Embodiment

A system such as SEGA's "Print Club" photo-sticker machine or the like, which composites an image of a virtual object generated in a computer onto an image on a real space sensed using an image sensing device such as a camera or the like that can sense a still image or moving image, and prints a composite image has prevailed. In such "Print Club" photo-sticker machine, a virtual object to be superimposed on a real image is a simple two-dimensional (2D) image, and the system user can confirm the presence of the virtual object only on a composite window upon sensing an image. That is, the system user determines a composition or gives a performance for an image in which the user looks as if he or she were interacting with a virtual object, while confirming the positional relationship between the virtual image and himself or herself on the composite window.

In the above embodiments, a system which composites and prints a real image and virtual image at a viewpoint position and in a visual axis direction that the photographer wants on a space (mixed reality space) where the coordinate systems of the real space and virtual space are shared is described. This system allows the user to recognize a virtual object not as a 2D object but as a three-dimensional (3D) object present on a real space by a 3D computer graphics (3DCG) technique. Furthermore, since the 3D coordinate axes of the real and virtual space agree with each other, the user can perceive the virtual object with deep sense of reality as if it were present right in front of him or her. In such environment, by acquiring an interaction state with the virtual object as an image, the system prompts the system user to naturally interact with the virtual object without considering any performance or composition, and can provide a more interested, well composed picture.

On the other hand, some attractions of a theme park use a machine that automatically senses visitors who are experiencing and enjoying such attractions by an event on a real space, and provides prints of the sensed images to the visitors after the experience. For example, a roller-coaster type attraction adopts the following system. That is, an image sensing device is set at a point where the user displays surprise upon nose-diving of his or her ride, and an image of the user and ride is sensed at the nose-dive timing of the ride. Then, the user after riding requests to print an image of his or her surprise and pays for it.

Since such mixed reality system requires realtimeness, the data size and computation size of a model of a virtual space object are limited, and it is difficult to generate an excellently merged mixed reality space image as a still image. When a virtual space object is moving in the mixed reality space, the user hardly notices any drop of sense of merging due to these limitations. However, a still image or paper medium output is vulnerable to problems such as poor sense of merging, low image quality, and the like.

Thus, in this and following embodiments, a paper medium output of a mixed reality space image with higher quality is provided, which becomes a fun for the user as an object, by improving on the above embodiments that allows to acquire an image of natural interaction between the user and virtual object.

Also, in this and following embodiments, a paper medium output is made without disturbing the operation of the system that allows the user to experience a mixed reality space.

Also, in this and following embodiments, a paper medium output of a mixed reality space image which has a meaning and a fun for the user as an object by improving on the above embodiments that allows to acquire an image of natural interaction between the user and virtual object, is made.

More specifically, it is still another object of the present invention to avoid a virtual space object from inadvertently cutting across in front of the observer as an object and occluding the observer upon acquiring a mixed reality space image.

This embodiment will exemplify a case wherein the system re-generates mixed reality space image to print out more beautiful, more real image.

Figure 25:
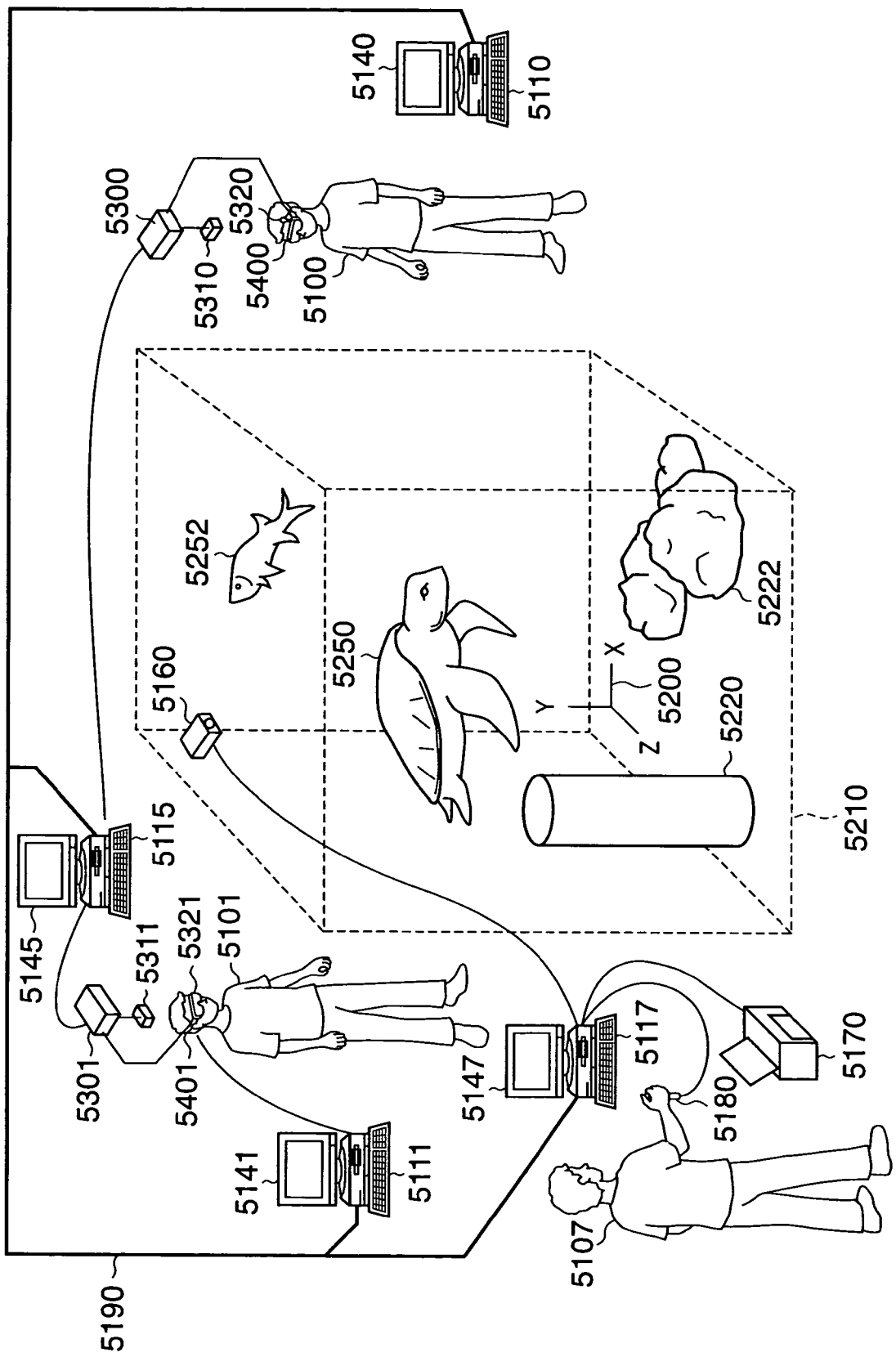
FIG. 25 shows the arrangement of a mixed reality apparatus.

FIG. 25 shows a plurality of observers, and the arrangement of a system according to this embodiment, which can acquire mixed reality space images based on different viewpoints of these observers.

Outline of Observer Image Processing Apparatus and Program

An observer image processing apparatus and a program applied to this apparatus in this embodiment will be explained first.

Referring to FIG. 25, reference numerals 5100 and 5101 denote observers who observe mixed reality space images. A PC 5110, monitor 5140, position sensor system (5300, 5310, 5320), and head-mounted display (HMD) 5400 with an image sensing device form an observer image processing apparatus for generating a mixed reality space image for one observer. This observer image processing apparatus is equipped for the observer 5100.

Likewise, for the observer 5101, a PC 5111, monitor 5141, position sensor system (5301, 5311, 5321), and head-mounted display (HMD) 5401 with an image sensing device are equipped as an observer image processing apparatus.

In this embodiment, the number of observers is two (observers 5100 and 5101). However, the present invention is not limited to such specific number. Hence, an arbitrary number of observer image processing apparatuses can be connected, and an arbitrary number of (two or more) observers can simultaneously observe and share a mixed reality space.

Reference numeral 5190 denotes a network (e.g., Ethernet). The observer image processing apparatuses equipped for respective observers, and an objective viewpoint image processing apparatus and mixed reality space management apparatus (to be described later) are connected via the network 5190.

Programs which run on the PC 5110 will be explained below. On the PC 5110, a mixed reality space image generation program and position/orientation acquisition program run.

The position/orientation acquisition program always updates the viewpoint position and orientation of the observer measured by a position/orientation sensor main body 5300, position/orientation sensor transmitter 5310, and position/orientation sensor receiver 5320 (see FIG. 29) which form the position/orientation sensor system, converts the updated position and orientation into position and orientation values on a coordinate system 5200 (to be described later), and continuously transmits these values to a mixed reality space management program, which runs on the mixed reality space management apparatus.

The mixed reality space image generation program renders virtual space images at that time on a memory on the basis of mixed reality space management information (i.e., the positions, orientations, and states of all virtual space objects, and those of real space objects) sent from the mixed reality space management program, also renders a real space image captured by an image sensing unit (to be described later) provided to the HMD 5400 mounted on the head of the observer 5100 on the memory, and composites these images. As a result, a mixed reality space image is rendered on the memory.

The mixed reality space image generated on the memory is output to and displayed on the monitor 5140 and a display unit (to be described later) provided to the HMD 5400. Therefore, the observer 5100 can observe a mixed reality space image by viewing it displayed on the display unit of the HMD 5400.

Note that the update frequency of the mixed reality space image depends on the processing performance of the PC. If the PC has sufficiently high processing performance and the update frequency of 10 to 30 Hz can be realized, the observer can recognize successively updated mixed reality space images as a moving image.

The same image is output to the monitor 5140 and HMD 5400. This is because a person other than the observer (e.g., a person who does not wear any HMD, a system operator, or the like) recognizes an image observed by the observer who wears the HMD 5400, and when operations are made by displaying system messages, a system setup window, and the like, the HMD 5400 is not suited to such use, and the operations must be made while observing the monitor 5140.

With the above arrangement and programs, the observer 5100 can observe a mixed reality space image according to the viewpoint position and orientation at any given timing while freely changing the viewpoint position and orientation, i.e., freely walking through the mixed reality space.

Outline of Mixed Reality Space Management Apparatus and Program

A mixed reality space management apparatus and a program applied to this apparatus in this embodiment will be described below.

A PC 5115 and monitor 5145 forms the mixed reality space management apparatus. Only one mixed reality space management apparatus is equipped in this mixed reality system independently of the number of observers. Note that a mixed reality space management program runs on the PC 5115.

The mixed reality space management program acquires the states, positions, and orientations of real space objects, updates those of virtual space objects, and sends the obtained information to all mixed reality space image generation programs as mixed reality space management information.

The states, positions, and orientations of the real space objects can be acquired by communicating with the position/orientation acquisition programs, which run on all the observer image processing apparatuses. In this way, the viewpoint positions and orientations of all the observers and stationary cameras are simultaneously managed and synchronized by the mixed reality space management program.

The states, positions, and orientations of the virtual space objects can be updated by advancing a virtual space time by a unit time in accordance with a scenario pre-set in this program, and updating the states, positions, and orientations of all the virtual space objects. At this time, when the position/orientation relationship among the virtual space objects, and that between virtual space objects and real space objects (observers and stationary cameras) meet a special state set in the scenario, an arbitrary event (e.g., explosion of a virtual space object) may occur.

The mixed reality space management information updated in this way is sent to all the mixed reality space image generation programs.

Outline of Objective Viewpoint Image Processing Apparatus and Programs

A PC 5117, monitor 5147, and video camera 5160 form an objective viewpoint image processing apparatus. Note that the objective viewpoint image processing apparatus has substantially the same arrangement as that of the observer image processing apparatus, except that the HMD 5400 and position/orientation sensor system (5300, 5310, 5320) are not connected, and the video camera 5160 which is fixed in position is used as the image sensing device.

Note that the position and orientation of the video camera 5160 are preferably set so that a mixed reality space image generation region (to be described later) falls within the image sensing range as much as possible. Note that the mixed reality space image generation program and position/orientation acquisition program run on the PC 5117 as in the PC 5110.

The mixed reality space image generation program acquires a real space image from the video camera 5160 connected to the PC 5117, and generates a mixed reality space image in accordance with information passed from the mixed reality space management program. The position/orientation acquisition program continuously sends the setting values of the position and orientation of the video camera 5160 to the mixed reality space management program. Note that the position and orientation of the video camera 5160 are set in advance in the mixed reality space image generation program as default values, and are never dynamically changed.

Printing Apparatus

A printer 5170 as a printing apparatus is used to output a mixed reality space image, and a shutter switch 5180 is a push-button type device which is used by an observer 5107 to determine an arbitrary output timing of a mixed reality space image. In this embodiment, the printer 5170 and shutter switch 5180 are connected to the PC 5117 of the objective viewpoint image processing apparatus, but the present invention is not limited to such specific arrangement. That is, the printer 5170 and the like may be connected to the PC 5110 or 5111 which serves as the observer image processing apparatus, or may be simultaneously connected to a plurality of PCs. Note that the printer 5170 can be connected to a PC on which the mixed reality space image generation program runs, so as to output a mixed reality space image.

The monitor 5147 connected to the PC 5117 of the objective viewpoint image processing apparatus displays a mixed reality space image viewed from the video camera 5160, and the observer 5107 can determine a mixed reality space image to be output from the printer 5170 at an arbitrary timing using the shutter switch 5180 while observing this mixed reality space image. More specifically, when the observer 5107 has pressed the shutter switch 5180, the mixed reality space management program that runs on the PC 5117 detects that depression, and sends a mixed reality space image rendered on the memory to the printer 5170, which outputs the received image on a paper medium.

The printing system of the printer 5170 is not particularly limited, as long as it can print a mixed reality space image on a print medium such as a paper medium, OHP film, or the like as an image.

Also, the shutter switch 5180 is not limited to a mechanical manual shutter switch like in this embodiment. More specifically, any other means may be adopted as long as the mixed reality space image generation program that executes an output process can designate a generation timing of a mixed reality space image to be output, and such switch may be implemented by a program. For example, the mixed reality space management program may generate a shutter signal, and may send mixed reality space management information containing that shutter signal to the mixed reality space image generation program.

In this case, as for the generation timing of a shutter signal, the mixed reality space image generation program may automatically generate a shutter signal at pre-set time intervals, or when a specific event has occurred in the mixed reality space managed by it.

Mixed Reality Space

The mixed reality space will be explained below. Referring to FIG. 25, reference numeral 5200 denotes a coordinate system, which is defined in advance, is used to determine the position of each virtual object on the real space, and is shared by the real space and virtual space.

Reference numeral 5210 denotes a mixed reality space image generation region. That is, the positions and shapes of real objects which are present within this region are managed by all running mixed reality space image generation programs and the mixed reality space management program, and whether or not a real object and virtual object overlap each other can be detected within this region. The observer enters this region to experience the mixed reality space. Note that the position and size of this region are recorded on the memory of each of PCs on which the mixed reality space image generation program and mixed reality space management program run.

Reference numerals 5220 and 5222 denote real objects, which are exemplified as a stone pillar (5220) and rocks (5222) in this embodiment. Reference numerals 5250 and 5252 denote virtual objects which are formed of data of polygons, texture, and the like as computer graphics (CG) objects. In this embodiment, a turtle (5250) and fish (5252) are exemplified.

Since this embodiment exemplifies a system which generates a mixed reality space in the motif of an undersea scene, real and virtual objects which are in line with such motif are presented. However, the present invention is not limited to such specific system in practice. Note that the virtual objects 5250 and 5252 are demonstrated in FIG. 25 to illustrate an outline of the mixed reality space. However, in practice, these virtual objects can only be observed on the monitor of each PC on which the mixed reality space image generation program runs, and the HMD.

The system arrangement and operation of this embodiment have been roughly explained on the basis of both hardware and software.

HMD

The arrangement of the HMD 5400 will be explained below using FIGS. 26 to 28. Note that each reference numeral with "R" in FIGS. 26 to 28 denotes a building component for the right eye of the observer, and that with "L" denotes a building component for the left eye. In the following description, "R" and "L" after reference numerals may be omitted if the right and left eyes need not be specified.

Figure 26:
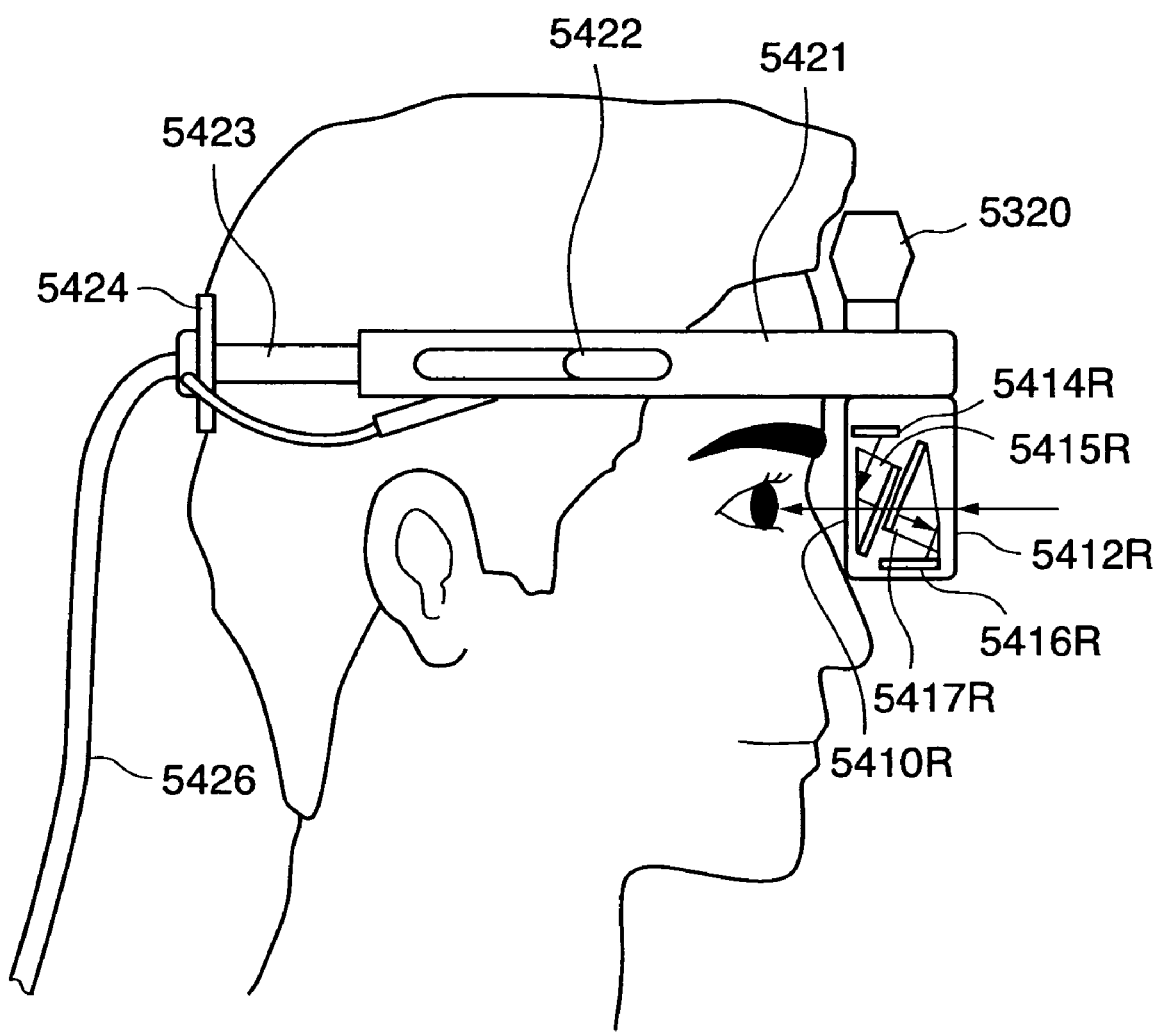
FIG. 26 shows the arrangement of a display device (HMD)
Figure 27:
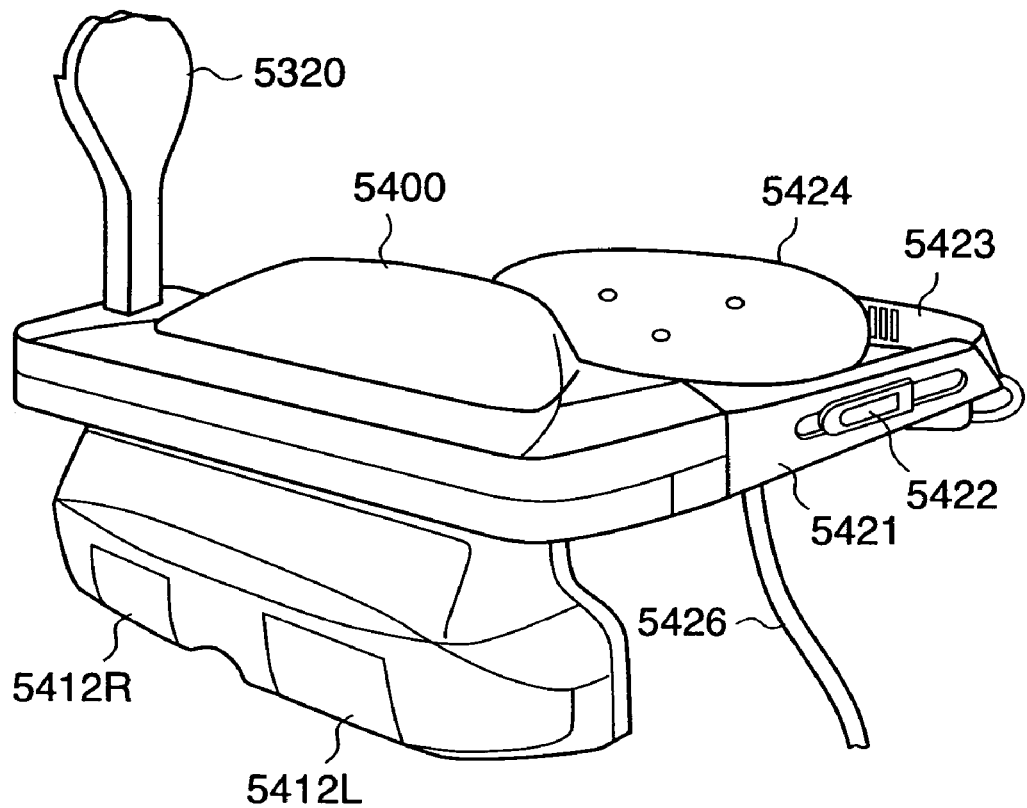
FIG. 27 shows the arrangement of the display device (HMD)
Figure 28:
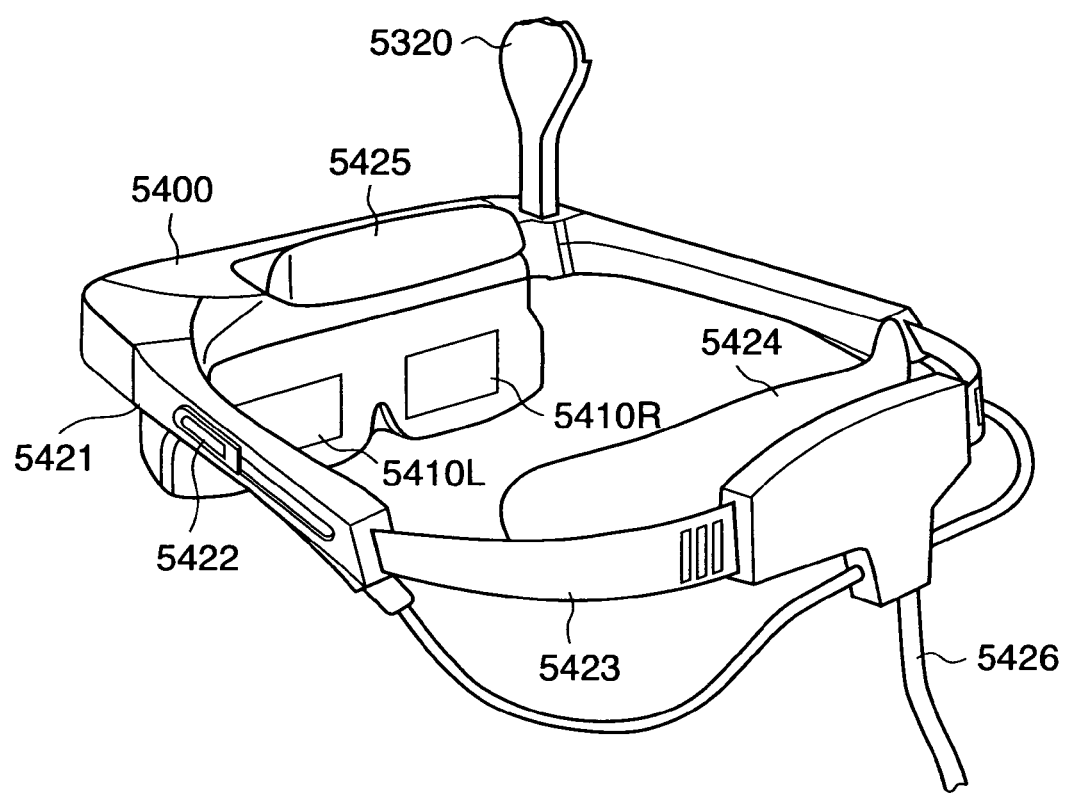
FIG. 28 shows the arrangement of the display device (HMD)

FIG. 26 shows the basic arrangement of the HMD, and FIGS. 27 and 28 are perspective views showing the outer appearance of the HMD 5400. Reference numeral 5320 denotes a position direction sensor receiver, which is provided near the viewpoint position of the observer, and operates together with a position/orientation sensor transmitter 5310 and main body 5300 (to be described later) to always measure the viewpoint position and orientation of the observer on a coordinate system defined by the position/orientation sensor transmitter 5310.

Reference numerals 5410, 5414, and 5415 denote components which form a display system. An image displayed by each color liquid crystal display 5414 is guided by each optical prism 5415, and is displayed on each display unit 5410. Reference numerals 5412, 5416, and 5417 denote components which form an image sensing system. Light input from outside the HMD via each input unit 5412 is guided into the HMD by each optical prism 5417, and is received by each CCD 5416.

Output light of the optical prism 5415 and input light of the optical prism 5417 agree with the optical axis of the pupil of the observer. Each CCD 5416 captures a real space image at the viewpoint position and orientation of the observer. Each color liquid crystal display 5414 displays a mixed reality space image which is obtained by compositing a real space image acquired by the corresponding CCD 5416 and a virtual space image which is generated according to the viewpoint position and orientation of the observer calculated by the position/orientation sensor main body 5300.

Reference numerals 5421 to 5425 denote building components required for the observer to wear the HMD on his or her head. In order to wear the HMD 5400 on the head, the observer wears it on the head while slackening a length adjustment portion 5423 by an adjuster 5422. Then, he or she brings a forehead mount portion 5425 into contact with the forehead, and fastens the length adjustment portion 5423 by the adjuster 5422 so that temporal and occipital mount portions 5421 and 5424 contact the temporal and occipital regions of the head. Reference numeral 5426 denotes a cable that combines power supply and signal lines for the color liquid crystal displays 5414, CCDs 5416, and position/orientation sensor receiver 5320.

Position/Orientation Sensor

Figure 29:
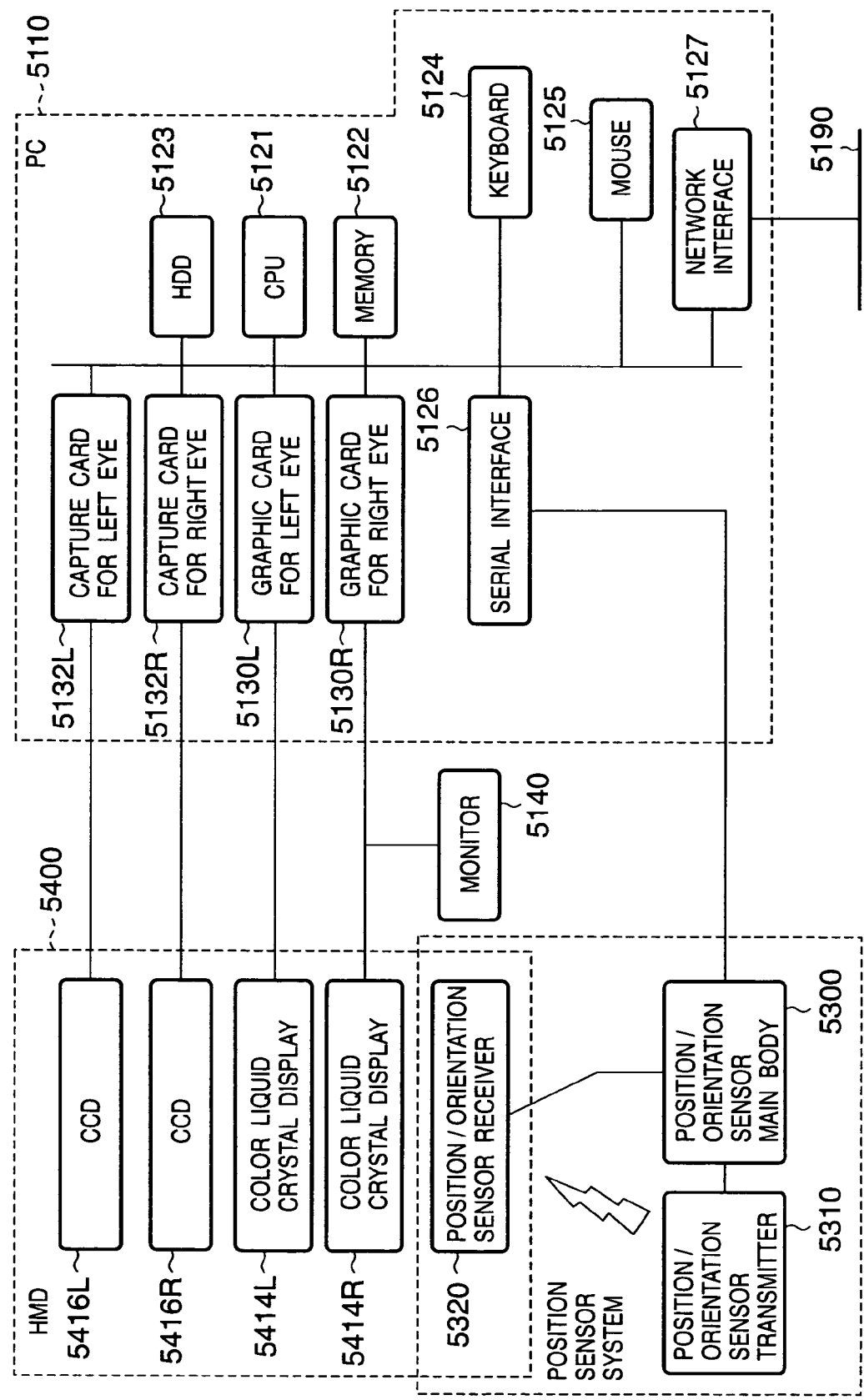
FIG. 29 is a block diagram showing the arrangement of an observer mixed reality space image processing apparatus.

The principle of measuring the viewpoint position and orientation of the observer by the position/orientation sensor will be described below. As shown in FIG. 29, the sensor system (position/orientation acquisition device) comprises the position/orientation sensor main body 5300, position/orientation sensor transmitter 5310, and position/orientation sensor receiver 5320.

The position/orientation sensor receiver 5320 and position/orientation sensor transmitter 5310 are connected to the position/orientation sensor main body 5300. The position/orientation sensor transmitter 5310 transmits a magnetic signal, which is received by the position/orientation sensor receiver 5320. The position/orientation sensor main body 5300 calculates the position and orientation of the position/orientation sensor receiver 5320 using a known technique on the basis of the strength of the magnetic signal received by the position/orientation sensor receiver 5320.

Since the calculated position and orientation are values corresponding to the coordinate system of the position/orientation sensor transmitter 5310, the calculation results are sent to the observer image processing apparatus, and are converted into the viewpoint position and visual axis direction of the observer 5100 on the coordinate system 5200. Since the detailed sequence about coordinate conversion is not the gist of the present invention, a description thereof will be omitted. However, assume that parameters for conversion are measured in advance, and are recorded in the observer image processing apparatus in an accessible format of the position/orientation acquisition program.

Note that this embodiment is achieved on the assumption that "FASTRAK" available from Polhemus Inc. (USA), "Flock of Birds" available from Ascension Technology Corporation (USA), or the like is used as the position/orientation acquisition device. However, the present invention is not limited to such specific devices, and other commercially available ultrasonic or optical position/orientation sensors may be used.

Using the position sensor system (5300, 5310, 5320), the observer 5100 can freely change his or her viewpoint position and visual axis direction, and can observe a mixed reality space image according to the changed viewpoint position and visual axis direction via the HMD 5400.

The arrangements of each observer image processing apparatus, objective image processing apparatus, and mixed reality space management apparatus will be described in detail below.

Detail of Observer Image Processing Apparatus

FIG. 29 is a block diagram showing the basic arrangement of the observer image processing apparatus which generates a mixed reality space image for one observer, and the HMD 5400 in this embodiment. The arrangement shown in FIG. 29 can be roughly classified into the PC 5110, HMD 5400, monitor 5140, and position sensor system (5300, 5310, 5320).

The PC 5110 comprises capture cards 5132, graphic cards 5130, a serial interface 5126, HDD 5123, CPU 5121, memory 5122, keyboard 5124, mouse 5125, and network interface 5127.

Each capture card 5132 serves as an interface used to connect the PC 5110 and the corresponding CCD 5416 of the HMD 5400, and each frame image of the real space captured by that CCD 5416 is transferred to the memory 5122 via the corresponding capture card 5132.

Each graphic card 130 has a function of generating and displaying three-dimensional computer graphics (3DCG) data as an image of each virtual object in collaboration with the PC 5110 and a program running on the PC 5110.

The HDD 5123 saves programs (mixed reality space image generation program, position/orientation acquisition program, and the like) and data (mixed reality space management information, a scenario that describes states of the mixed reality space according to an elapse of time, shape data of virtual space objects, position/orientation conversion parameters, and the like) required to control the overall PC 5110. These programs and data are loaded onto the memory 5122 by the CPU 5121 as needed.

The CPU 5121 controls respective units of the PC 5110 by executing the programs loaded on the memory 5122 and by referring to the data loaded on the memory 5122. The CPU 5121 can generate a mixed reality space image and control the overall PC 5110. The memory 5122 allows read/write access. The memory 5122 has an area for temporarily storing a program to be executed by the CPU 5121, which is loaded from the HDD 5123, and data used upon executing the program, and also a work area which is used by the CPU 5121 upon executing respective processes.

Of course, the memory 5122 has an area on which a mixed reality space image as an image formed by superimposing the virtual and real space images is to be rendered. The keyboard 5124 and mouse 5125 are used as pointing devices for inputting various instructions to the CPU 5121. These pointing devices are used to input, e.g., the layout position of each virtual object, state setups of the virtual space, and the like.

As described above, the CCDs 5416 are connected to the capture cards 5132. Each CCD 5416 captures a moving image of the real space, and outputs each captured frame image to the memory 5122 via the corresponding capture card 5132.

One of the color LCDs 5414 and the monitor 5140 are connected to the graphic card 5130, as described above, so as to display 3DCG data generated by the graphic cards 5130, and also a moving image of the real space, which is captured by the corresponding CCD 5416 and is superimposed on the 3DCG data. That is, these display means are used to display a mixed reality space image. Furthermore, one of the color LCDs 5414 and the monitor 5140 display not only the mixed reality space image but also information required upon operating the PC 5110 (system messages, a system setup window, and the like).

The position/orientation sensor main body 5300 is connected to the serial interface 5126. The position/orientation sensor main body 5300 sends the position and orientation of the position/orientation sensor receiver 5320, which are calculated based on the strength of the magnetic signal obtained by the position/orientation sensor transmitter 5310 and the position/orientation sensor receiver 5320 built in the HMD 5400 mounted on the observer's head, to the PC 5110 via the serial interface 5120.

The PC 5110 converts the position and orientation of the position/orientation sensor receiver 5320 into those on the coordinate system 5200, and transmits them to the PC 5115 of the mixed reality space management apparatus in a predetermined format together with other data to be described later.

Detail of Objective Image Processing Apparatus

Figure 30:
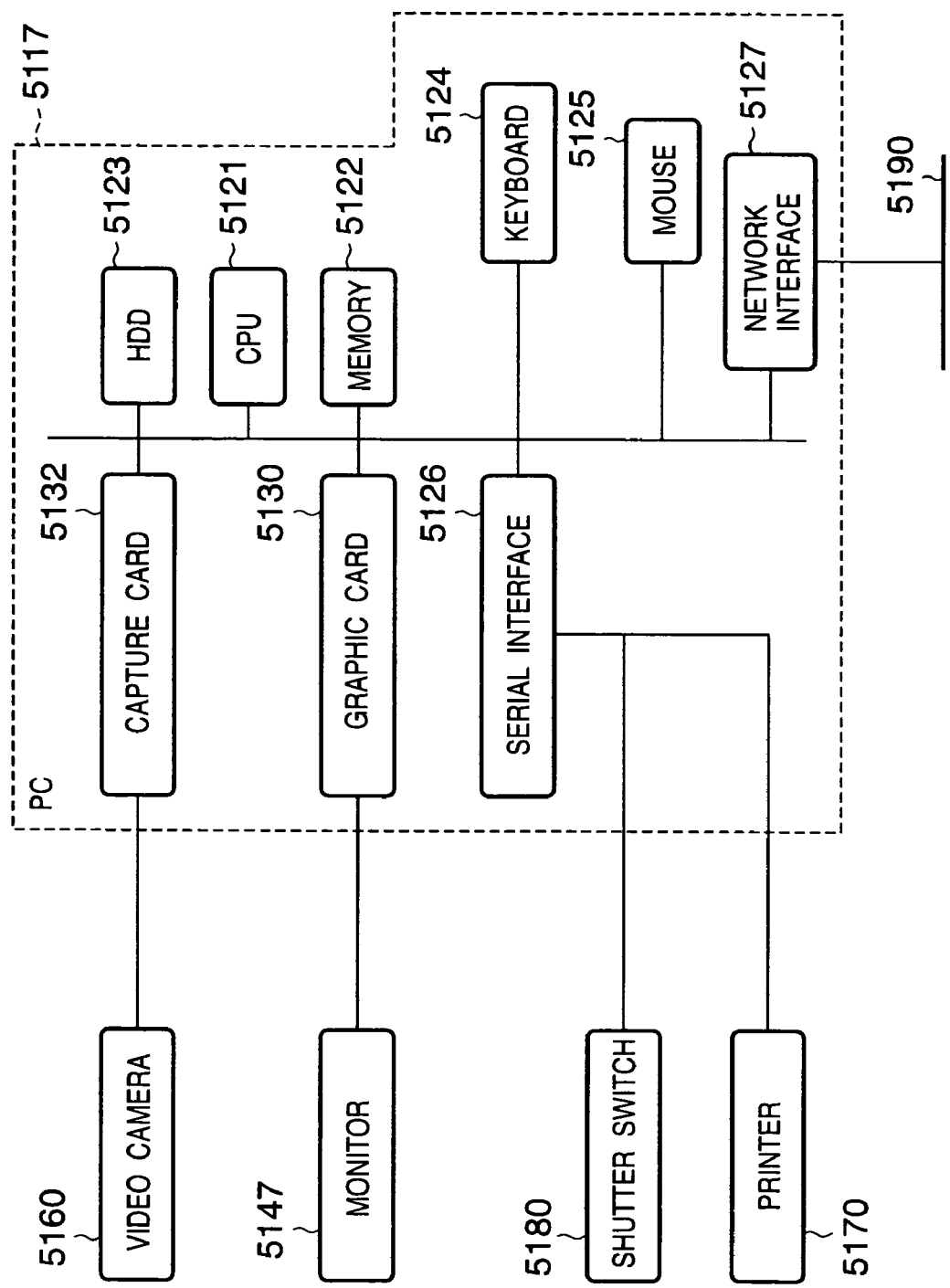
FIG. 30 is a block diagram showing the arrangement of an objective mixed reality space image processing apparatus.

The objective image processing apparatus will be described below. FIG. 30 is a block diagram showing the basic arrangement of the objective image processing apparatus system in this embodiment, and also the relationship with devices used to output a mixed reality image from the objective image processing apparatus system onto a paper medium. Note that the same reference numerals in FIG. 30 denote the same building components as those shown in FIG. 29, and a description thereof will be omitted.

The basic arrangement of the PC 5117 in FIG. 30 is substantially the same as that of the PC 5110 shown in FIG. 29, except that the printer 5170 and shutter switch 5180 are connected to the serial interface 5126.

The printer 5170 prints mixed reality space image data, which is rendered on the memory 5122 by the PC 5117, on a paper medium at the depression timing of the shutter switch 5180.

Detail of Mixed Reality Space Management Apparatus

The mixed reality space management apparatus will be described below. The mixed reality space management apparatus comprises only a PC 5115 having a network interface. Note that the internal arrangement of the PC 5115 is substantially the same as that of the PC 5117, and a description thereof will be omitted.

Programs

Figure 31:
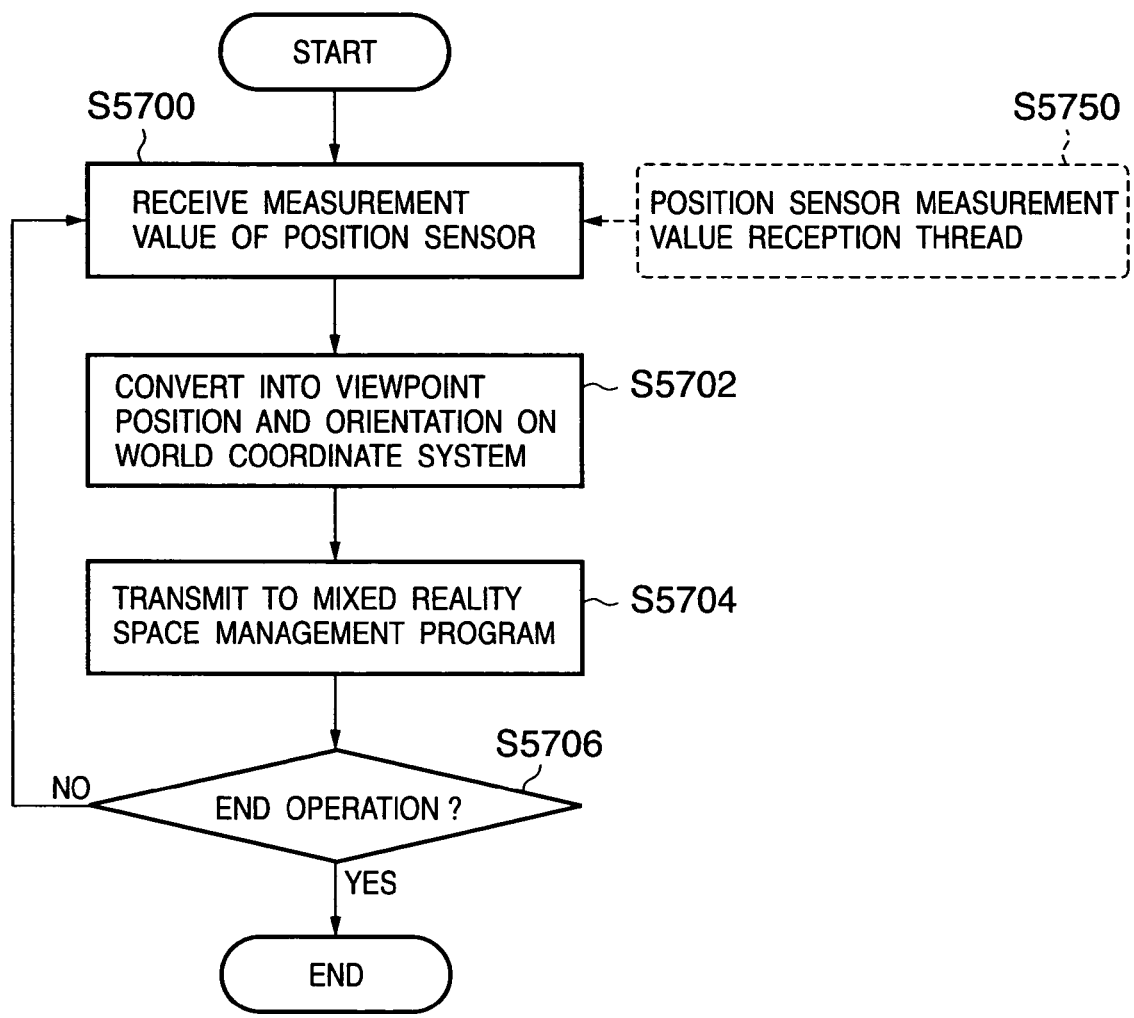
FIG. 31 is a flow chart of a position/orientation acquisition program.
Figure 32:
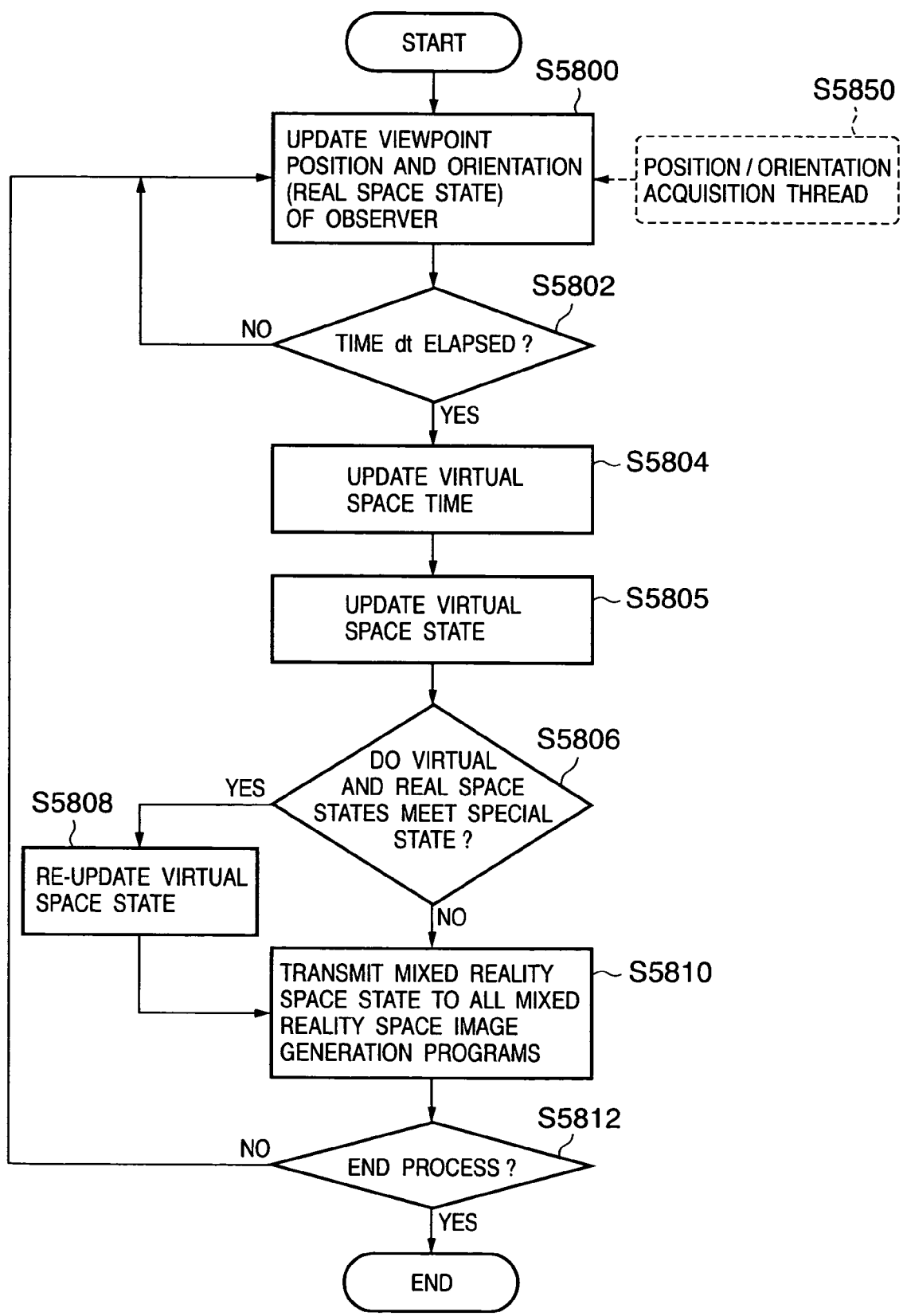
FIG. 32 is a flow chart of a mixed reality space management program.

The processes implemented based on the position/orientation acquisition program, mixed reality space management program, and mixed reality space image generation program, which run on the objective image processing apparatus, observer image processing apparatuses, and mixed reality space management apparatus, will be described in detail below using the flow charts shown in FIGS. 31 to 33. Note that all programs are prepared using threads as one of parallel programming techniques, and a main program and threads created by that main program operate at the same time.

Position/Orientation Acquisition Program

The process implemented upon executing the position/orientation acquisition program will be described below using the flow chart in FIG. 31.

When the position/orientation acquisition program is started on the PC 5110 of each observer image processing apparatus, a position sensor measurement value reception thread is generated. The position sensor measurement value reception thread repetitively receives measurement values from the position sensor system via the serial interface and transmits them to the main program (S5750).

The main program receives the measurement values (S5700), converts them into a viewpoint position and orientation on the coordinate system 5200 (world coordinate system) (S5702), transmits the converted values to the mixed reality space management program via the network 5190 (S5704), and then executes a process for ending operations (S5706).

Furthermore, when the position/orientation acquisition program is started on the PC 5117 of the objective image processing apparatus, a position sensor measurement value reception thread is generated in the same manner as that generated upon starting the program on the observer image processing apparatus.

The position sensor measurement value reception thread attempts to receive measurement values from a position sensor system via the serial interface. However, since no position sensor system is connected to the objective image processing apparatus, the position sensor measurement value reception thread periodically transmits the position and orientation (fixed values) of the video camera 5160, which are set in the program in advance, to the main program (S5750).

The main program receives the fixed values (S5700), converts them into a viewpoint position and orientation on the coordinate system 5200 (world coordinate system) (S5702), transmits the converted values to the mixed reality space management program via the network 5190 (S5704), and then returns to S5700, repeats transmission.

In this way, all the position/orientation acquisition programs transmit the viewpoint positions and orientations of the observers or those of the fixed camera to the mixed reality space management program.

Mixed Reality Space Management Program

The process implemented upon executing the mixed reality space management program will be described below using the flow chart in FIG. 32.

When the mixed reality space management program is started on the PC 5115 of the mixed reality space management apparatus, a position/orientation acquisition thread is generated. The position/orientation acquisition thread repetitively receives the viewpoint positions and orientations of the observers or those of the fixed camera transmitted from all the position/orientation acquisition programs (mixed reality space information), and transmits them to the main program (S5850).

The main program receives the viewpoint position and orientation values (S5800), waits for an elapse of a predetermined time period dt (S5802), sets forward a time of the virtual space to be managed by dt (S5804), and updates the positions, orientations, and states (virtual space state information) of virtual space objects in accordance with the scenario pre-stored in the HDD 5123 and the elapsed time (S5805).

Subsequently, the main program determines whether or not a virtual space object and real space object (the viewpoint position and orientation of each observer) meet a special relationship in the scenario (S5806). (For example, both of objects collide.) If such special relationship is met, the main program updates the positions, orientations, and states (virtual space state information) of virtual space objects again in accordance with the scenario as in step S5805 (S5808). (For example, explosion occurred.) The main program then transmits the mixed reality space state information (real space state information and virtual space state information) updated in this way to all running mixed reality space image generation programs via the network 5190 (S5810), and then executes a process for ending operations (S5812).

In this way, the mixed reality space management program systematically manages and updates mixed reality space information in accordance with the scenario prepared in advance, and transmits the updated information to all the mixed reality space image generation programs.

Mixed Reality Space Image Generation Program

The process implemented upon executing the mixed reality space image generation program will be described below using the flow chart in FIG. 33.

At first, the process implemented when the PC 5110 of the observer image processing apparatus system executes the mixed reality space image generation program will be described.

When the mixed reality space image generation program is started on the PC 5110 of each observer image processing apparatus, a video capture thread and image output thread is generated.

The video capture thread intermittently acquires real space images captured by the CCDs 5416 of the HMD 5400 via the video capture cards 5132, and continuously transmits the captured images to the main program.

The image output thread is a program for outputting a mixed reality space image from the printer 5170 upon operation of the shutter switch 5180. Since neither the printer 5170 nor shutter switch 5180 are connected to each observer image processing apparatus of this embodiment, the image output thread executes no process.

Upon reception of the mixed reality space state information sent from the mixed reality space management program (S5902), the main program generates a virtual space image using the received positions, orientations, and states of virtual space objects, and 3DCG data loaded from the HDD 5123 onto the memory 5122, and renders it on the memory 5122 (S5904). This process will be referred to as a first method hereinafter.

In order to present a mixed reality space video with deep sense of immersion to each observer, even when the generated virtual space image is different from an actually captured image as a still image itself, and has a low quality such that it is barely recognized by the observer as a 3DCG image, it is important that each observer can recognize a series of mixed reality images, which are generated successively, as a moving image, and can feel that each virtual space object autonomously and livelily moves in the mixed reality space as if it were a real space object. Therefore, it is desirable that the virtual space image generation process is completed within a period of time as short as 15 to 40 msec, even if the generated image has low reality as a still image. If such requirement is met, the generation method is not particularly limited.

Subsequently, the main program renders a real space image sent from the aforementioned video capture thread on the memory 5122 (S5906), and also renders a mixed reality space image obtained by superimposing the previously generated virtual space images on the real space image on the memory 5122. This mixed reality space image is output to the HMD 5400 and monitor 5140 via the graphic cards 5130 (S5908).

By repeating the aforementioned process, successive mixed reality space images, i.e., a mixed reality space video can be presented to each observer.

Note that the processes after step S5910 and the process of the image output thread are not executed on each observer image processing apparatus to which neither the printer 5170 nor shutter switch 5180 are connected. Hence, a detailed description of these processes will be given in the description of the mixed reality space image generation program on the objective viewpoint image processing apparatus.

The process implemented when the PC 5117 of the objective image processing apparatus system executes the mixed reality space image generation program will be described below with reference to FIG. 33 which is a flow chart of that process.

When the mixed reality space image generation program is started on the PC 5117 of the objective viewpoint image processing apparatus, a video capture thread and image output thread are generated. The video capture thread intermittently acquires a real space image captured by the video camera 5160 via the video capture card 5132, and continuously transmits the captured image to the main program (S5970).

The image output thread is a program for outputting a mixed reality space image from the printer 5170 upon operation of the shutter switch 5180. The image output thread waits until the main program generates a shutter event. Upon generation of the shutter event, the image output thread outputs a mixed reality image from the printer 5170 (S5950).

The processes in steps S5902 to S5908 and step S5970 are the same as those of the mixed reality space image generation program on the PC 5110 of the aforementioned observer image processing apparatus. Hence, by repeating these processes, successive mixed reality space images, i.e., a mixed reality space video can be presented to each observer. Furthermore, the printer 5170 and shutter switch 5180 are connected to the PC 5117 of the objective viewpoint image processing apparatus, and the following process is executed.

After the mixed reality space image is generated and displayed (S5908), the main program checks if the shutter switch 5180 has been operated (S5910). If the shutter switch 5180 has been operated, the main program generates a shutter event (S5912), and then executes a process for ending operations (S5914). Note that the event means communication means to threads managed in this program.

Upon generation of the shutter event, the image output thread (S5950) restarts its operation (S5952), generates a virtual space image to be output to the printer 5170 using the received positions, orientations, and states of virtual space objects and 3DCG image data loaded from the HDD 5123 onto the memory 5122, and renders it on the memory 5122 (S5954). This process will be referred to a second method hereinafter.

In step S5904, a virtual space image is generated by the method that can complete the process within a short period of time even when the generated image has low reality as a still image. However, in this step, it is desirable that virtual object images are generated by a method (different from that in step S5904) that generates virtual space images which merge with an actually captured image as 3DCG still images and have high reality, even when a relatively long period of time is required.

For example, various methods such as a method (e.g., ray tracing, radiosity, or the like) which calculates the influences of light reflection in detail, a method which calculates by increasing the number of bits of numerical value precision, a method that calculates the vertical and horizontal pixel sizes of the virtual space image using arbitrary values within the range of the product of the resolution and print size of the printer 5170, and the like, are available.

The virtual space image generated in this way is superimposed on the real space image acquired in step S5906 (S5956). When the virtual space image and real space image have different vertical and horizontal pixel sizes due to the aforementioned generation method, an image with smaller pixel sizes can be enlarged to match those of a larger image using a known interpolation technique. Finally, the generated mixed reality space image is transmitted to the printer 5170 (S5958).

Since the image output thread and main program operate parallelly, even when the generation process of the mixed reality space image to be printed takes a long time, the processes in steps S5902 to S5914 are repeated without being interrupted, and the mixed reality space image is continuously displayed on the monitor 5147. Hence, a high-quality printout of the mixed reality space image can be obtained without disturbing the experience of the mixed reality space.

Mixed Reality Space Image Example

Figure 34:
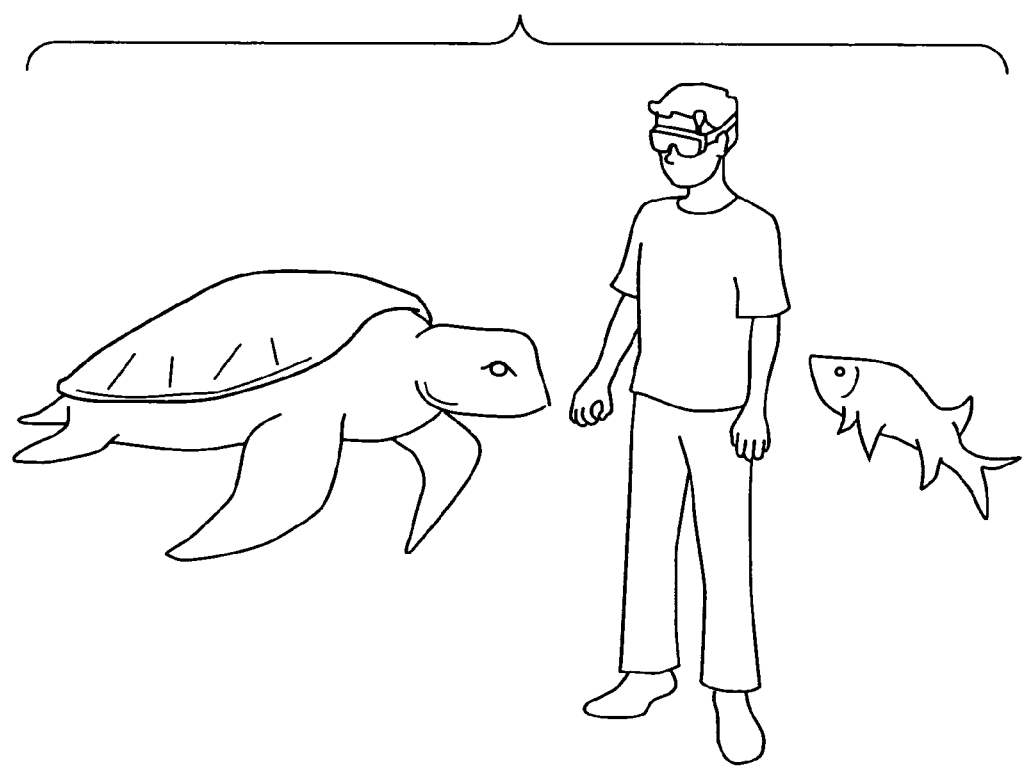
FIG. 34 shows an example of a mixed reality image on a display screen.

An example of the mixed reality space image will be described below. FIGS. 34 and 35 respectively show an example of the mixed reality space image which is composited in step S5908 and is displayed on the monitor and HMD, and an image example of the mixed reality space image which is composited in step S5956 and is output from the printer 5170. As can be seen from FIGS. 34 and 35, both the mixed reality space images are obtained at the same time, viewpoint, and visual axis direction, but the mixed reality space image to be output from the printer 5170 is a high-quality image which merges a real object.

This embodiment realizes a high-quality printout by generating a virtual space image to be displayed and that to be printed using different generation methods. Alternatively, a high-quality printout may be realized using different data for an image to be displayed and that to be printed.

More specifically, model data expressed by a larger number of polygons or more accurate texture data of identical virtual objects may also be pre-stored in the HDD 5123, and may be selectively used in the processes of steps S5906 and S5954, thus obtaining the same effect. Furthermore, a high-quality printout may be realized by combining both the generation methods and data.

Ninth Embodiment

This embodiment will exemplify a case wherein when a virtual space object overlaps the observer from the viewpoint of an image sensing device, a mixed reality space image is generated by removing that virtual space object from the mixed reality space.

Noted that the apparatus arrangement and program arrangement are the same as that eighth embodiment.

In this embodiment, all processing apparatuses are set in advance with serial numbers (apparatus numbers) in whole system. And every real and virtual objects are set in advance with serial numbers (ID numbers) used to identify.

All objects are set in advance with object type number and type number according to its type, to identify type of object. The object type number is used to identify whether that is real object or virtual object. If the object is real object, object type number is 0. If not, that is 1. The type number is used to identify type of object.

If object type is real object, observer camera is 0, objective camera is 1, observer is 2. If object type is virtual object, shark is 0, turtle is 1.

Furthermore, for real object, each object has physical shape information (boundary volume and the like) in the mixed reality space.

In this embodiment, all apparatus share above information and special information of each object, by transmitting and receiving the mixed reality object table and the object relationship table (described later) each other.

Position/Orientation Acquisition Program

Figure 36:
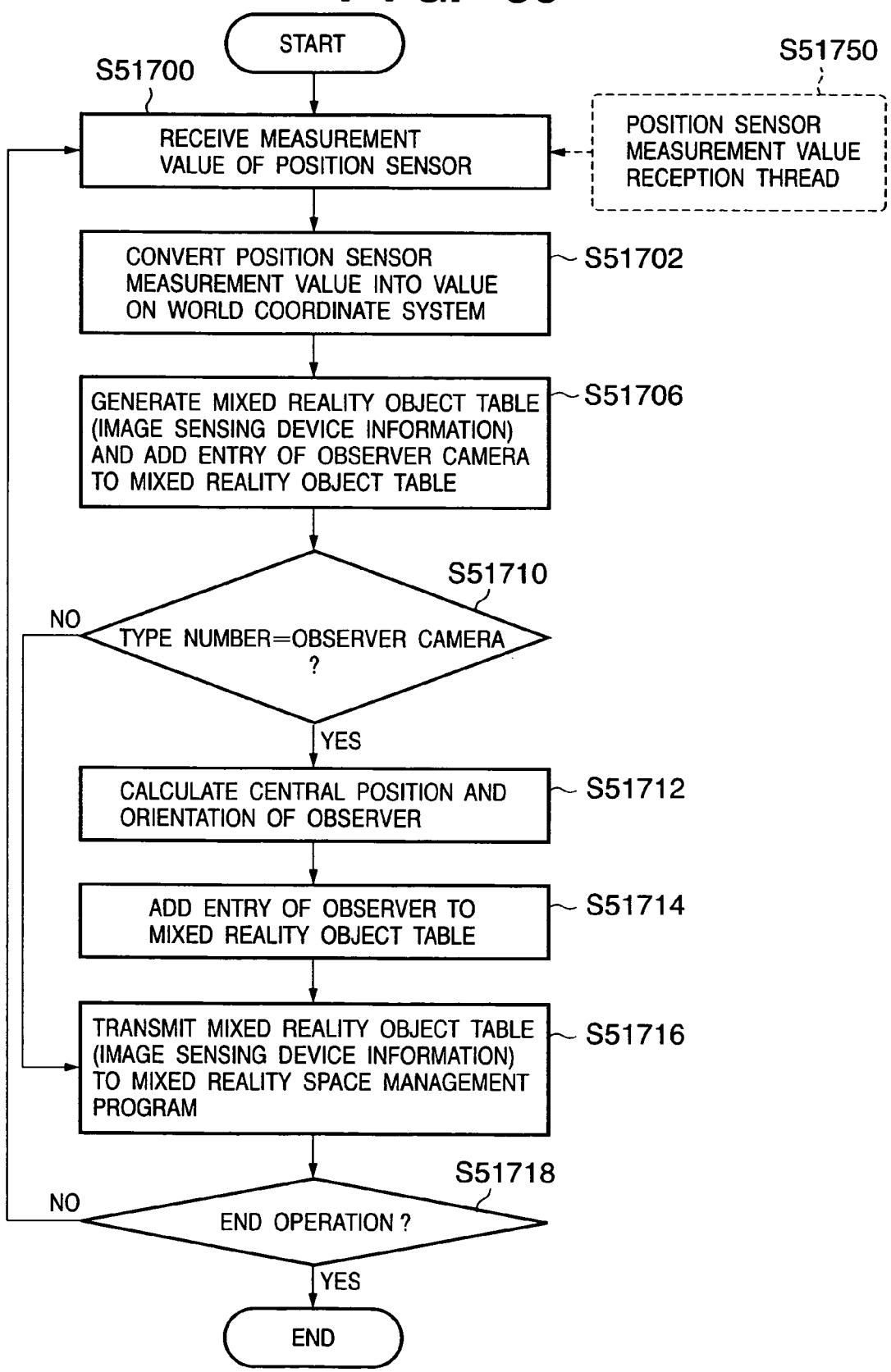
FIG. 36 is a flow chart of a position/orientation acquisition program in the ninth embodiment.

The process implemented when the position/orientation acquisition program is executed by the observer image processing apparatus and objective image processing apparatus will be described below using the flow chart of FIG. 36.

When the position/orientation acquisition program is started on the PC 5110 of each observer image processing apparatus, a position sensor measurement value reception thread is generated.

The position sensor measurement value reception thread repetitively receives measurement values from the position sensor system via the serial interface and transmits them to the main program (S51750). The main program receives the measurement values (S51700), and converts them into a viewpoint position and orientation on the coordinate system 5200 (world coordinate system) (S51702). The converted values are stored as one entry of a mixed reality object table (image sensing device information) assured on the memory 5122 together with the object type number, apparatus number, ID number, type number, and additional information (S51706).

FIG. 44 shows the mixed reality object table. The mixed reality object table consists of a plurality of entries, each of which is made up of six fields, i.e., object type number, apparatus number, ID number, type number, and additional information fields.

Figure 41:
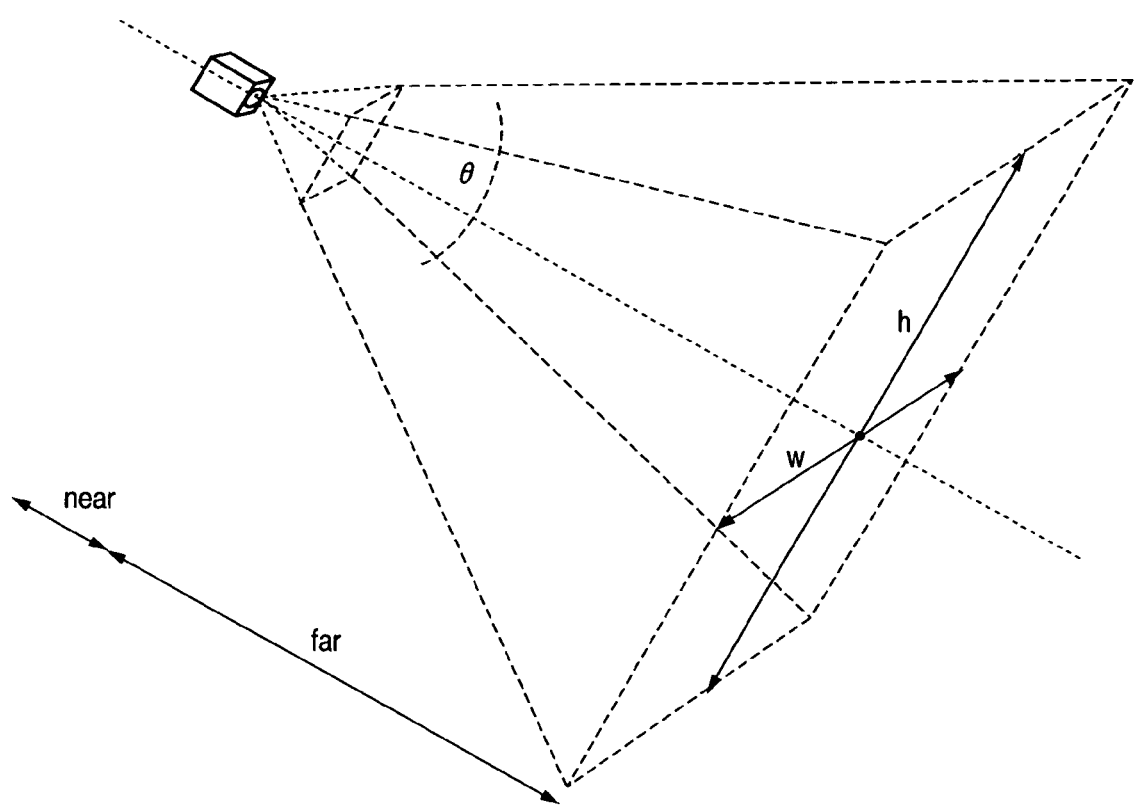
FIG. 41 shows an example of a viewing frustum.

FIG. 45 shows the detailed contents of the entry added in step S51706. The object type number field stores "0" that indicates a real object. The apparatus number and ID number fields store values obtained by reading out those which are pre-set in the PC 5110. The type number field stores "0" that indicates an observer camera. Subsequently, the viewpoint position and visual axis direction of the right eye of the observer, which are converted in step S51702, are stored. Finally, additional information follows. The additional information is special information according to the object type number and type number, and values (camera parameters) which form a viewing frustum that defines the image sensing range of a real image sensing camera are stored in case of the observer camera. More specifically, values θ, far, near, w, h, and the like shown in FIG. 41 are stored.

It is then checked if the type number indicates an observer camera (S51710). If the type number indicates an observer camera, the central position and orientation of the observer are calculated based on the previously calculated viewpoint position and visual axis direction of the observer (S51712). Note that the central position of the observer is an arbitrarily set position. For example, the central position may be set near the center of the head or near the epigastrium. After the central position of the observer is set, the central position and orientation of the observer are stored as one entry of the mixed reality object table together with other data (S51714).

Figure 42:
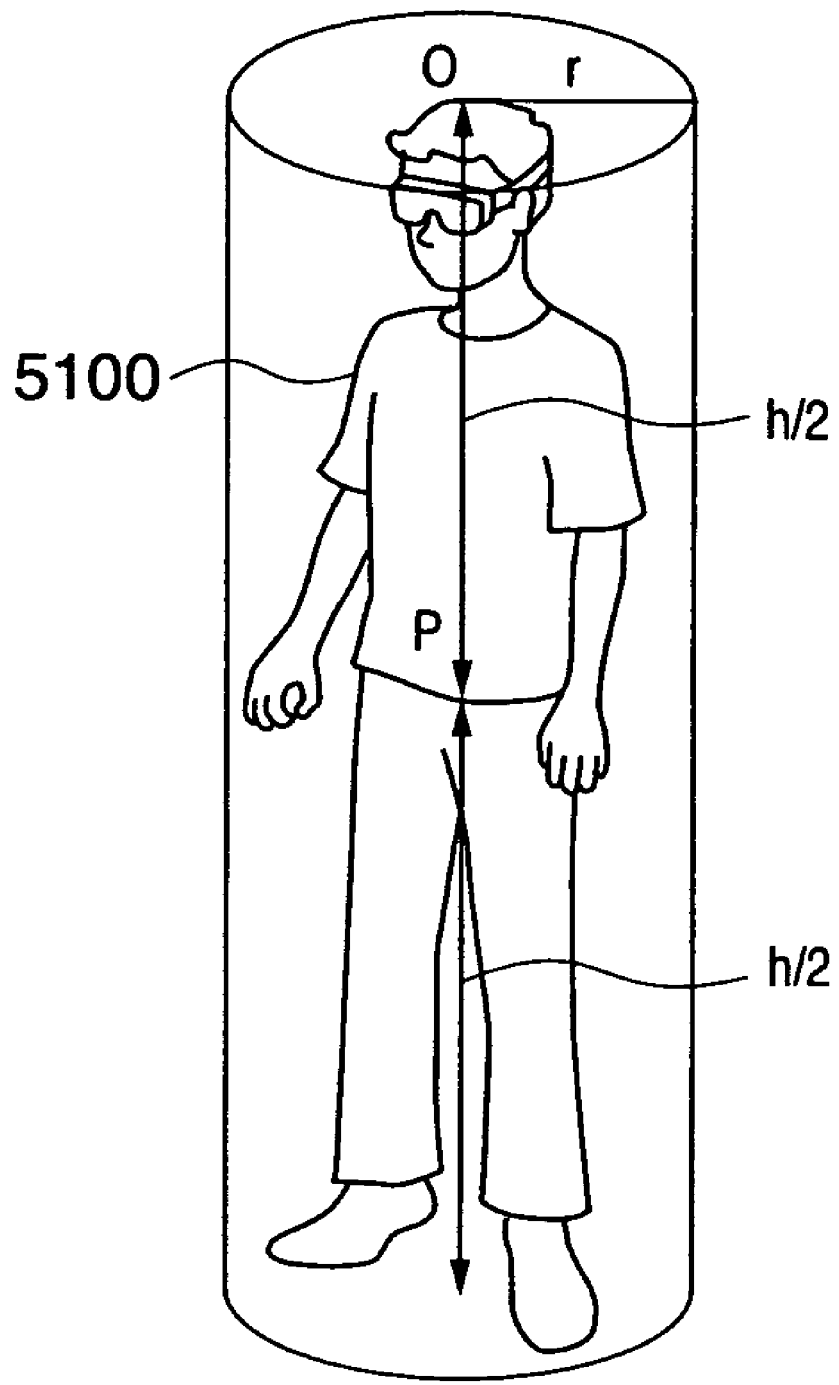
FIG. 42 shows an example of an observer shape in a mixed reality space.

FIG. 46 shows the detailed contents of the entry generated in this step. The object type number field stores "0" that indicates a real object. The apparatus number and ID number fields store values obtained by reading out those which are pre-set in the PC 5110. The type number field stores "2" that indicates the observer himself or herself. Subsequently, the central position and orientation of the observer calculated in step S51712 are stored. Finally, additional information follows. The additional information in case of the observer is observer shape information. More specifically, radius r and height h of a column, which can completely cover the observer 5100 himself or herself, as shown in FIG. 42, are stored. Center P of this column corresponds to the aforementioned central position of the observer, and whether or not the observer contacts a virtual object in the mixed reality space is determined based on these pieces of information.

The mixed reality object table is generated in this way. The mixed reality object table generated in this manner is transmitted to the mixed reality space management program via the network 5190 (S51716). The aforementioned process is repeated, and a process for ending operations is then made (S51718).

When the position/orientation acquisition program is started on the PC 5117 of the objective image processing apparatus, a position sensor measurement value reception thread is generated in the same manner as that generated upon starting the program on the observer image processing apparatus.

The position sensor measurement value reception thread attempts to receive measurement values from a position sensor system via the serial interface. However, since no position sensor system is connected to the objective image processing apparatus, the position sensor measurement value reception thread periodically transmits the position and orientation of the video camera 5160 (S51750). These values are fixed values which are set in advance in the processing apparatus.

After that, the mixed reality object table shown in FIG. 44 is generated in the same sequence as that of the position/orientation acquisition program on the observer image processing apparatus.

FIG. 47 shows the detailed contents of the entry generated in this case. The object type number field stores "0" that indicates a real object. The apparatus number and ID number fields store values obtained by reading out those which are pre-set in the PC 5117. The type number field stores "1" that indicates an objective camera. Subsequently, the viewpoint position and visual axis direction of the video camera 5160 converted in step S51702 are stored. Finally, additional information follows. As the additional information, values which form a viewing frustum are stored as in the observer camera.

The mixed reality object table generated in this manner is transmitted to the mixed reality space management program via the network 5190 (S51716). The aforementioned process is repeated. Note that the processes in steps S51712 and S51714 are skipped since the type number indicates the objective camera. In this manner, all the position/orientation acquisition programs transmit image sensing device information to the mixed reality space management program in the form of the mixed reality object table.

Mixed Reality Space Management Program

Figure 37:
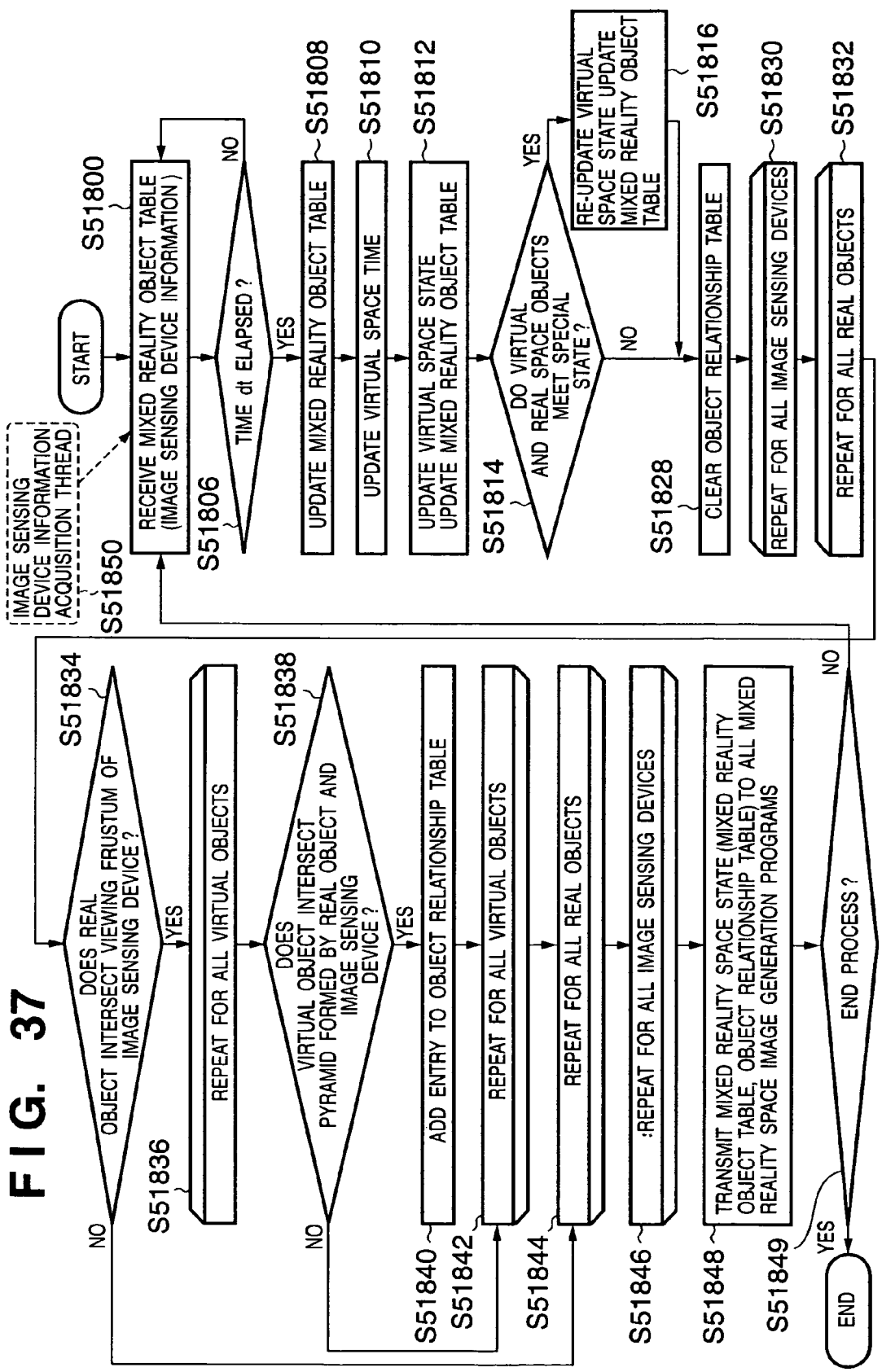
FIG. 37 is a flow chart of a mixed reality space management program in the ninth embodiment.

The process implemented upon executing the mixed reality space management program will be described below using the flow chart of FIG. 37. When the mixed reality space management program is started on the PC 5115 of the mixed reality space management apparatus, an image sensing device information acquisition thread is generated.

The image sensing device information acquisition thread repetitively receives mixed reality object tables (image sensing device information) transmitted from all the position/orientation acquisition programs, and transmits them to the main program (S51850).

The main program receives the mixed reality object tables (S51800), and waits for an elapse of a predetermined time period dt (S51806). Then, the main program updates real object entries (those with object type number=0) of the mixed reality object table held by itself by the mixed reality object tables received in the previous step (S51808).

The main program sets forward the time of the virtual space to be managed by dt (S51810), advances the scenario pre-stored in the HDD 5123 in accordance with the elapsed time, and updates the positions, orientations and states of all virtual space objects. The main program then updates virtual object entries (those with object type number=1) in the mixed reality object table held by itself by the updated virtual space object information of these objects (S51812).

Figure 48:
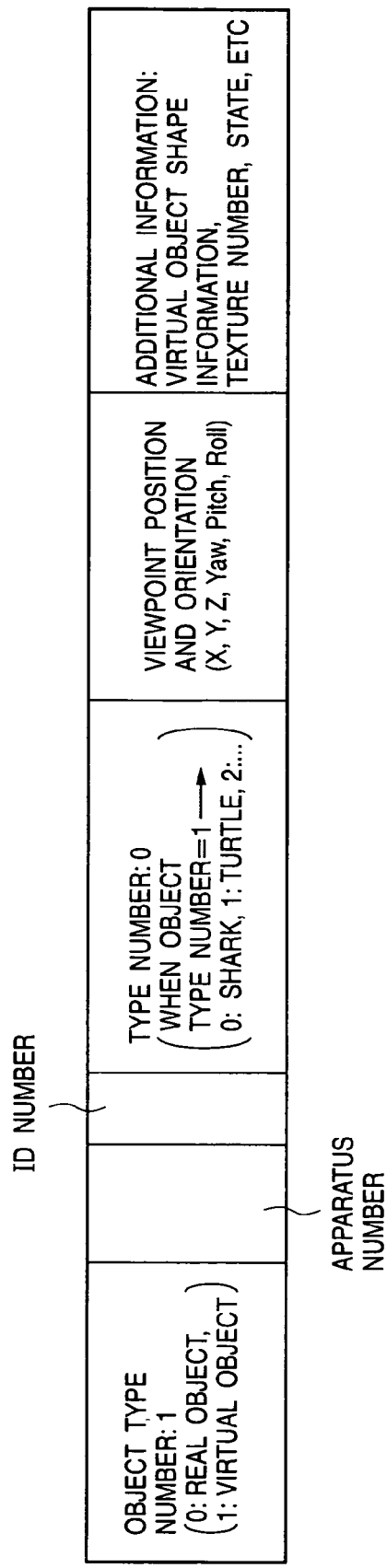
FIG. 48 shows entry example 4 of the mixed reality object table.

FIG. 48 shows the detailed contents of the entry to be updated. The object type field stores "1" that indicates a virtual object. The apparatus number field stores a value obtained by reading out that which is pre-set in the PC 5115. The ID number field stores a serial number of a virtual space object managed by this program. The type number indicates the type of virtual space object managed by this program. In this case, "0" indicates a shark, and "1", a turtle. The position/orientation field stores values that indicate the central position and direction of the virtual object of interest. The additional information field stores information used to express the virtual object of interest. For example, a texture data number used to express that virtual space object, and data indicating status of the virtual object are stored. Assume that these values are set in accordance with the scenario. Also, this field stores radius r' and height h' of a column that completely covers the virtual object itself, so as to check if the virtual object contacts in the mixed reality space. As in the aforementioned observer, the center of the column corresponds to the central position of the virtual object.

Subsequently, the main program determines whether or not a virtual space object and real space object (the viewpoint position and orientation of each observer) meet a special relationship in the scenario (S51814). If such special relationship is met, the main program updates the positions, orientations, and states (virtual space state information) of virtual space objects again in accordance with the scenario as in step S51812 (S51816). Such special state indicates, e.g., collision between a virtual object and real object (observer) in the mixed reality space.

In this way, the update process of the mixed reality space is realized.

Subsequently, a process for examining whether or not a virtual space object is present between the image sensing device and observer (superposition has occurred) is executed.

As information indicating occurrence of superposition, this embodiment uses an object relationship table shown in FIG. 49. When this table has any entry, it indicates that superposition has occurred. Each entry of the object relationship table is made up of four fields, i.e., a field for storing the apparatus number of an apparatus to which an objective camera or observer camera is connected, a field for storing the ID number of the objective camera or observer camera, a field for storing the ID number of the observer, and a field for storing the ID number of a virtual object, as shown in FIG. 49.

FIG. 50 shows an example of an entry of the object relationship table. The entry of the object relationship table shown in FIG. 50 indicates that a virtual object with the ID number=6 is present between the camera with the apparatus number=1 and ID number=1, and the observer with the ID number=2.

The main program clears the object relationship table held by itself to prepare for checking occurrence of superposition (S51828).

The main program detects if an observer appears in an image captured by a given image sensing device. More specifically, the main program extracts all combinations of image sensing device entries (those with object type number="1", type number="0" or "1") and observer entries (those with object type number="1" and type number="2") from the entries of the mixed reality object table generated by the previous process (S51830, S51832), and checks whether or not the viewing frustum of the image sensing device in the mixed reality space intersects the observer (S51834). Note that calculations are made while considering the observer as a column determined by the observer central position and the additional information of the observer entry, as described above.

Figure 43:
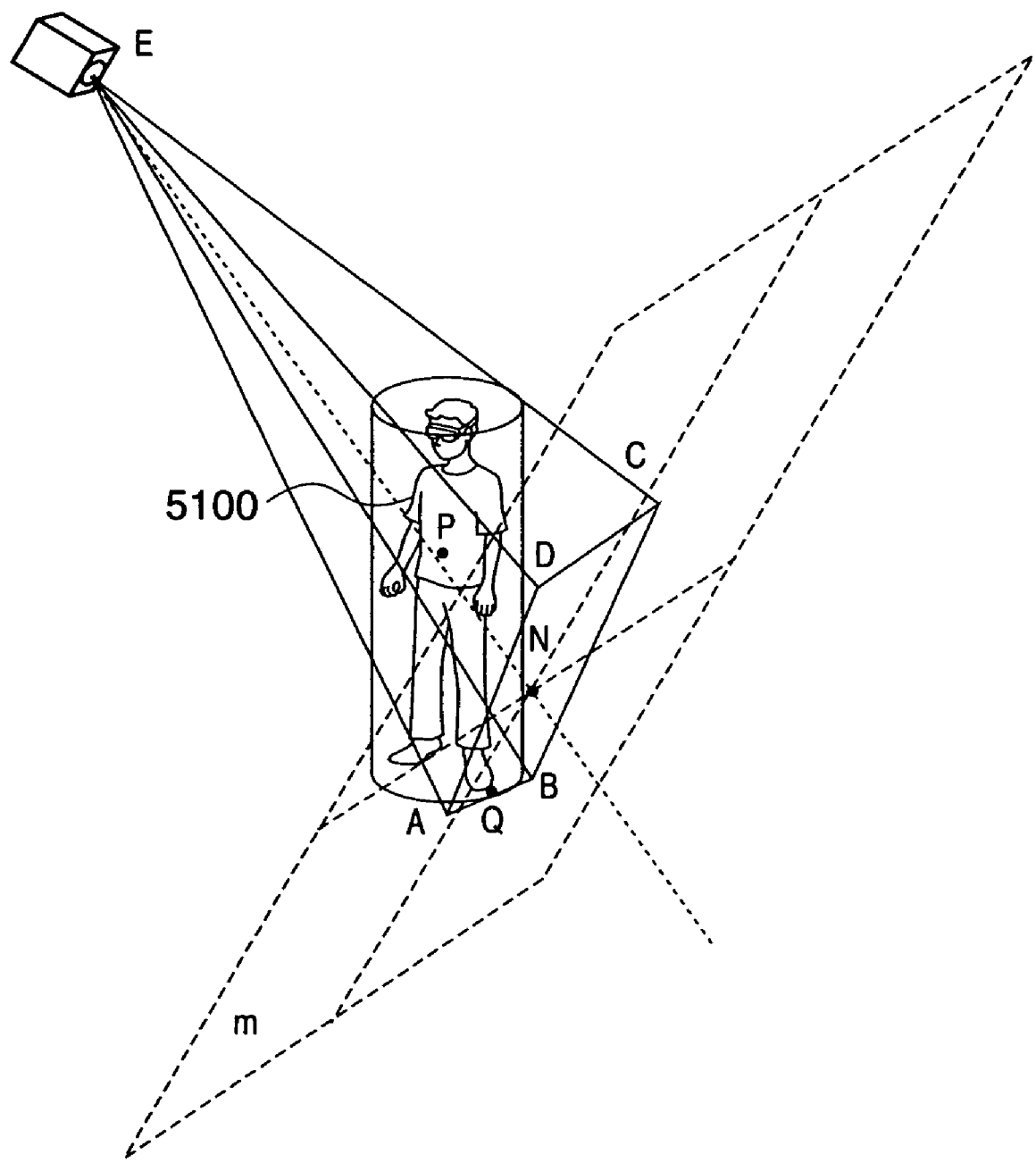
FIG. 43 shows a determination region.

If the viewing frustum of the image sensing device intersects the object, the main program checks if a virtual object is present between these image sensing device and observer (S51836). More specifically, the main program extracts virtual object entries (those with object type number="0") from the entries of the mixed reality object table generated by the previous process, and checks if each of all the extracted virtual objects intersects pyramid E-ABCD which has ABCD as a bottom surface, as shown in FIG. 43 (S51838). Note that ABCD is a figure obtained by mapping the column with radius r and height h, which is formed based on the information in the observer entry, from the position of the image sensing device to plane m which has a line that passes position E of the image sensing device and observer center P as a perpendicular, and contacts the column (at contact point Q).

If a virtual object that interests the pyramid is found, the distance between the virtual object center and plane m is compared with line segment PN. If PN is smaller than the distance, it is determined that the observer viewed from the image sensing device is occluded by this virtual object (occurrence of superposition). If occurrence of superposition is determined, an object relationship entry is generated based on the apparatus number and ID number in the image sensing device entry, the ID number in the observer entry, and the ID number in the virtual object entry, and is added to the object relationship table (S51840). Note that the processes in steps S51836, S51832, and S51830 are repeated for all the image sensing devices (S51842, S51844, S51846).

The generated object relationship table is transmitted to all the mixed reality space image generation programs via the network 5190 as mixed reality space information together with the mixed reality object table (S51848). The series of processes described above are repeated, and a process for ending operations is then made (S51849).

In this way, the mixed reality space management program systematically manages and updates mixed reality space information in accordance with the scenario prepared in advance, and transmits the updated information to all the mixed reality space image generation programs.

Mixed Reality Space Image Generation Program

Figure 38:
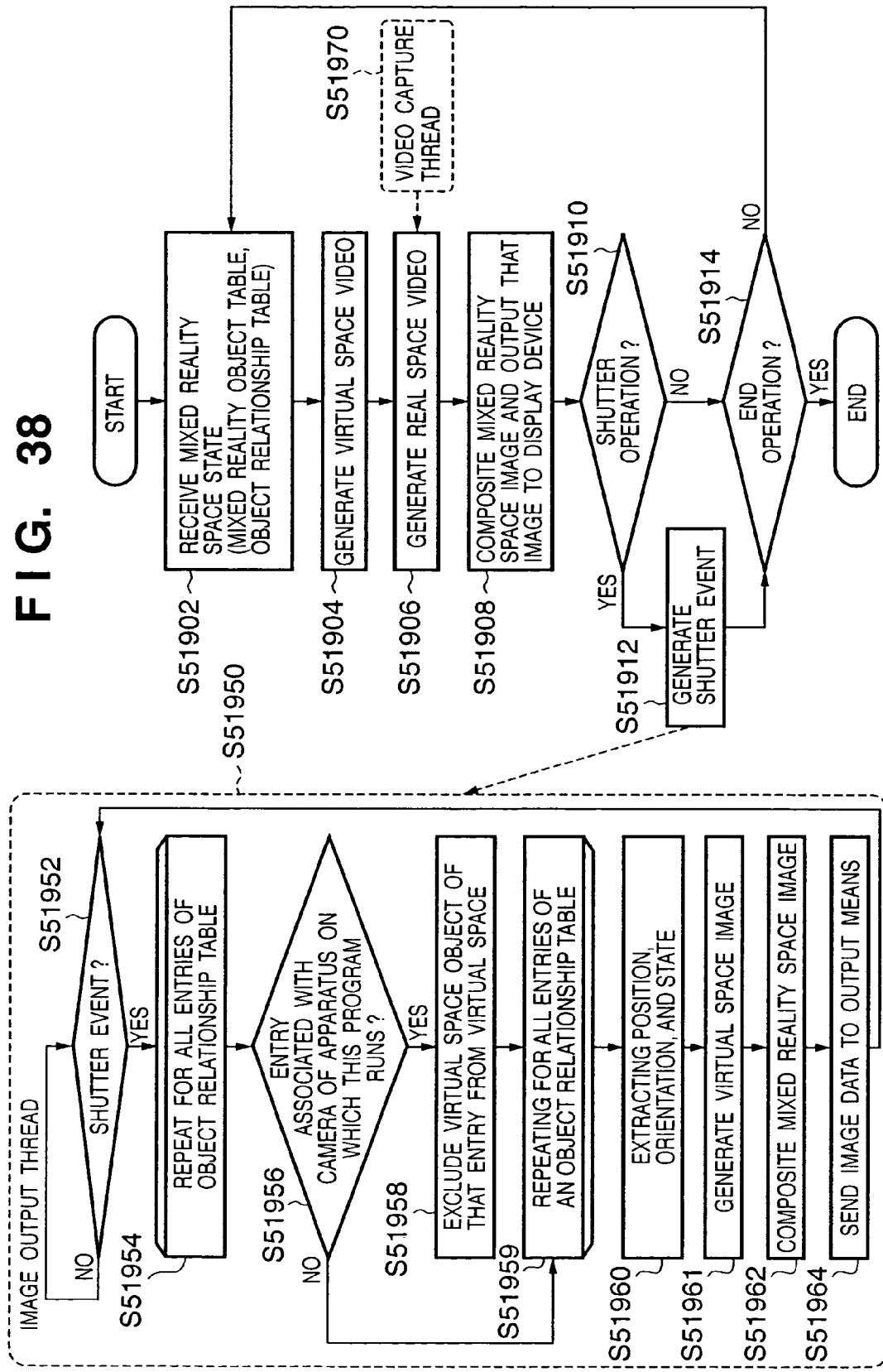
FIG. 38 is a flow chart of a mixed reality space image generation program in the ninth embodiment.

The process implemented upon executing the mixed reality space image generation program will be described below using the flow chart in FIG. 38.

When the mixed reality space image generation program is started on the PC 5110 of each observer image processing apparatus, a video capture thread and image output thread are generated.

The video capture thread intermittently acquires real space images captured by the CCDs 5416 of the HMD 5400 via the video capture cards 5132, and continuously transmits the captured images to the main program.

The image output thread is a program for outputting a mixed reality space image from the printer 5170 upon operation of the shutter switch 5180. Since neither the printer 5170 nor shutter switch 5180 are connected to each observer image processing apparatus of this embodiment, the image output thread executes no process.

Upon reception of the mixed reality space state information sent from the mixed reality space management program (S51902), the main program extracts the positions, orientations, and states of virtual objects from the received mixed reality object table, generates a virtual space image using the extracted values and 3DCG data loaded from the HD 5123 onto the memory 5122, and renders the generated image on the memory 5122 (S51904).

In order to present a mixed reality space video with deep sense of reality to each observer, even when the generated virtual space image is different from an actually captured image as a still image itself, and has a low quality such that it is barely recognized by the observer as a 3DCG image, it is important that each observer can recognize a series of mixed reality images, which are generated successively, as a moving image, and can feel that each virtual space object autonomously and livelily moves in the mixed reality space as if it were a real space object. Therefore, it is desirable that the virtual space image generation process is completed within a period of time as short as 15 to 40 msec, even if the generated image has low reality as a still image.

Subsequently, the main program renders a real space image sent from the aforementioned video capture thread (S51970) on the memory 5122 (S51906), and also renders a mixed reality space image obtained by superimposing the previously generated virtual space images on the real space image on the memory 5122. This mixed reality space image is output to the HMD 5400 and monitor 5140 via the graphic cards 5130 (S51908).

By repeating the aforementioned process, successive mixed reality space images, i.e., a mixed reality space video can be presented to each observer. Note that the processes after step S51910 and the process of the image output thread are not executed on each observer image processing apparatus to which neither the printer 5170 nor shutter switch 5180 are connected. Hence, a detailed description of these processes will be given in the description of the mixed reality space image generation program on the objective viewpoint image processing apparatus.

The process implemented when the PC 5117 of the objective image processing apparatus system executes the mixed reality space image generation program will be described below with reference to FIG. 38 which is a flow chart of that process.

When the mixed reality space image generation program is started on the PC 5117 of the objective viewpoint image processing apparatus, a video capture thread and image output thread are generated.

The video capture thread intermittently acquires a real space image captured by the video camera 5160 via the video capture card 5132, and continuously transmits the captured image to the main program.

The image output thread is a program for outputting a mixed reality space image from the printer 5170 upon operation of the shutter switch 5180. The image output thread waits until the main program generates a shutter event. Upon generation of the shutter event, the image output thread outputs a mixed reality image from the printer 5170.

Figure 33:
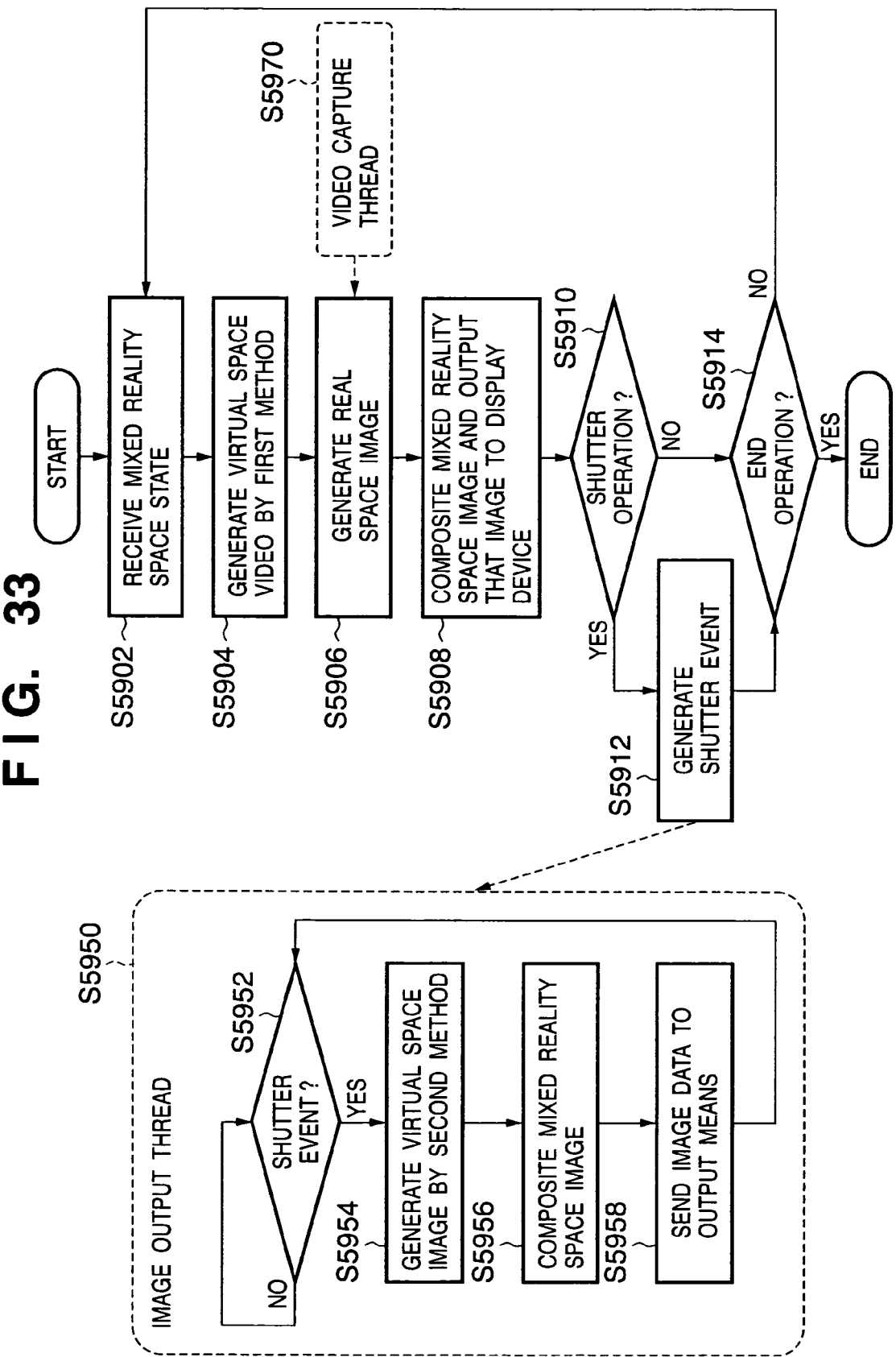
FIG. 33 is a flow chart of a mixed reality space image generation program.

Note that the processes in steps S51902, S51904, S51906, S51908, and S51970 are the same as those in steps S5902, S5904, S5906, S5908, and S5970 in the mixed reality space image generation program on the PC 5110 of the observer image processing apparatus shown in FIG. 33. Hence, by repeating these processes, successive mixed reality space images, i.e., a mixed reality space video can be presented to each observer. Furthermore, the printer 5170 and shutter switch 5180 are connected to the PC 5117 of the objective viewpoint image processing apparatus, and the following process is executed.

After the mixed reality space image is generated and displayed (S51908), the main program checks if the shutter switch 5180 has been operated (S51910). If the shutter switch 5180 has been operated, the main program generates a shutter event (S51912). Note that the event means communication means to threads managed in this program.

Upon generation of the shutter event, the image output thread (S51950) restarts its operation (S51952), and executes the following process for all the entries of the received object relationship table.

The apparatus number of the processing apparatus, on which this program is running, is compared with the first field of the entry. If the two values are equal to each other (that is, if superposition has occurred for the observer in the image captured by the image sensing device connected to the processing apparatus on which this program is running), the virtual space object described in this entry is removed from the virtual space (S51954, S51956, S51958). More specifically, a virtual space object entry having the same ID number is deleted from the received mixed reality object table.

After the aforementioned process, the positions, orientations, and states of virtual space objects are extracted from the mixed reality object table (S51960), and a virtual space image to be output to the printer 5170 is generated using the extracted values and 3DCG data loaded from the HDD 5123 onto the memory 5122 and is rendered on the memory 5122 (S51961). The virtual space image generated in this way is superimposed on the real space image acquired in step S51906 (S51962). When the virtual space image and real space image have different vertical and horizontal pixel sizes due to the aforementioned generation method, an image with smaller pixel sizes can be enlarged to match those of a larger image using a known interpolation technique. Finally, the generated mixed reality space image is transmitted to the printer 5170 (S51964).

After the mixed reality space image is generated and displayed (S51908), whether or not the shutter switch 5180 has been operated is determined (S51910). If the shutter switch 5180 has been operated, a shutter event is generated (S51912), and a process for ending operations is then made (S51914).

Mixed Reality Space Image Example

Figure 39:
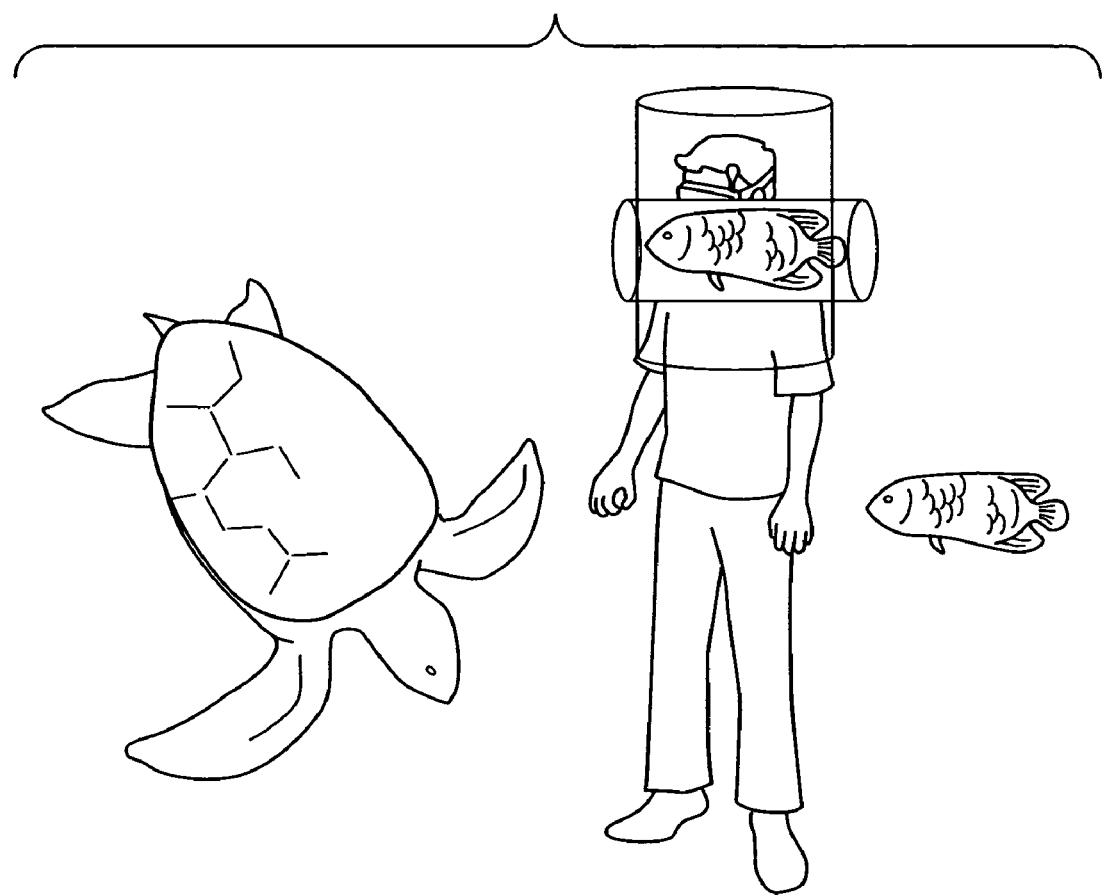
FIG. 39 shows an example of a mixed reality image on a display screen in the ninth embodiment.

An example of the mixed reality space image of this embodiment will be described below. FIGS. 39 and 40 respectively show an example of the mixed reality space image which is composited in step S51908 and is displayed on the monitor and HMD, and an image example of the mixed reality space image which is composited in step S51964 and is output from the printer 5170. To help easy understanding, columns (that is bounding volume) are illustrated, but they are not displayed on actual output images.

Both the mixed reality space images are obtained at the same time, viewpoint, and visual axis direction, but the mixed reality space image to be output from the printer 5170 does not include any virtual object that occludes the observer, and allows clear confirmation of the observer's face.

As can be understood from the above description, according to the system of this embodiment, in a mixed reality space image obtained by capturing a state wherein the observer experiences the mixed reality space, the observer can be prevented from being occluded by a virtual object which inadvertently cuts across in front of the observer. Also, as can be understood from the above description, a high-quality mixed reality space image can be output onto a print medium such as a paper medium, OHP film, and the like without influencing the system performance.

Note that this embodiment makes calculations using a simple solid, i.e., a column in contact determination between the observer and virtual object. However, if the processing apparatus has higher performance, contact determination may be made by defining a more complicated shape. By freely setting the central position of the observer and radius r and height h of the column, the system may manage to prevent only the head (face) of the observer from being occluded by a virtual object.

Since the image output thread and main program operate parallelly, even when the generation process of the mixed reality space image to be printed takes a long time, the processes in steps S51902 to S51914 are repeated without being interrupted, and the mixed reality space image is continuously displayed on the monitor 5147. Hence, a high-quality printout of the mixed reality space image can be obtained without disturbing the experience of the mixed reality space.

10th Embodiment

In the ninth embodiment, when a virtual space object is superposed on the observer viewed from the image sensing device, that virtual space object is removed from the mixed reality space upon generating a mixed reality space image. However, in this embodiment, a mixed reality space image is generated by moving such virtual space object to a non-superposing position. Note that the basic arrangement is the same as that in the ninth embodiment, and the processing flow is substantially the same as that in the ninth embodiment, except for some steps in the mixed reality space management program and mixed reality space image generation program.

Figure 51:
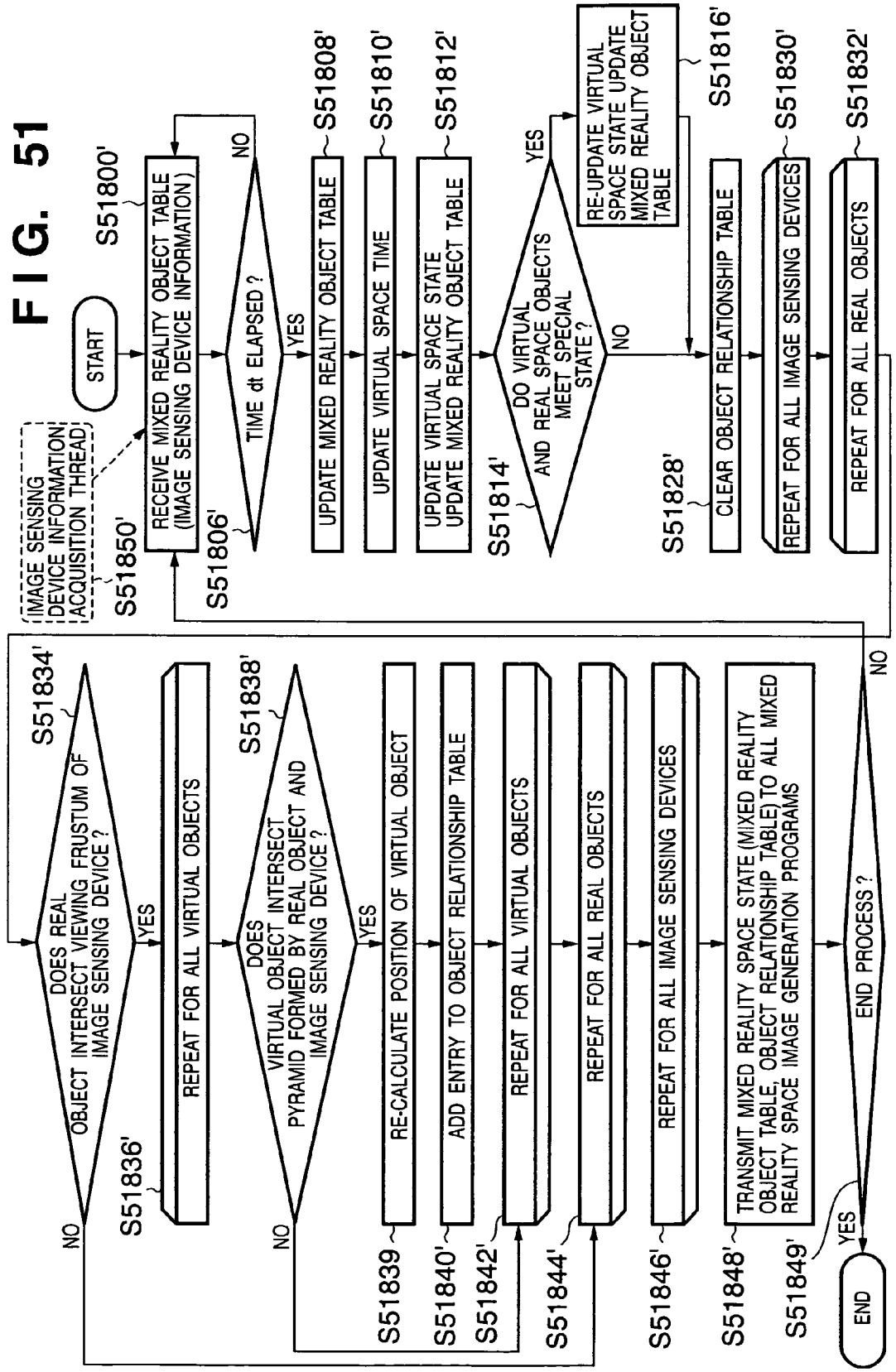
FIG. 51 is a flow chart of a mixed reality space management program in the 10th embodiment.

FIG. 51 is a flow chart showing the processing flow of the mixed reality space management program in this embodiment. Note that step numbers with "'" in FIG. 51 denote steps that execute the same processes as those with the same step numbers in FIG. 37, which shows the flow of the program process in the ninth embodiment. Also, FIG. 51 is different from FIG. 37 only in the process in step S51839.

Step S51839 executes a process if it is determined that the observer viewed from the image sensing device is occluded by the virtual object of interest (occurrence of superposition). As in the ninth embodiment, occurrence of superposition is determined when the viewing frustum of the image sensing device intersects the observer, pyramid E-ABCD which has ABCD as a bottom surface, as shown in FIG. 43, intersects the virtual object, and line segment PN is smaller than the distance between the virtual object center and plane m. If occurrence of superposition is determined, a virtual object position free from any superposition is calculated (S51839), an object relationship entry is generated based on the apparatus number and ID number in the image sensing device entry, the ID number in the observer entry, the ID number in the virtual object ID, and the calculated virtual object position, and is added to the object relationship table (S51840). Note that a field that records the virtual object position free from any superposition is added to the object relationship table in the ninth embodiment.

Calculations in step S51839 will be described in detail below. Perpendiculars n1, n2, n3, and n4 which pass center P' of a virtual object that causes superposition and are dropped to planes of four side surfaces (ΔEAB, ΔEBC, ΔECD, and ΔEDA) of pyramid E-ABCD, and intersections Q1, Q2, Q3, and Q4 between these perpendiculars and planes are calculated. Of the four intersections, an intersection with the minimum distance from virtual object center P' is obtained, the side surface including this intersection is defined by plane m', and a perpendicular to this plane is defined by n'. Then, point p" that is present on perpendicular n'outside the pyramid, and has a distance from plane m', which is given by:

$$\sqrt{\left(\frac{h'}{2}\right)^2 + r'^2} \times \cos\left(\theta - \tan^{-1}\left(\frac{2r'}{h'}\right)\right) \quad (1)$$

where h' is the height of the column that covers the virtual object, r' is the radius of the bottom surface of the column that covers the virtual object, and these values are recorded in the additional information of the entry that indicates this virtual object. θ is the angle perpendicular n' makes with a line segment in the height direction of the column that covers the virtual object. Note that the range of the angle θ is 0 to 180°. If this point P" is set as the new center of the virtual object, the virtual object is located to contact plane m' at a position outside the pyramid.

As described above, if superposition has occurred, the position of the virtual space object free from any superposition is calculated, and is transmitted to the mixed reality space image generation program as the object relationship table.

Figure 52:
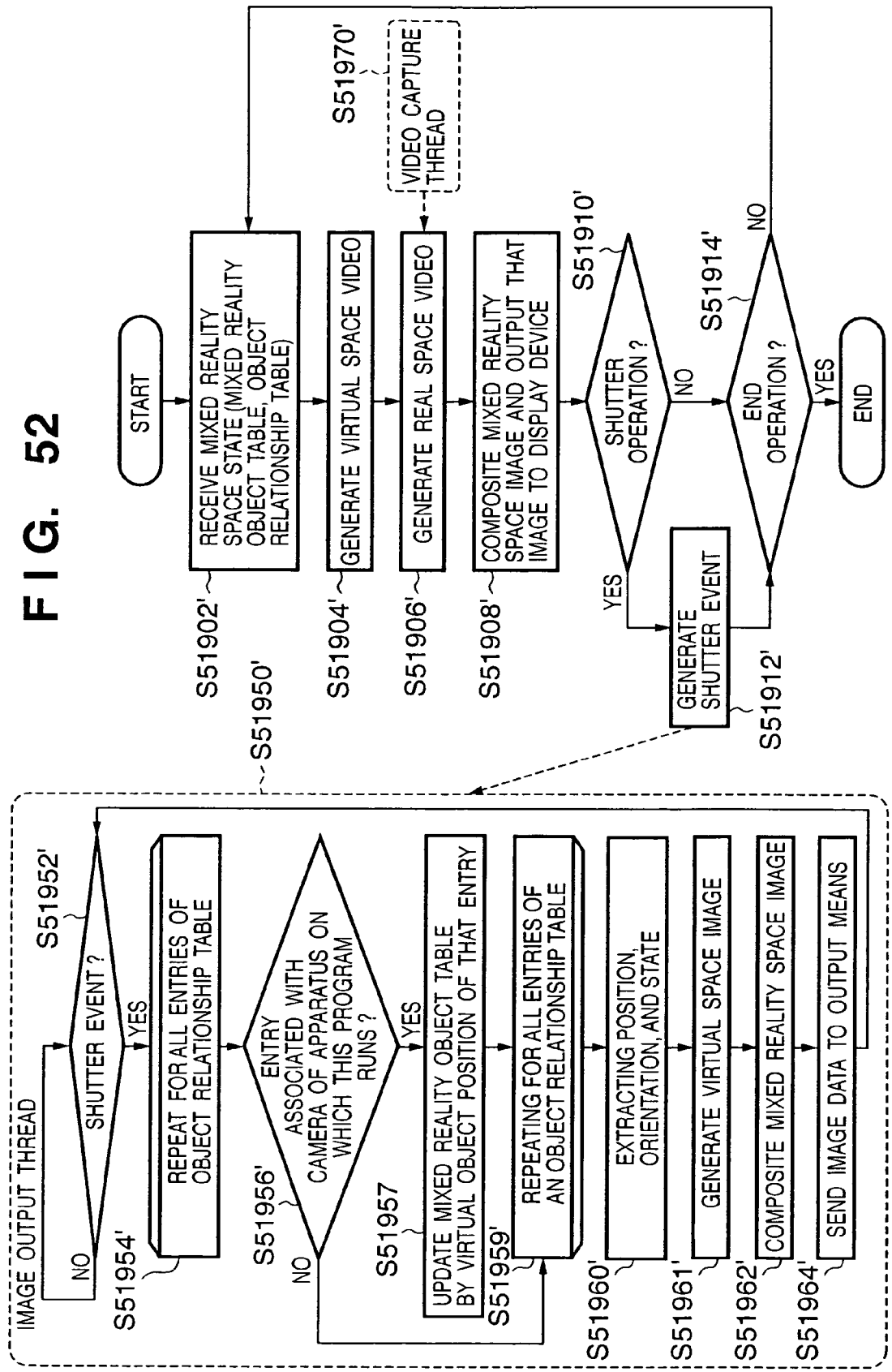
FIG. 52 is a flow chart of a mixed reality space image generation program in the 10th embodiment.

FIG. 52 is a flow chart showing the flow of the process implemented when the PC 5117 of the objective image processing apparatus system executes the mixed reality space image generation program. Note that step numbers with "'" in FIG. 52 denote steps that execute the same processes as those with the same step numbers in FIG. 38, which shows the flow of the program process in the ninth embodiment. Also, FIG. 52 is different from FIG. 38 only in the process in step S51957.

After the mixed reality space image is generated and displayed, if a shutter event is generated, the image output thread executes the following process for all entries of the received object relationship table.

The apparatus number of the processing apparatus, on which this program is running, is compared with the first field of the entry. If the two values are equal to each other (that is, if superposition has occurred for the observer in the image captured by the image sensing device connected to the processing apparatus on which this program is running), the virtual space object described in this entry is found from the mixed reality object table, and the position of the virtual object described in that mixed reality object table entry is updated by the value stored in the fifth field of the corresponding object relationship table entry (S51957).

After the aforementioned process, the positions, orientations, and states of virtual space objects are extracted from the mixed reality object table (S51959), and a virtual space image to be output to the printer 5170 is generated using the extracted values and 3DCG data loaded from the HDD 5123 onto the memory 5122 and is rendered on the memory 5122 (S51961').

Mixed Reality Space Image Example

Figure 54:
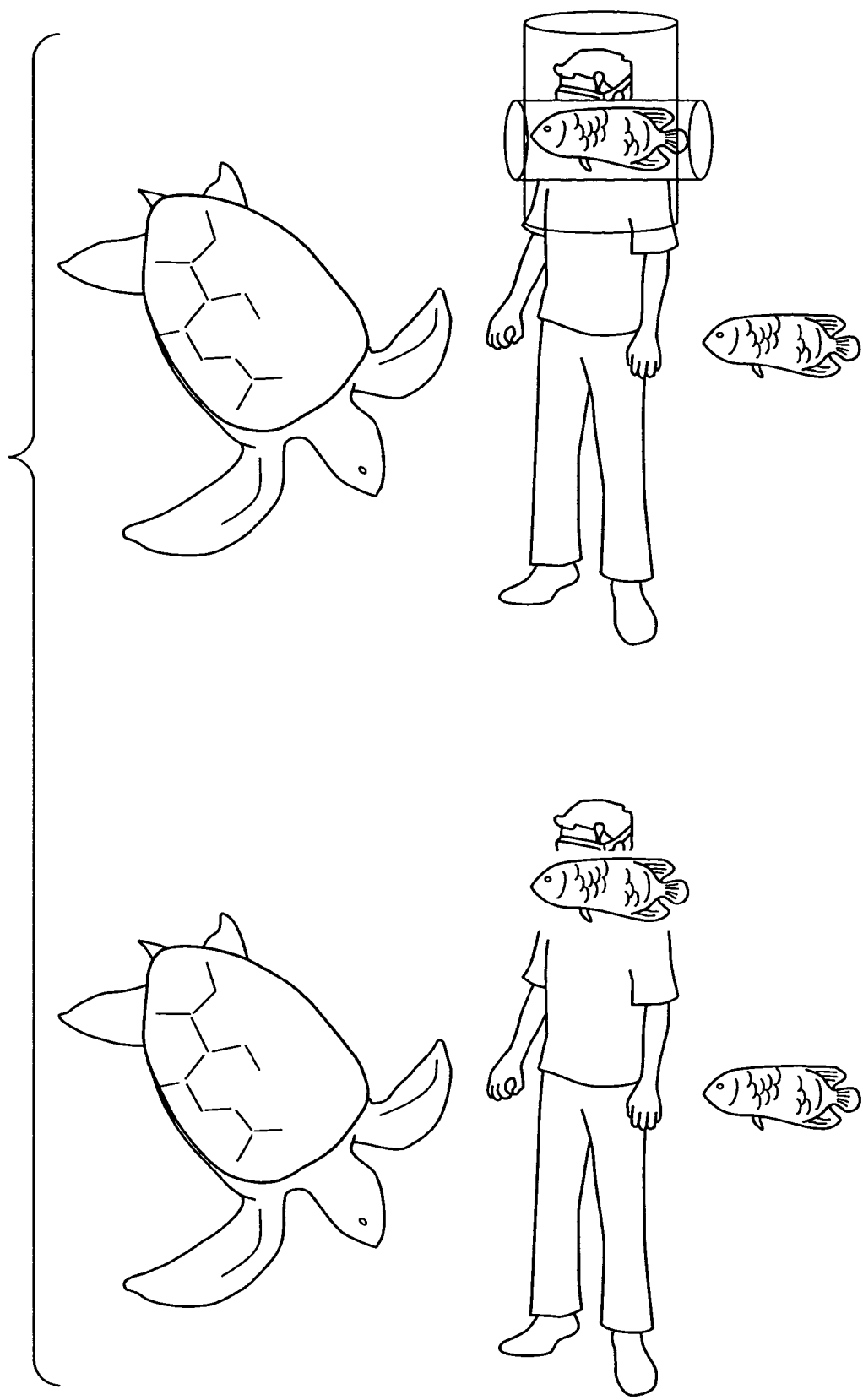
FIG. 54 shows an example of a mixed reality image on a display screen in the 10th embodiment.
Figure 55:
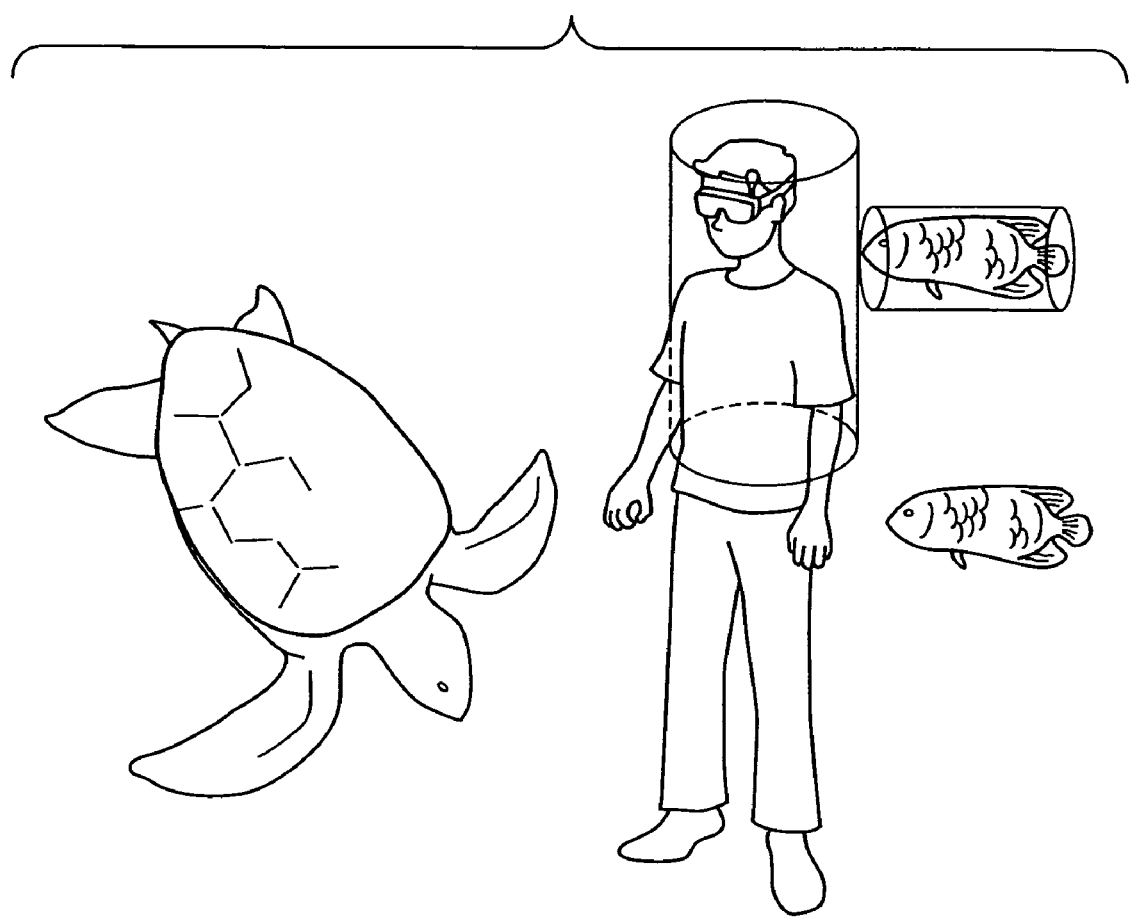
FIG. 55 shows an example of a mixed reality image on a paper medium output in the 10th embodiment.

An example of the mixed reality space image of this embodiment will be described below. FIGS. 54 and 55 respectively show an example of the mixed reality space image which is composited in step S51908' and is displayed on the monitor and HMD, and an image example of the mixed reality space image which is composited in step S51961' and is output from the printer 5170. To help easy understanding, columns are illustrated, but are not displayed on actual output images.

Both the mixed reality space images are obtained for the same time, viewpoint, and visual axis direction. However, in the mixed reality space image to be output from the printer 5170, a virtual object that occludes the observer has been moved to another position, and the observer's face can be clearly confirmed.

As described above, according to the system of this embodiment, in a mixed reality space image obtained by capturing a state wherein the observer experiences the mixed reality space, the observer can be prevented from being occluded by a virtual object which inadvertently cuts across in front of the observer. Also, a high-quality mixed reality space image can be output onto a print medium such as a paper medium, OHP film, and the like without influencing the system performance.

Another Embodiment

Furthermore, the present invention is not limited to the apparatus and method for implementing the above embodiments, and the scope of the present invention includes a case wherein the above embodiments are achieved by supplying a program code of software that can implement the above-mentioned embodiments to a computer (CPU or MPU) in the system or apparatus, and making the computer of the system or apparatus control respective devices in accordance with the program code.

In this case, the program code of the software itself implements the functions of the above-mentioned embodiments, and the program code itself and means for supplying the program code to the computer, i.e., a storage medium that stores the program code, are included in the scope of the present invention.

As the storage medium for supplying the program code, for example, a floppy disk®, hard disk, optical disk, magneto-optical disk, CD-ROM, magnetic tape, nonvolatile memory card, ROM, and the like may be used.

Such program code is included in the scope of the present invention not only when the functions of the above embodiments are implemented by making the computer control various devices in accordance with only the supplied program code, but also when the functions of the embodiments are implemented by collaboration of the program code and an OS (operating system) or another application software running on the computer.

Furthermore, the scope of the present invention includes a case wherein the functions of the above embodiments are implemented by some or all of actual processing operations executed by a CPU or the like arranged in a function extension board of the computer or a function extension unit connected to the computer, after the supplied program code is written in a memory of the extension board or unit.

In the case where the present invention is applied to the storage medium mentioned above, the storage medium will store the program code that corresponds to the flowcharts described above.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus which is connected to a print unit adapted to print an image, and can output an image to be printed to the print unit, comprising:
    an image sensing unit adapted to capture a real space image;
    a generation unit adapted to generate a virtual space image according to a viewpoint position and orientation of said image sensing unit;
    a composition unit adapted to obtain a mixed reality space image by combining the real space image captured by said image sensing unit and the virtual space image generated by said generation unit;
    a display unit adapted to display a mixed reality space image obtained by said composition unit; and
    an output unit adapted to output a mixed reality space image, which is obtained by said composition unit, to the print unit in response to an input of a print instruction,
    wherein said generation unit generates a virtual space image to be displayed by said display unit according to a first procedure, and said generation unit generates a virtual space image to be outputted by said output unit according to a second procedure, with image quality of a virtual space image generated according to the second procedure being higher than that of a virtual space image generated according to the first procedure.

2. The apparatus according to claim 1, wherein said generation unit generates a virtual space image to be outputted by said output unit according to the second procedure, if the print instruction is inputted after said generation unit generates a virtual space image to be displayed by said display unit.

3. The apparatus according to claim 1, wherein a pixel size of one side of the virtual space image generated by said generation unit is a value within a product of a length of one side and a resolution of an image that said print unit can output.

4. The apparatus according to claim 1, further comprising a management unit adapted to manage state information of the real and virtual spaces, and in that said management unit updates the state information of the virtual space in accordance with input information or at each predetermined timing, and said generation unit successively generates virtual space images in accordance with the updated state information of the real and virtual spaces.

5. The apparatus according to claim 4, wherein said management unit is an independent apparatus connected to said image processing apparatus via a network, and the state information of the virtual space updated by said management unit can be received by image processing apparatuses which are equivalent to said image processing apparatus, and are connected to the network.

6. The apparatus according to claim 1, wherein said apparatus can be simultaneously used by at least one user, and has said image sensing unit, said generation unit, said composition unit, said display unit, and detection unit adapted to detect a viewpoint position and visual axis direction of a user, which are prepared for each user.

7. The apparatus according to claim 1, wherein said second procedure includes at least one of a procedure for calculating the influences of light reflection in detail, a procedure for calculating by increasing the number of bits of numerical value precision, and a procedure for calculating vertical and horizontal pixel sizes of a virtual space image using arbitrary values within range of product resolution and print size of the print unit.

8. A computer readable storage medium storing a computer program to control an image processing apparatus connected to a print unit adapted to print an image, and capable of outputting an image to be printed to the print unit, said storage medium encoded with a computer program comprising:
    code to capture a real space image with an image sensing unit;
    code to generate a virtual space image with a generation unit according to a viewpoint position and orientation of the image sensing unit;
    code to obtain a mixed reality space image with a composition unit by combining the real space image captured by the image sensing unit and the virtual space image generated by the generation unit;
    code to display a mixed reality space image obtained by the composition unit on a display unit; and
    code to output on an output unit a mixed reality space image, which is obtained by the composition unit, to the print unit in response to an input of a print instruction,
    wherein the generation unit generates a virtual space image to be displayed by the display unit according to a first procedure, and the generation unit generates a virtual space image to be outputted by the output unit according to a second procedure, with image quality of a virtual space image generated according to the second procedure being higher than that of a virtual space image generated according to the first procedure.

9. An image processing apparatus which is connected to a print unit adapted to print an image, and can output an image to be printed to the print unit, comprising:
    an image sensing unit adapted to capture a real space image;
    a generation unit adapted to generate a virtual space image according to a viewpoint position and orientation of said image sensing unit;
    a composition unit adapted to obtain a mixed reality space image by combining the real space image captured by said image sensing unit and the virtual space image generated by said generation unit;

a display unit adapted to display a mixed reality space image obtained by said composition unit;

an output unit adapted to output a mixed reality space image, which is obtained by said composition unit, to the print unit in response to an input of a print instruction; and a determination unit adapted to check a positional relationship among said image sensing unit, an observer observing the mixed reality space image, and a virtual space object and determining whether or not the observer is occluded by the virtual space object in the mixed reality space image, wherein said generation unit generates a virtual space image to be displayed by said display unit according to a first procedure, and said generation unit generates a virtual space image to be outputted by said output unit, based on a determination result of said determination unit, according to a second procedure, with image quality of a virtual space image generated according to the second procedure being higher than that of a virtual space image generated according to the first procedure.

10. The apparatus according to claim 9, further comprising a management unit adapted to manage state information of the real and virtual spaces, and in that said management unit updates the update information of the virtual space in accordance with input information or at each predetermined timing, and said generation unit successively generates virtual space images in accordance with the updated state information of the real and virtual spaces.

11. The apparatus according to claim 10, wherein said management unit is an independent apparatus connected to said image processing apparatus via a network, and the state information of the virtual space updated by said management unit can be received by image processing apparatuses which are equivalent to said image processing apparatus, and are connected to the network.

12. The apparatus according to claim 9, wherein said apparatus can be simultaneously used by at least one observer, and has said image sensing unit, said generation unit, said composition unit, said display unit, and a detection unit adapted to detect a viewpoint position and visual axis direction of an observer, which are prepared for each observer.

13. The apparatus according to claim 9, wherein said second procedure includes at least one of a procedure for calculating the influences of light reflection in detail, a procedure for calculating by increasing the number of bits of numerical value precision, and a procedure for calculating vertical and horizontal pixel sizes of a virtual space image using arbitrary values within range of product resolution and print size of the print unit.

14. A computer readable storage medium storing a computer program to control an image processing apparatus connected to a print unit adapted to print an image, and capable of outputting an image to be printed to the print unit, comprising:

code to capture a real space image with an image sensing unit;

code to generate a virtual space image with a generation unit according to a viewpoint position and orientation of the image sensing unit;

code to obtain a mixed reality space image with a composition unit by combining the real space image captured by the image sensing unit and the virtual space image generated by the generation unit;

code to display a mixed reality space image obtained by the composition unit on a display unit;

code to output on an output unit a mixed reality space image, which is obtained by the composition unit, to the print unit in response to an input of a print instruction;

code to check, with a determination unit, a positional relationship among the image sensing unit, an observer observing the mixed reality space image, and a virtual space object, and determining whether or not the observer is occluded by the virtual space object in the mixed reality space image, wherein the generation unit generates a virtual space image to be displayed by the display unit according to a first procedure, and the generation unit generates a virtual space image to be outputted by the output unit, based on determination result of the determination unit, according to a second procedure, with image quality of virtual space image generated according to the second procedure being higher than that of a virtual space image generated according to the first procedure.

15. An image processing method to be executed by an image processing apparatus which is connected to a print unit adapted to print an image, and can output an image to be printed to the print unit, comprising:

an image sensing step of capturing a real space image using an image sensing unit;

a generation step of generating a virtual space image according to a viewpoint position and orientation of the image sensing unit;

a composition step of obtaining a mixed reality space image by combining the captured real space image and the generated virtual space image;

a displaying step of displaying the obtained mixed reality space image; and an output step of outputting the obtained mixed reality space image to the print unit in response to an input of a print instruction, wherein a virtual space image to be displayed is generated according to a first procedure, and a virtual space image to be outputted is generated according to a second procedure, with image quality of a virtual space image generated according to the second procedure being higher than that of a virtual space image generated according to the first procedure.

16. An image processing method to be executed by an image processing apparatus which is connected to a print unit adapted to print an image, and can output an image to be printed to the print unit, comprising:

an image sensing step of capturing a real space image using an image sensing unit;

a generation step of generating a virtual space image according to a viewpoint position and orientation of the image sensing unit;

a composition step of obtaining a mixed reality space image by combining the captured real space image and the generated virtual space image;

a displaying step of displaying the obtained mixed reality space image;

an output step of outputting the obtained mixed reality space image to the print unit in response to an input of a print instruction, and a determination step to check a positional relationship among the image sensing unit, an observer observing the mixed reality space image, and a virtual space object, and determining whether or not the observer is occluded by the virtual space object in the mixed reality space image, wherein a virtual space image to be displayed is generated according to a first procedure, and a virtual space image to be outputted is generated according to a second procedure, with image quality of a virtual space image generated according to the second procedure being higher than that of a virtual space image generated according to the first procedure.

17. The apparatus according to claim 9, wherein said determination unit sets a column to cover the observer, and determines whether or not the observer is occluded by the virtual space object in the mixed reality space image based on the contact of the column and the virtual space object.

* * * * *